(12) United States Patent
Kim et al.

(10) Patent No.: US 12,028,599 B2
(45) Date of Patent: Jul. 2, 2024

(54) CAMERA MODULE

(71) Applicant: LG INNOTEK CO., LTD., Seoul (KR)

(72) Inventors: Jung Cheol Kim, Seoul (KR); Hyeon Jun Jang, Seoul (KR); Jung Seok Oh, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 156 days.

(21) Appl. No.: 17/754,245

(22) PCT Filed: Sep. 21, 2020

(86) PCT No.: PCT/KR2020/012736
§ 371 (c)(1),
(2) Date: Mar. 28, 2022

(87) PCT Pub. No.: WO2021/060790
PCT Pub. Date: Apr. 1, 2021

(65) Prior Publication Data
US 2022/0360696 A1  Nov. 10, 2022

(30) Foreign Application Priority Data

Sep. 26, 2019 (KR) .................. 10-2019-0119198
Oct. 2, 2019 (KR) .................. 10-2019-0122548

(51) Int. Cl.
*H04N 23/57* (2023.01)
*H04N 23/51* (2023.01)
(Continued)

(52) U.S. Cl.
CPC ............ *H04N 23/57* (2023.01); *H04N 23/51* (2023.01); *H04N 23/54* (2023.01); *H04N 23/55* (2023.01)

(58) Field of Classification Search
CPC ........ H04N 23/57; H04N 23/51; H04N 23/54; H04N 23/55; H04N 23/687; H04N 23/45;
(Continued)

(56) References Cited

U.S. PATENT DOCUMENTS 9,769,389 B2    9/2017  Miller et al.
9,774,787 B2 *  9/2017  Miller .................... H04N 23/62
(Continued)

FOREIGN PATENT DOCUMENTS

CN          110169048 A    8/2019
JP          2010-14818 A   1/2010
(Continued)

OTHER PUBLICATIONS

International Search Report dated Dec. 23, 2020 in International Application No. PCT/KR2020/012736.
(Continued)

*Primary Examiner* — Shahbaz Nazrul
(74) *Attorney, Agent, or Firm* — Saliwanchik, Lloyd & Eisenschenk

(57) ABSTRACT

The present embodiment relates to a camera module comprising a first camera module and a second camera module, wherein the first camera module comprises first to third magnets disposed at first to third corners of a first cover and a first dummy member disposed at a fourth corner of the first cover, and the second camera module comprises fourth to sixth magnets disposed at fifth to seventh corners of a second cover and a second dummy member disposed at an eighth corner of the second cover, wherein the first dummy member is adjacent to the sixth magnet of the fourth to sixth magnets, and the second dummy member is adjacent to the third magnet of the first to third magnets.

20 Claims, 29 Drawing Sheets

(51) Int. Cl.
*H04N 23/54* (2023.01)
*H04N 23/55* (2023.01)

(58) Field of Classification Search
CPC ............... G03B 13/36; G03B 2205/0069;
G03B 30/00; G03B 5/00; G03B 17/12;
G02B 7/09
See application file for complete search history.

(56) References Cited

U.S. PATENT DOCUMENTS

| | | |
|---|---|---|
| 2014/0072289 A1 | 3/2014 | Lim et al. |
| 2014/0177056 A1* | 6/2014 | Hayashi ............... G03B 17/02 359/557 |
| 2015/0260948 A1 | 9/2015 | Yamakage et al. |
| 2016/0018720 A1 | 1/2016 | Bachar et al. |
| 2016/0377881 A1 | 12/2016 | Jung et al. |
| 2017/0082823 A1* | 3/2017 | Hwang ............... H04N 23/75 |
| 2017/0315376 A1* | 11/2017 | Hu ............... G02B 27/646 |
| 2017/0315377 A1* | 11/2017 | Park ............... H04N 23/57 |
| 2019/0058832 A1 | 2/2019 | Huang et al. |
| 2019/0181726 A1* | 6/2019 | Kuo ............... G03B 5/02 |
| 2019/0204532 A1* | 7/2019 | Konuma ............... G02B 27/646 |
| 2019/0285827 A1* | 9/2019 | Wu ............... G03B 19/22 |

FOREIGN PATENT DOCUMENTS

| | | |
|---|---|---|
| KR | 10-1781406 B1 | 9/2017 |
| KR | 10-2018-0013286 A | 2/2018 |
| KR | 10-2018-0101083 A | 9/2018 |
| KR | 10-2018-0110996 A | 10/2018 |
| KR | 10-2018-0126918 A | 11/2018 |
| WO | 2018/182203 A1 | 10/2018 |
| WO | 2018/182204 A1 | 10/2018 |
| WO | 2018/212616 A1 | 11/2018 |

OTHER PUBLICATIONS

Supplementary European Search Report dated Nov. 3, 2022 in European Application No. 20868409.2.
Office Action dated May 20, 2023 in Chinese Application No. 202080067323.6.

* cited by examiner (a)

| Simul Sensitivity | 3.30 | um/mA |
| Simul Linearity (-30 ~ 320um) | 33.42 | um |

(b)

| Spring K | 42 | N/m |
| Simul Sensitivity | 3.76 | um/mA |
| Simul Linearity (-30 ~ 320um) | 9.95 | um |

CAMERA MODULE

CROSS-REFERENCE TO RELATED APPLICATIONS

This application is the U.S. national stage application of International Patent Application No. PCT/KR2020/012736, filed Sep. 21, 2020, which claims the benefit under 35 U.S.C. § 119 of Korean Application Nos. 10-2019-0119198, filed Sep. 26, 2019; and 10-2019-0122548, filed Oct. 2, 2019, the disclosures of each of which are incorporated herein by reference in their entirety.

TECHNICAL FIELD

The present embodiment relates to a camera module.

BACKGROUND ART

As the spread of various portable terminals is widely generalized and wireless Internet services are commercialized, the demands of consumers related to portable terminals are also diversifying, so that various types of additional devices are being installed in the portable terminals.

Among them, there is a camera module that photographs a picture or video of a subject as a representative one. Meanwhile, recently, a dual camera module in which two camera modules are disposed side by side has been studied. However, in the dual camera module of the prior art, since the gap between the camera modules is narrow, there is a problem that magnetic field interference is occurring therebetween.

In addition, the autofocus function for automatically adjusting the focus according to the distance of the subject is being applied to the camera module. However, recently, as the size and weight of the lens increase and the stroke range of lens movement increases, the electromagnetic force for autofocus driving becomes insufficient during design, and the driving linearity is deteriorated.

DETAILED DESCRIPTION OF THE INVENTION

Technical Subject

A first embodiment of the present invention is to provide a structure in which mutual interference between magnets in a dual OIS camera module is minimized.

A second embodiment of the present invention is to provide a lens driving device comprising an electromagnetic force securing structure to minimize the overall size of the module and to maintain the linearity of the lens driving and increase the stroke range in a situation in which the size and weight of the lens are being increased.

Technical Solution

A camera module according to a first embodiment of the present invention comprises a first camera module and a second camera module, wherein the first camera module comprises a first cover, a first bobbin disposed within the first cover, first to third magnets disposed at first to third corners of the first cover, and a first dummy member disposed at a fourth corner of the first cover, wherein the first dummy member is adjacent to the sixth magnet among the fourth to sixth magnets, and wherein the second dummy member may be adjacent to the third magnet among the first to third magnets.

The second dummy member may be disposed on the same straight line as the second magnet, the third magnet, and the fourth magnet.

The second dummy member may be disposed between the third magnet and the fourth magnet.

A first sidewall of the first camera module may face a fifth sidewall of the second camera module.

It may comprise a sensing magnet disposed at at least one of the fourth corner and the eighth corner.

It may comprise a position sensor disposed at a position corresponding to the sensing magnet.

The sensing magnet may be disposed on at least one of the first dummy member and the second dummy member.

The first dummy member and the second dummy member may comprise a groove in which a sensing magnet is disposed.

The second magnet and the first dummy member may be disposed on a diagonal line with each other.

When viewed from above, the inner side polarity of the second magnet may be different from the inner side polarity of the first magnet.

When viewed from below, the inner side polarity of the second magnet may be the same as the inner side polarity of the first magnet.

The polarity of the inner side of the second magnet and the fifth magnet may be the same in up and down directions.

The polarity of the inner side of each of the first and third magnets and the fourth and sixth magnets may be different in up and down directions.

The weight of the first dummy member may be substantially the same as the weight of the second magnet.

The sum of the weights of the first dummy member and the sensing magnet may be equal to the weight of the second magnet.

The second camera module comprises a second housing disposed between the second bobbin and the second cover, a second base disposed below the second housing, and a second substrate disposed in the second base, wherein the position sensor may be disposed on the second substrate.

The second camera module comprises a second housing disposed between the second bobbin and the second cover, and the position sensor may be disposed in the second housing.

A camera module according to a first embodiment of the present invention comprises a first camera module and a second camera module, wherein the first camera module comprises a first cover, a first bobbin disposed in the first cover, a first magnet disposed in the first corner to the third corner of the first cover, and a first dummy member disposed at a fourth corner of the first cover, wherein the second camera module comprises a second cover, a second bobbin disposed in the second cover, a second magnet disposed at the fifth to seventh corners of the second cover, and a second dummy member disposed at the eighth corner of the second cover, wherein the fourth corner is adjacent to the seventh corner among the fifth to eighth corners, and wherein the third corner may be adjacent to the eighth corner among the fifth to eighth corners.

The second dummy member may be disposed on a virtual straight line with the two of the first magnets of the first camera module and one of the second magnet of the second camera module.

The virtual straight line may be parallel to a vertical virtual straight line passing through the first optical axis of the first camera module and the second optical axis of the second camera module.

The virtual straight line may be parallel to a direction directing from the first optical axis of the first camera module toward the second optical axis of the second camera module.

The third corner may be disposed between the second corner and the eighth corner.

The first dummy member is disposed adjacent to the second magnet disposed at the third corner of the second cover, and the second dummy member may be disposed adjacent to the first magnet disposed at the third corner of the first cover.

A camera module according to a first embodiment of the present invention comprises a first camera module and a second camera module, wherein the first camera module comprises: a first cover comprising a first surface facing the second camera module; a first dummy member disposed at a first corner adjacent to the first surface among the four corners of the first cover; and a first magnet disposed at each of the remaining three corners excluding the first corner among the four corners of the first cover, wherein the second camera module comprises: a second cover comprising a second surface facing the first surface of the first cover; a second dummy member disposed at a first corner adjacent to the second surface among the four corners of the second cover; and a second magnet disposed at each of the remaining three corners excluding the first corner among the four corners of the second cover, and wherein the first dummy member may be disposed at the opposite side of the second dummy member with respect to a virtual plane connecting the optical axis of the first camera module and the optical axis of the second camera module.

The first camera module comprises: a first base; a first housing spaced apart from the first base; a first bobbin disposed in the first housing; a first coil disposed on the first bobbin and facing the first magnet; and a second coil disposed on the first base and facing the first magnet, wherein the second camera module may comprise: a second base; a second housing spaced apart from the second base; a second bobbin disposed in the second housing; a third coil disposed on the second bobbin and facing the second magnet; and a fourth coil disposed on the second base and facing the second magnet.

The first camera module comprises: a third magnet disposed on a side opposite to the first dummy member among a plurality of side surfaces of the first bobbin; a first sensor for detecting the third magnet, wherein the second camera module may comprise: a fourth magnet disposed on a side opposite to the second dummy member among a plurality of side surfaces of the second bobbin; and a second sensor for detecting the fourth magnet.

The first camera module comprises: a first substrate disposed on the first base; a first elastic member connecting the first housing and the first bobbin; and a second elastic member connecting the first substrate and the first elastic member, wherein the second camera module comprises: a second substrate disposed on the second base; a third elastic member connecting the second housing and the second bobbin; a fourth elastic member connecting the second substrate and the third elastic member, and wherein the second coil is disposed on the first substrate and the fourth coil may be disposed on the second substrate.

The first cover comprises: the first corner of the first cover; a second corner disposed opposite to the first corner of the first cover; and a third corner and a fourth corner disposed opposite to each other, wherein the first magnet comprises: a first-first magnet disposed at the second corner of the first cover; a first-second magnet disposed at the third corner of the first cover; and a first-third magnet disposed at the fourth corner of the first cover, wherein the second cover comprises: the first corner of the second cover; a second corner disposed opposite to the first corner of the second cover; and a third corner and a fourth corner disposed opposite to each other, wherein the second magnet comprises: a second-first magnet disposed at the second corner of the second cover; a second-second magnet disposed at the third corner of the second cover; and a second-third magnet disposed at the fourth corner of the second cover, wherein the first-first magnet and the second-first magnet are two-pole magnetized magnets, and wherein the first-second magnet, the first-third magnet, the second-second magnet, and the second-third magnet may be a four-pole magnetized magnet.

The polarities of the inner side surface and the outer side surface of the two-pole magnetized magnet are different; the 4-pole magnetized magnet is formed as two 2-pole magnetized magnets having different polarities on an inner side surface and an outer side surface thereof are being overlapped with each other with a neutral portion therebetween in the optical axis direction; and polarities of an inner side surface of the upper portion and an inner side surface of the lower portion of the 4-pole magnetized magnet may be different.

The first coil comprises a first-first coil facing the inner surface of the first-second magnet, and a first-second coil facing the inner surface of the first-third magnet, and the third coil may comprise a third-first coil facing the inner surface of the second-second magnet and a third-second coil facing the inner surface of the second-third magnet.

The second coil comprises: a second-first coil facing the lower surface of the first-first magnet; a second-second coil facing the lower surface of the first-second magnet; and a second-third coil opposite the underside of the first-third magnet, wherein the fourth coil may comprise: a fourth-first coil facing the lower surface of the second-first magnet; a fourth-second coil facing the lower surface of the second-second magnet; and a fourth-third coil facing the lower surface of the second-third magnet.

Each of the first-first magnet and the second-first magnet may be formed to be larger than each of the first-second magnet, the first-third magnet, the second-second magnet, and the second-third magnet.

The number of turns of each of the second-first coil and the fourth-first coil may be greater than the number of turns of each of the second-second coil, the second-third coil, the fourth-second coil, and the fourth-third coil.

The first elastic member comprises a first upper elastic member connecting the upper portion of the first housing and the upper portion of the first bobbin, and the second elastic member comprises a plurality of wires, wherein the first upper elastic member may comprise: a first upper elastic unit connecting one of the plurality of wires and the first-first coil; a second upper elastic unit connecting the first-first coil and the first-second coil; and a third upper elastic unit connecting the first-second coil and the other one of the plurality of wires.

The third elastic member comprises a second upper elastic member connecting an upper portion of the second housing and an upper portion of the second bobbin, and the fourth elastic member comprises a plurality of wires, wherein the second upper elastic member may comprise: a first upper elastic unit connecting one of the plurality of wires and the third-first coil; a second upper elastic unit connecting the third-first coil and the third-second coil; and a third upper elastic unit connecting the third-second coil and the other one of the plurality of wires.

The first dummy member comprises a groove formed on an inner surface, at least a portion of the third magnet is disposed in the groove of the first dummy member, the second dummy member comprises a groove formed on an inner surface, and at least a portion of the fourth magnet may be disposed in the groove of the second dummy member.

The first cover and the second cover may be spaced apart, and the first surface of the first cover and the second surface of the second cover may be disposed in parallel.

The weight of the first dummy member may correspond to the weight of the first-first magnet, and the weight of the second dummy member may correspond to the weight of the second-first magnet.

The first base comprises a groove formed in an upper surface of the first base, the first sensor is coupled to a lower surface of the first substrate and disposed in the groove of the first base, the second base comprises a groove formed on an upper surface of the second base, and the second sensor may be coupled to a lower surface of the second substrate and disposed in the groove of the second base.

It comprises: a first terminal disposed on the first base and electrically connected to the first substrate; and a second terminal disposed on the second base and electrically connected to the second substrate, wherein one end of the second elastic member is coupled to the first elastic member by solder, and the other end of the second elastic member is coupled to the first terminal by solder, and wherein one end of the fourth elastic member is coupled to the third elastic member by solder, and the other end of the fourth elastic member may be coupled to the second terminal by solder.

The first sensor is disposed on the first base, and the second sensor may be disposed on the second base.

The first sensor is disposed in the first housing, and the second sensor may be disposed in the second housing.

A smartphone according to a first embodiment of the present invention may comprise the camera module.

A camera module according to a first embodiment of the present invention comprises a first camera module and a second camera module, wherein the first camera module comprises: a first base; a first housing spaced apart from the first base; a first bobbin disposed in the first housing; a first coil disposed on the first bobbin; a first magnet disposed in the first housing and facing the first coil; and a second coil disposed on the first base and facing the first magnet, wherein the second camera module comprises: a second base; a second housing spaced apart from the second base; a second bobbin disposed in the second housing; a third coil disposed on the second bobbin; a second magnet disposed in the second housing and facing the third coil; and a fourth coil disposed on the second base and facing the second magnet, wherein a first dummy member is disposed at one corner adjacent to the second camera module among the plurality of corners of the first housing, and wherein in the second housing, a second dummy member may be disposed at the opposite side of the first dummy member with respect to a virtual line connecting the optical axis of the first camera module and the optical axis of the second camera module.

A camera module according to a first embodiment of the present invention comprises a first camera module and a second camera module, wherein the first camera module comprises a first cover, and the second camera module comprises a second cover, wherein the first cover comprises a first corner of the first cover, a second corner disposed opposite to the first corner of the first cover, and a third corner and a fourth corner disposed opposite to each other, wherein the first camera module comprises a first magnet disposed at the second corner of the first cover, a second magnet disposed at the third corner of the first cover, and a third magnet disposed at a fourth corner of the first cover, wherein the second cover comprises the first corner of the second cover, a second corner disposed opposite the first corner of the second cover, and a third corner and a fourth corner disposed opposite to each other, wherein the second camera module comprises a fourth magnet disposed at the second corner of the second cover, a fifth magnet disposed at the third corner of the second cover, and a sixth magnet disposed at the fourth corner of the second cover, wherein the first magnet and the fourth magnet are two-pole magnetized magnets, and wherein the second magnet, the third magnet, the fifth magnet, and the sixth magnet may be a four-pole magnetized magnet.

A lens driving device according to a second embodiment of the present invention comprises: a base; a housing spaced apart from the base; a bobbin disposed inside the housing; a magnet disposed in the housing; a first coil disposed on the bobbin and facing the magnet; and a second coil disposed on the base and facing the magnet, wherein the magnet comprises an inner surface facing the first coil, wherein the inner surface of the magnet comprises: a first region having a first polarity; a second region spaced apart from the first region and disposed below the first region and having a second polarity opposite to the first polarity; and a third region disposed between the first region and the second region, and wherein an area of the first region of the magnet may be different from an area of the second region of the magnet.

The bobbin comprises a protruded portion being protruded from the side surface of the bobbin, wherein the first coil comprises: a first portion disposed above the protruded portion of the bobbin; a second portion disposed below the protruded portion of the bobbin; and a third portion connecting the first portion and the second portion, and wherein the first region of the inner surface of the magnet faces the first portion of the first coil at an initial position where no current is applied to the first coil, and the second region may face the second portion of the first coil.

The area of the first region of the magnet may be smaller than the area of the second region of the magnet.

At the initial position, the distance in the optical axis direction between the upper end of the first portion of the first coil and the lower end of the first region of the magnet may be 80% or more of the distance in the optical axis direction between the upper end of the first portion of the first coil and the lower end of the first portion of the first coil.

At the initial position, the first portion of the first coil may be overlapped with the first region and the third region of the magnet in a direction perpendicular to the optical axis.

At the initial position, the second portion of the first coil may be overlapped with the second region of the magnet in a direction perpendicular to the optical axis.

At the initial position, the third portion of the first coil may be overlapped with the second region and the third region of the magnet in a direction perpendicular to the optical axis.

The magnet comprises a first magnet and a second and third magnets disposed opposite to each other, wherein the first coil may comprise: a first-first coil facing the second magnet; and a first-second coil facing the third magnet, and wherein the second coil comprises a second-first coil facing the first magnet; a second-second coil facing the second magnet; and a second-third coil facing the third magnet.

The lens driving device may comprise a dummy member disposed in the housing opposite to the third magnet.

The first magnet may be a 2-pole magnetized magnet, and the second and third magnets may be a 4-pole magnetized magnet.

The lens driving device may comprise: a fourth magnet disposed on the bobbin; a substrate disposed on the base; and a sensor disposed on the substrate and detecting the fourth magnet, wherein the second coil may be disposed on the substrate.

The length of the magnet in the long side direction of the inner surface is longer than the length of the first coil in the corresponding direction, and the length in the short side direction of the inner surface of the magnet may be longer than the length in the corresponding direction of the first coil.

The length of the magnet in a long side direction of the inner surface may correspond to the length in a corresponding direction of the second coil.

A camera module according to a second embodiment of the present invention may comprise: a printed circuit board; an image sensor disposed on the printed circuit board; a lens driving device disposed on the printed circuit board; and a lens coupled to the bobbin of the lens driving device.

When a driving current in a first direction is applied to the first coil, the bobbin moves within a first stroke in a direction away from the image sensor, when a driving current in a second direction opposite to the first direction is applied to the first coil, the bobbin moves within a second stroke in a direction to be closer to the image sensor, wherein the first stroke may be longer than the second stroke.

A lens driving device according to a second embodiment of the present invention comprises: a housing; a bobbin disposed inside the housing; a magnet disposed in the housing; a first coil disposed on the bobbin and facing the magnet; and a second coil disposed below the magnet and facing the magnet, wherein the bobbin comprises: a protruded portion being protruded from the side surface of the bobbin, wherein the first coil comprises: a first portion disposed on the protruded portion of the bobbin; a second portion disposed below the protruded portion of the bobbin; and a third portion connecting the first portion and the second portion, wherein the magnet comprises: a first magnet unit comprising an N pole and an S pole; a second magnet portion disposed below the first magnet portion and comprising an N pole and an S pole; and a neutral portion disposed between the first magnet portion and the second magnet portion, Advantageous Effects Mutual interference between magnets in a dual OIS camera module can be minimized through the first embodiment of the present invention.

Through this, it is possible to minimize the gap between the two camera modules.

Through the second embodiment of the present invention, the linearity of driving the lens can be maintained and the stroke range can be increased.

In addition, the size of the camera module comprising the lens driving device can be minimized.

BRIEF DESCRIPTION OF DRAWINGS

FIG. 4b is a partially enlarged view of FIG. 4a.

BEST MODE

Figure 1:
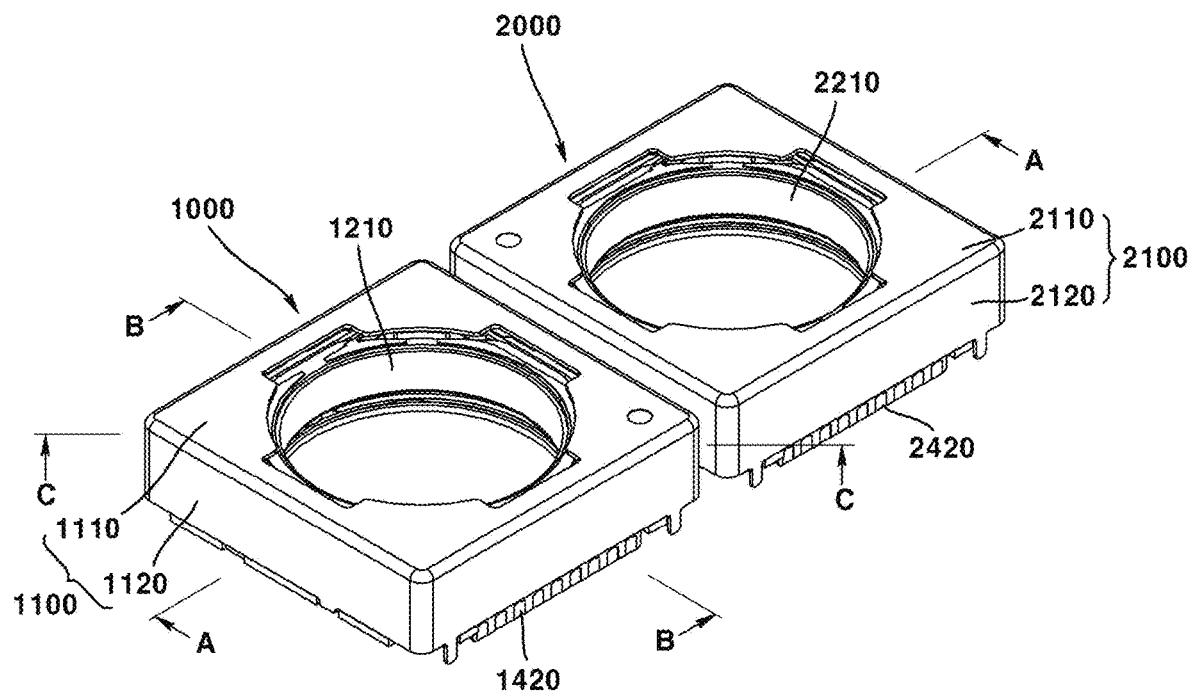
FIG. 1 is a perspective view illustrating a part of a dual camera module according to a first embodiment of the present invention.

Hereinafter, preferred embodiments of the present invention will be described in detail with reference to the accompanying drawings.

However, the technical idea of the present invention is not limited to some embodiments to be described, but may be implemented in various forms, and within the scope of the technical idea of the present invention, one or more of the constituent elements may be selectively combined or substituted between embodiments.

In addition, the terms (comprising technical and scientific terms) used in the embodiments of the present invention, unless explicitly defined and described, can be interpreted as a meaning that can be generally understood by a person skilled in the art, and commonly used terms such as terms defined in the dictionary may be interpreted in consideration of the meaning of the context of the related technology.

In addition, terms used in the present specification are for describing embodiments and are not intended to limit the present invention.

In the present specification, the singular form may comprise the plural form unless specifically stated in the phrase, and when described as "at least one (or more than one) of A and B and C", it may comprise one or more of all combinations that can be combined with A, B, and C.

In addition, in describing the components of the embodiment of the present invention, terms such as first, second, A, B, (a), and (b) may be used. These terms are merely intended to distinguish the components from other components, and the terms do not limit the nature, order or sequence of the components.

And, when a component is described as being 'connected', 'coupled' or 'interconnected' to another component, the component is not only directly connected, coupled or interconnected to the other component, but may also comprise cases of being 'connected', 'coupled', or 'interconnected' due that another component between that other components.

In addition, when described as being formed or disposed in "on (above)" or "below (under)" of each component, "on (above)" or "below (under)" means that it comprises not only the case where the two components are directly in contact with, but also the case where one or more other components are formed or disposed between the two components. In addition, when expressed as "on (above)" or "below (under)", the meaning of not only an upward direction but also a downward direction based on one component may be comprised.

An 'optical axis (refer to OA of FIG. 23) direction' used below is defined as an optical axis direction of a lens and/or an image sensor coupled to the lens driving device. Meanwhile, the 'optical axis direction' may correspond to a 'vertical direction', a 'z-axis direction', and the like.

The 'auto focus function' used hereinafter is defined as a function to automatically focus on the subject by adjusting the distance from the image sensor by moving the lens in the optical axis direction according to the distance of the subject so that the image sensor can obtain a clear image of the subject. Meanwhile, 'auto focus' may correspond to 'AF (Auto Focus)'. In addition, auto focus feedback control (CLAF)' is defined as a real time feedback control of a lens position by detecting the distance between the image sensor and the lens to improve focus adjustment accuracy.

Meanwhile, 'closed-loop auto focus' may be mixedly used with 'closed-loop auto focus (CLAF)'. Furthermore, autofocus in which feedback control is not performed may be referred to as 'open-loop auto focus (OLAF)'.

The 'hand shake correction function' used hereinafter is defined as a function of moving the lens to offset the movement and vibration of the lens caused by an external force, for example, the user's hand shake, so that a clear image of the subject can be obtained on the image sensor. Meanwhile, the 'image stabilization function' may correspond to 'optical image stabilization (OIS)'.

Hereinafter, a configuration of an optical device according to a first embodiment of the present invention will be described.

The optical device may be any one among a hand phone, a mobile phone, a smart phone, a portable smart device, a digital camera, a laptop computer, a digital broadcasting terminal, a personal digital assistant (PDA), a portable multimedia player (PMP), and a navigation device. However, the type of the optical device is not limited thereto, and any device for photographing an image or a picture may be comprised in the optical device.

The optical device may comprise a main body. The main body may form an outer appearance of the optical device. The main body can accommodate the camera device. A display unit may be disposed on one surface of the main body. For example, the display unit and the camera device may be disposed on one surface of the main body, and the camera device may be additionally disposed on the other surface of the main body (a surface positioned opposite to one surface). Meanwhile, the camera device disposed on the other surface of the main body may comprise a dual camera module.

The optical device may comprise a display unit. The display unit can be disposed on one side of the main body. The display unit can output an image photographed by the camera device.

The optical device may comprise a camera device. The camera device can be disposed in the main body. At least a portion of the camera device can be accommodated inside the main body. A plurality of camera devices may be provided. The camera device may be disposed on one side of the main body and the other side of the main body, respectively. The camera device may photograph an image of a subject. The device of the camera may comprise a dual camera device. The camera device may comprise a dual camera module.

Hereinafter, a configuration of a dual camera module according to a first embodiment of the present invention will be described with reference to the drawings.

Figure 2:
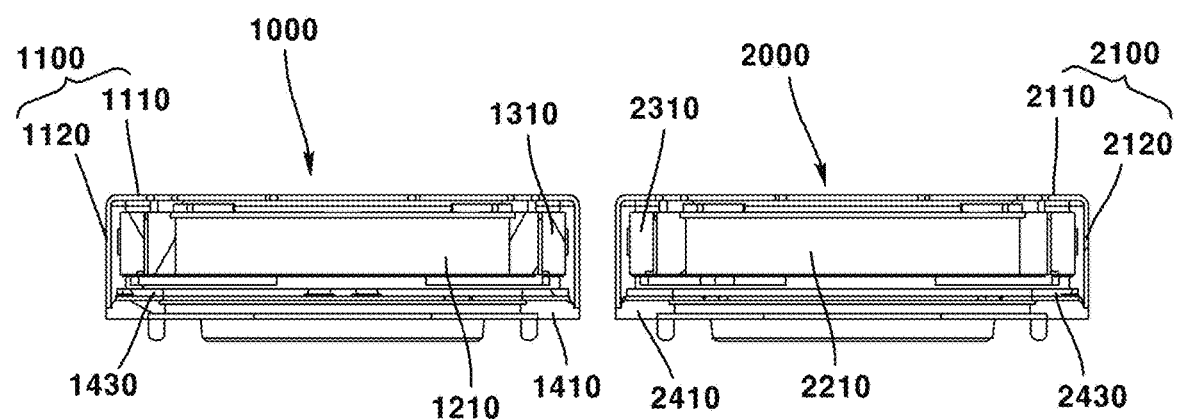
FIG. 2 is a cross-sectional view taken along line A-A of FIG. 1.
Figure 3:
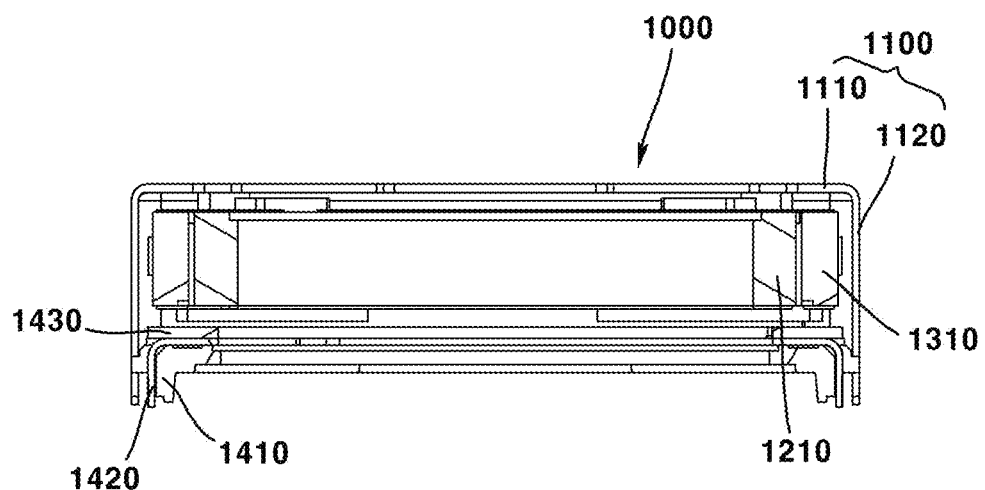
FIG. 3 is a cross-sectional view taken along line B-B of FIG. 1.
Figure 4A:
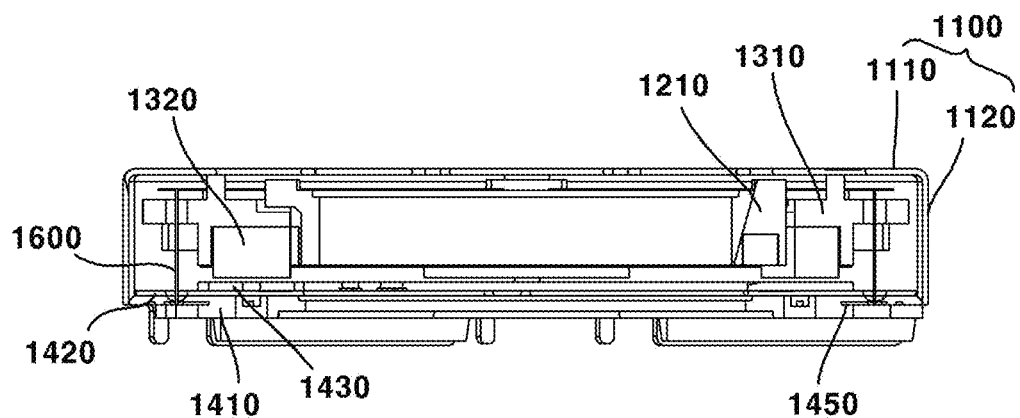
FIG. 4a is a cross-sectional view taken along line C-C of FIG. 1.
Figure 4B:
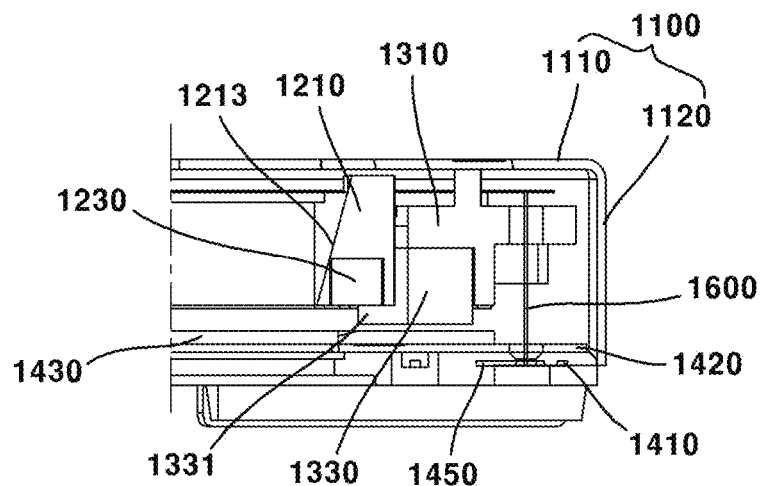
Figure 5:
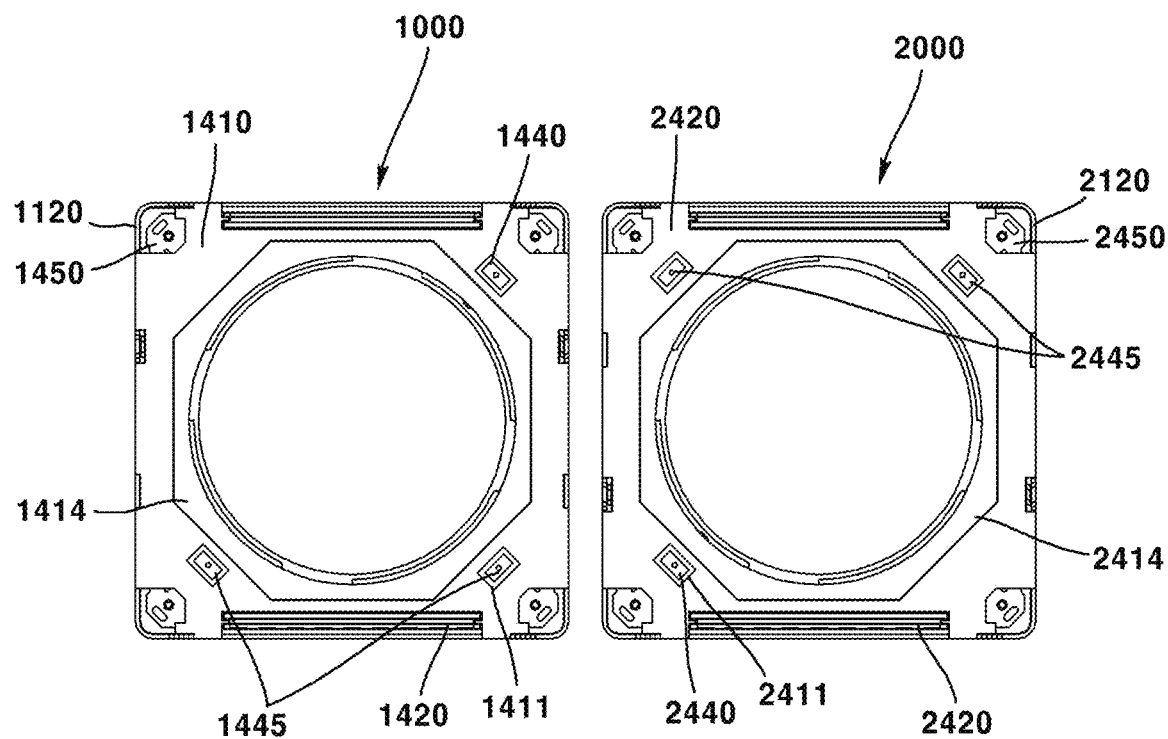
FIG. 5 is a bottom view of the part of the dual camera module of FIG. 1 as viewed from below.
Figure 6:
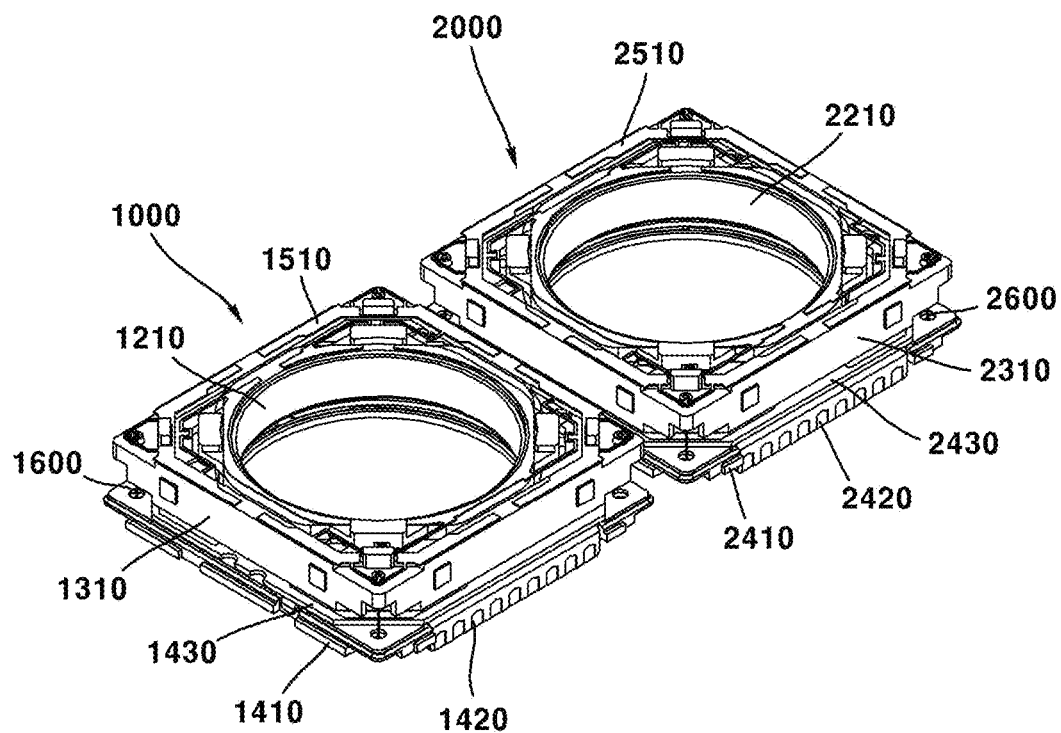
FIG. 6 is a perspective view illustrating a state in which a cover is removed from the part of the dual camera module of FIG. 1.
Figure 7:
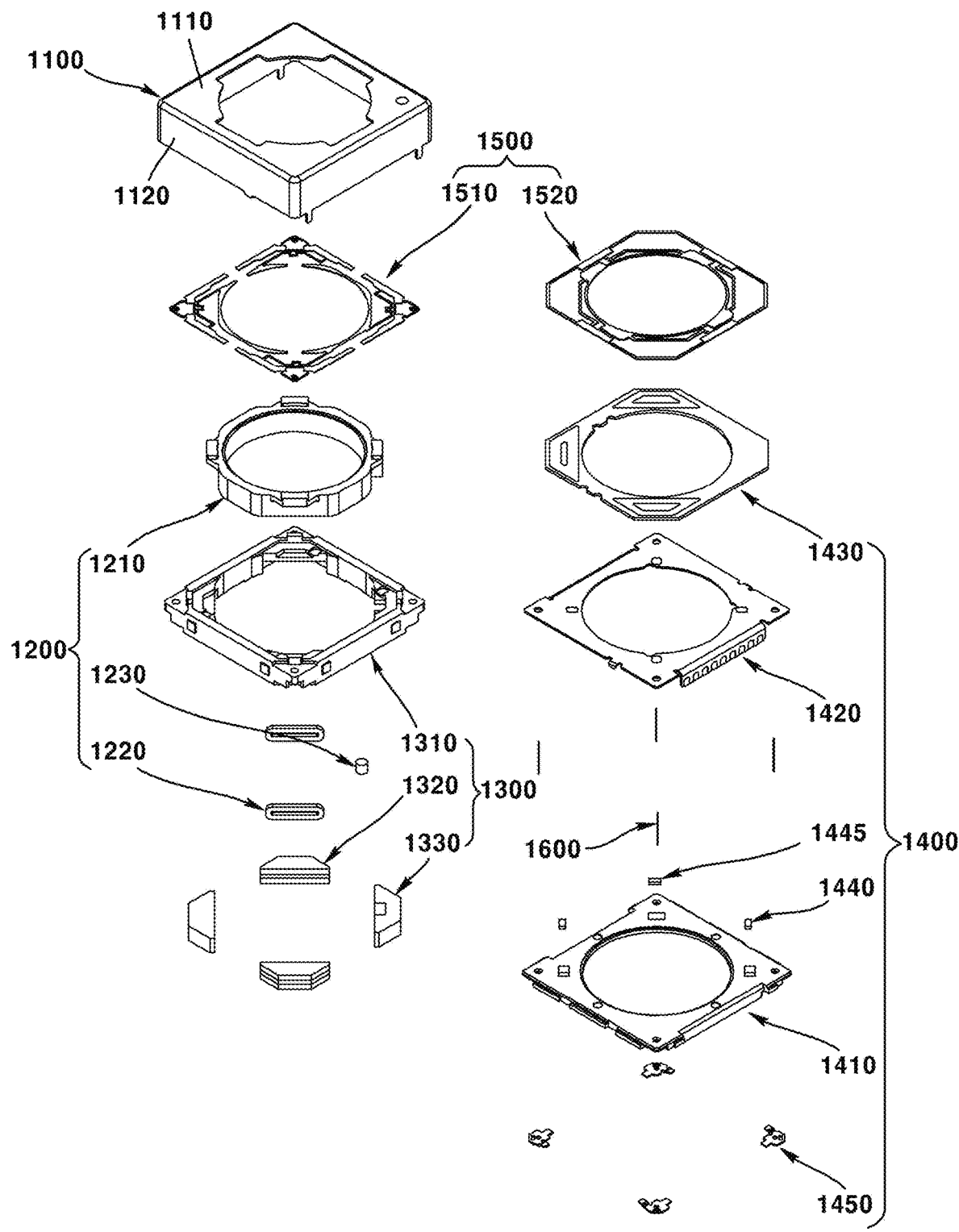
FIG. 7 is an exploded perspective view illustrating a first lens driving device according to a first embodiment of the present invention.
Figure 8A:
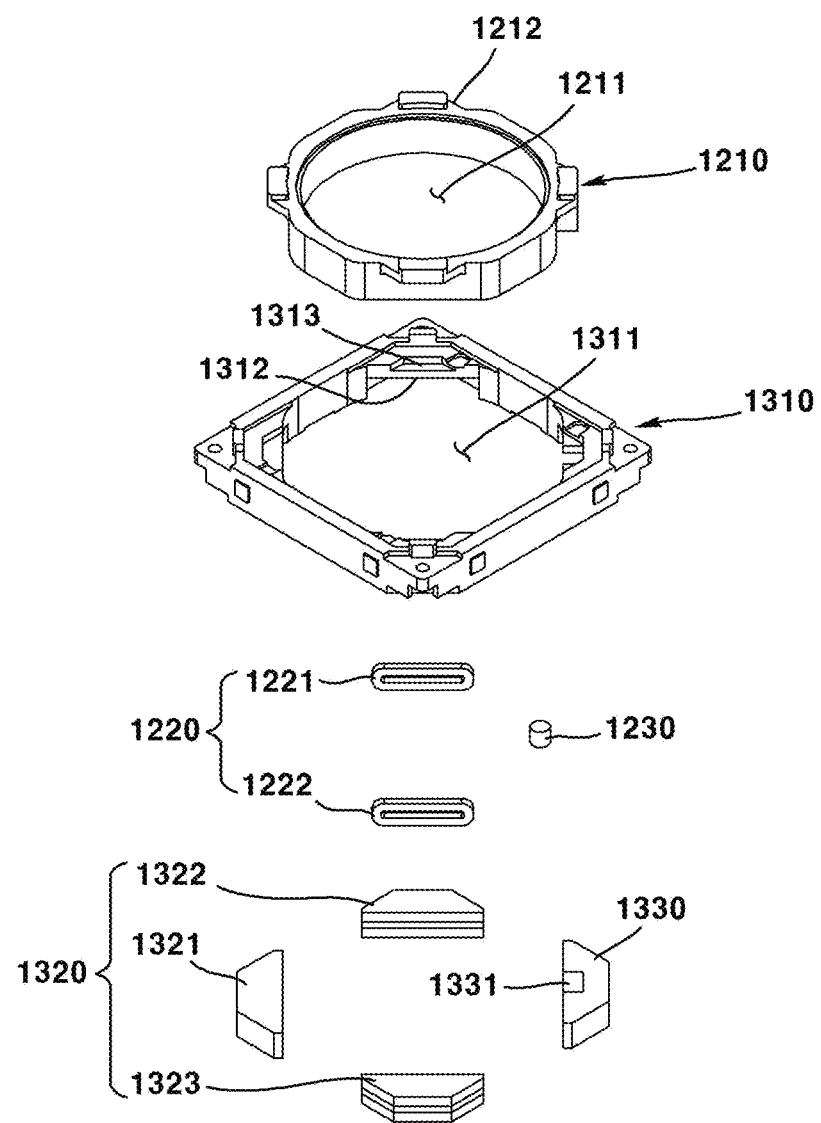
FIGS. 8a, 9, and 10a are exploded perspective views illustrating a part of a first lens driving device according to a first embodiment of the present invention.
Figure 8B:
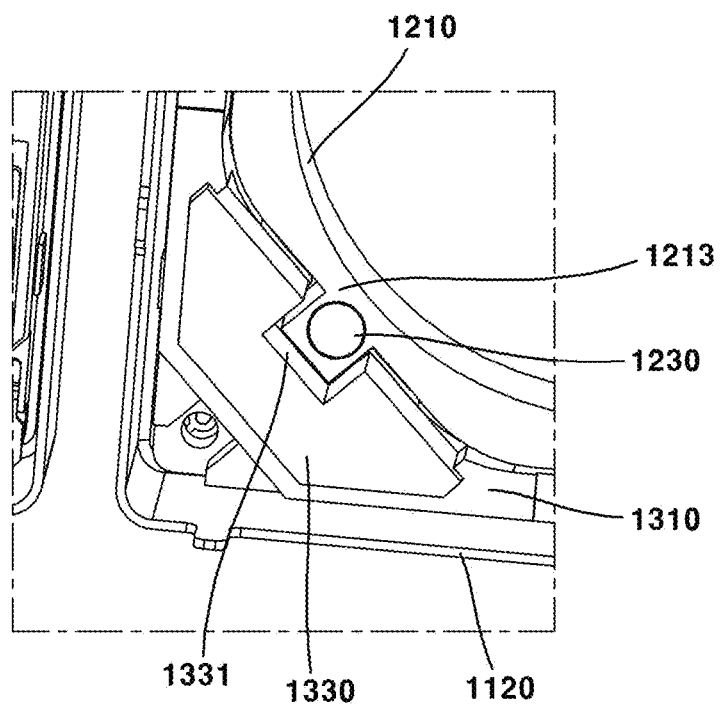
FIGS. 8b and 10b are bottom perspective views of a first lens driving device according to a first embodiment of the present invention, with some components omitted.
Figure 9:
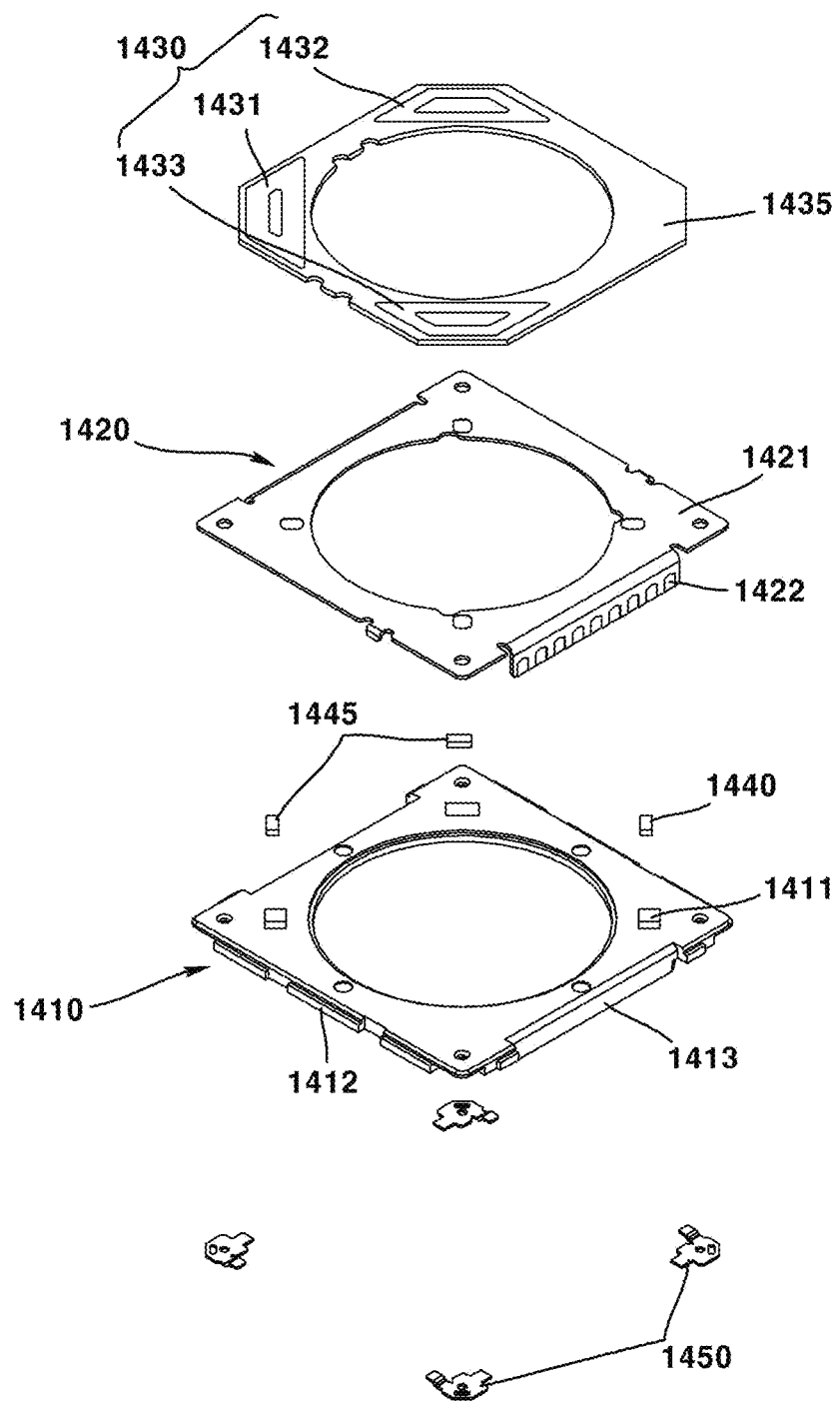
Figure 10A:
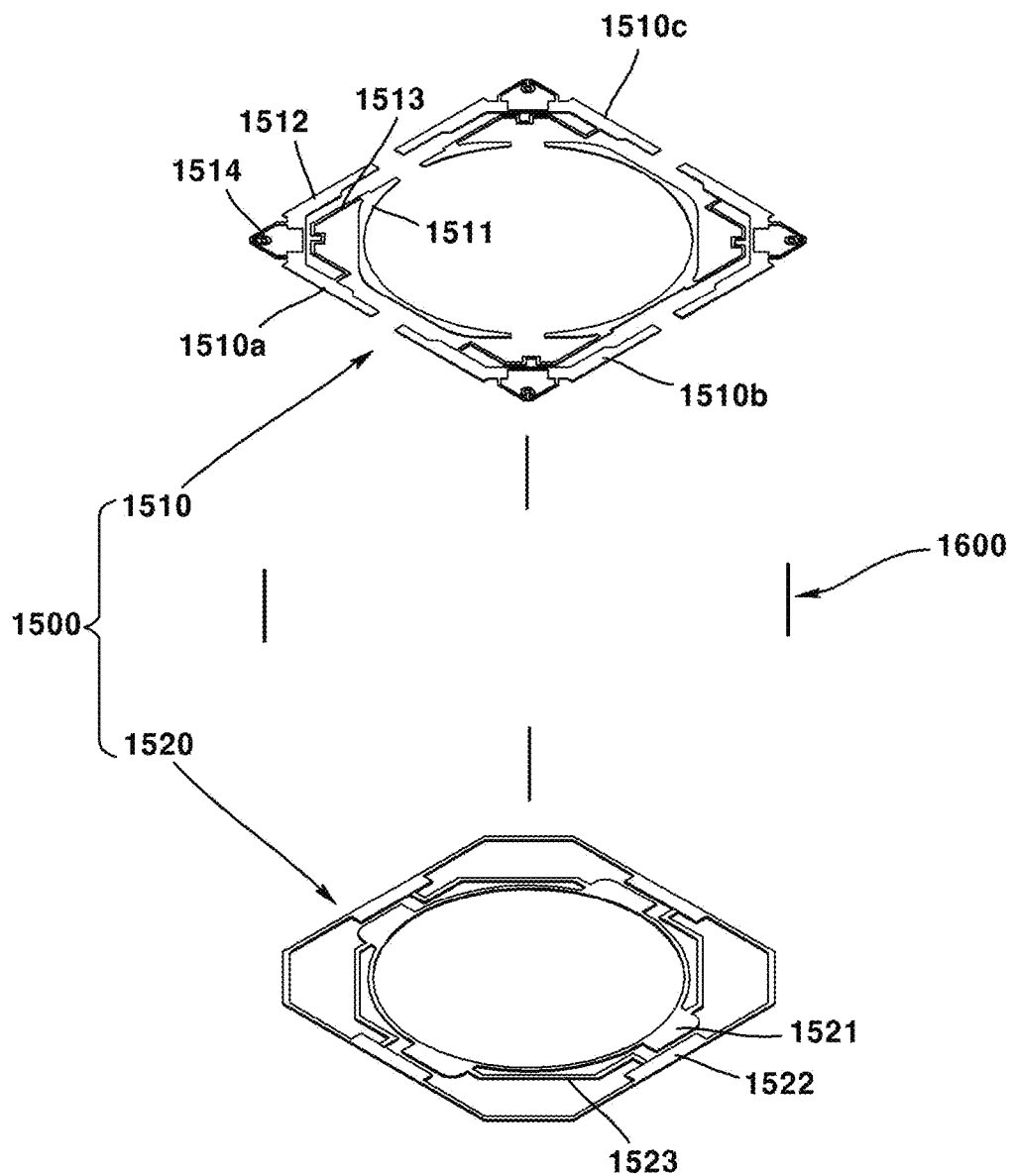
Figure 10B:
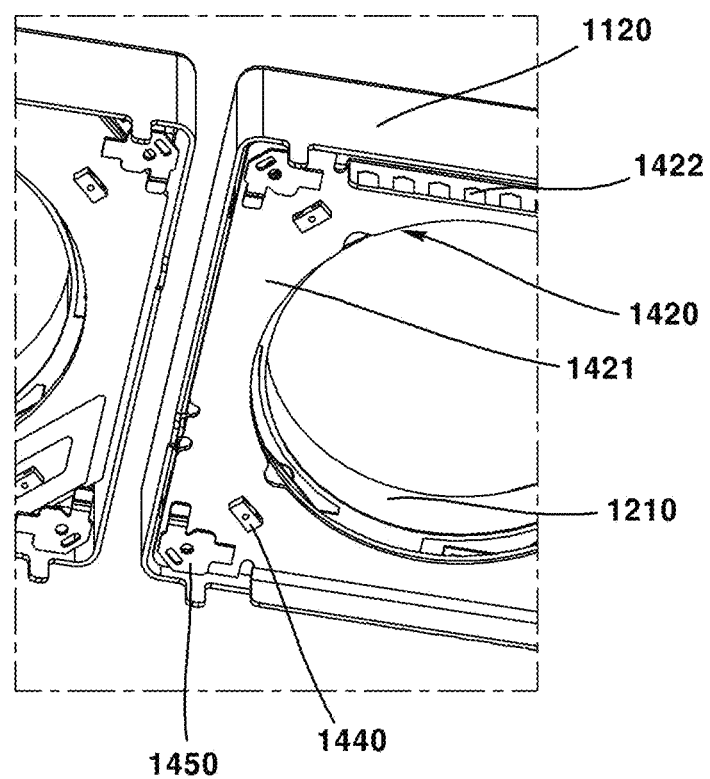
Figure 11:
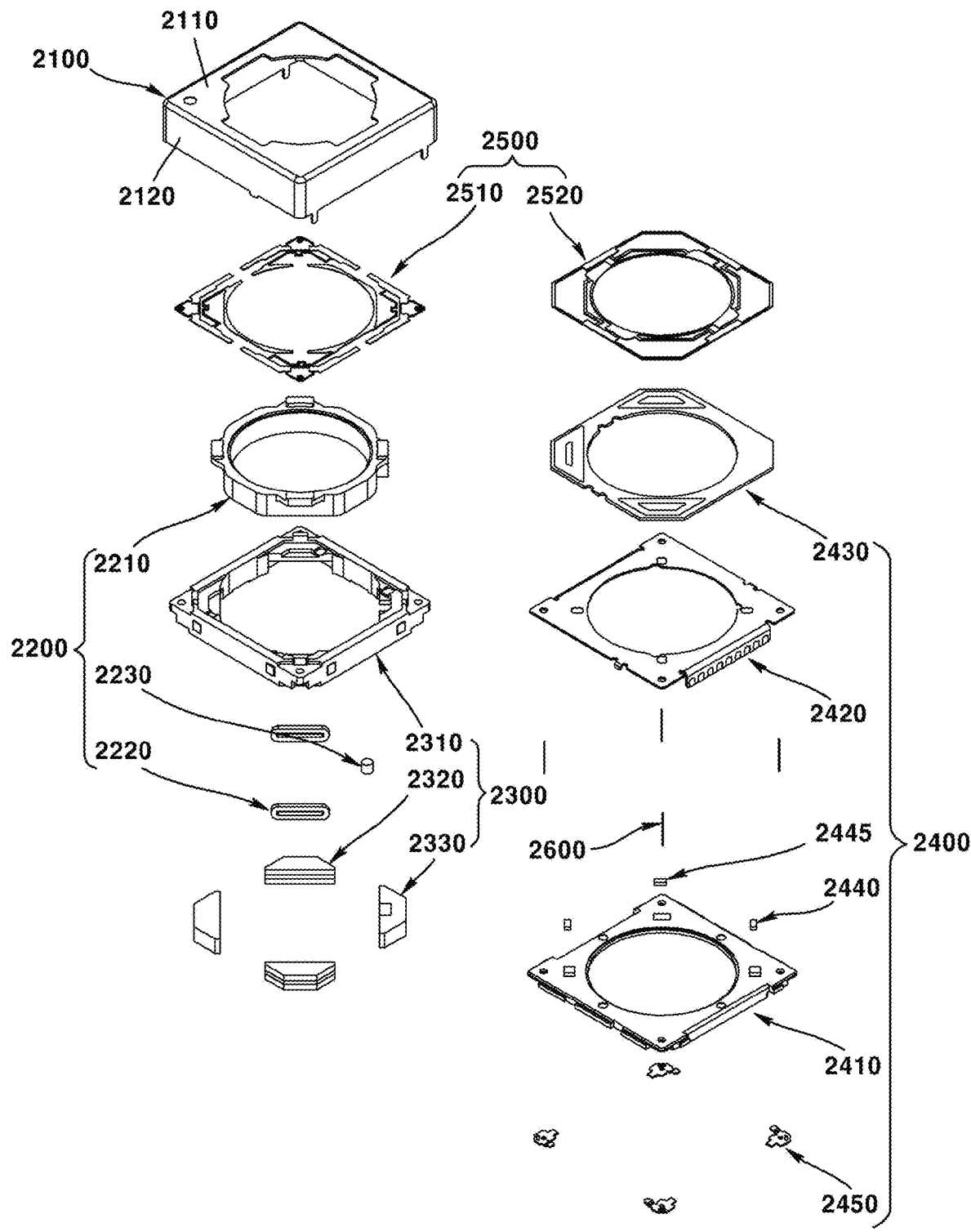
FIG. 11 is an exploded perspective view illustrating a second lens driving device according to a first embodiment of the present invention.
Figure 12:
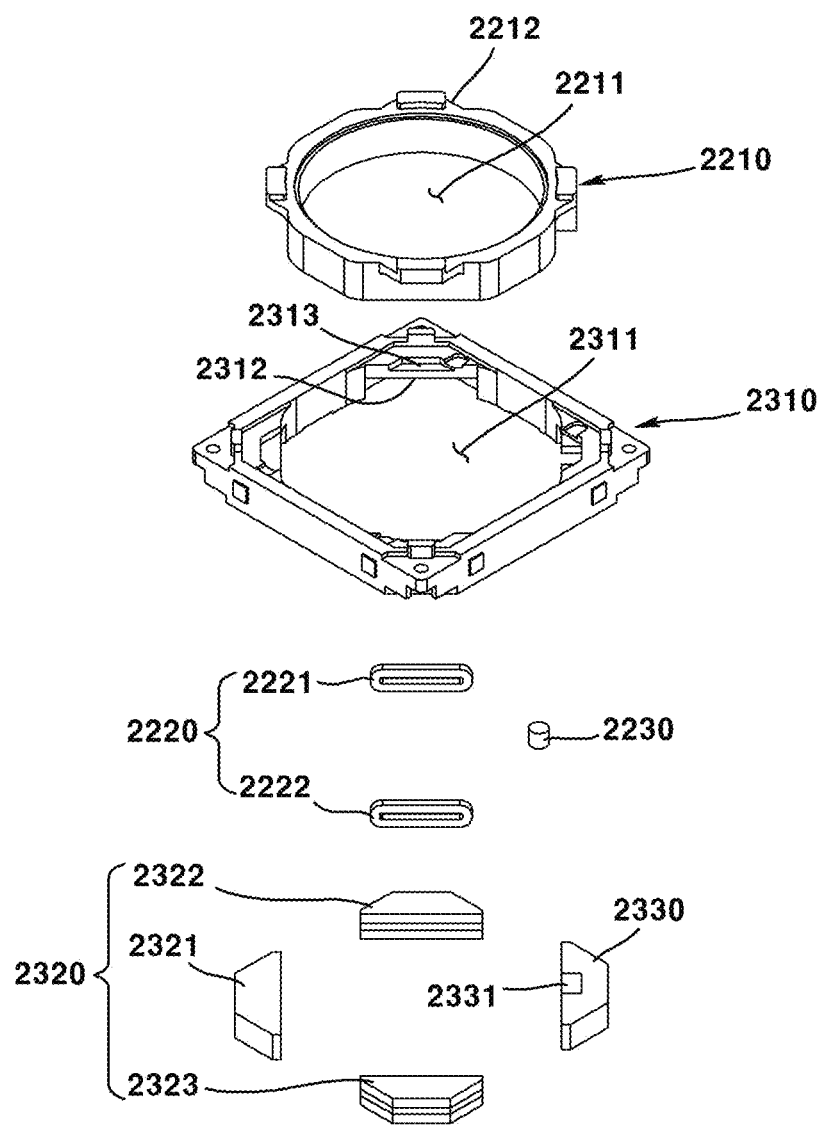
FIGS. 12 to 14 are exploded perspective views illustrating a part of a second lens driving device according to a first embodiment of the present invention.
Figure 13:
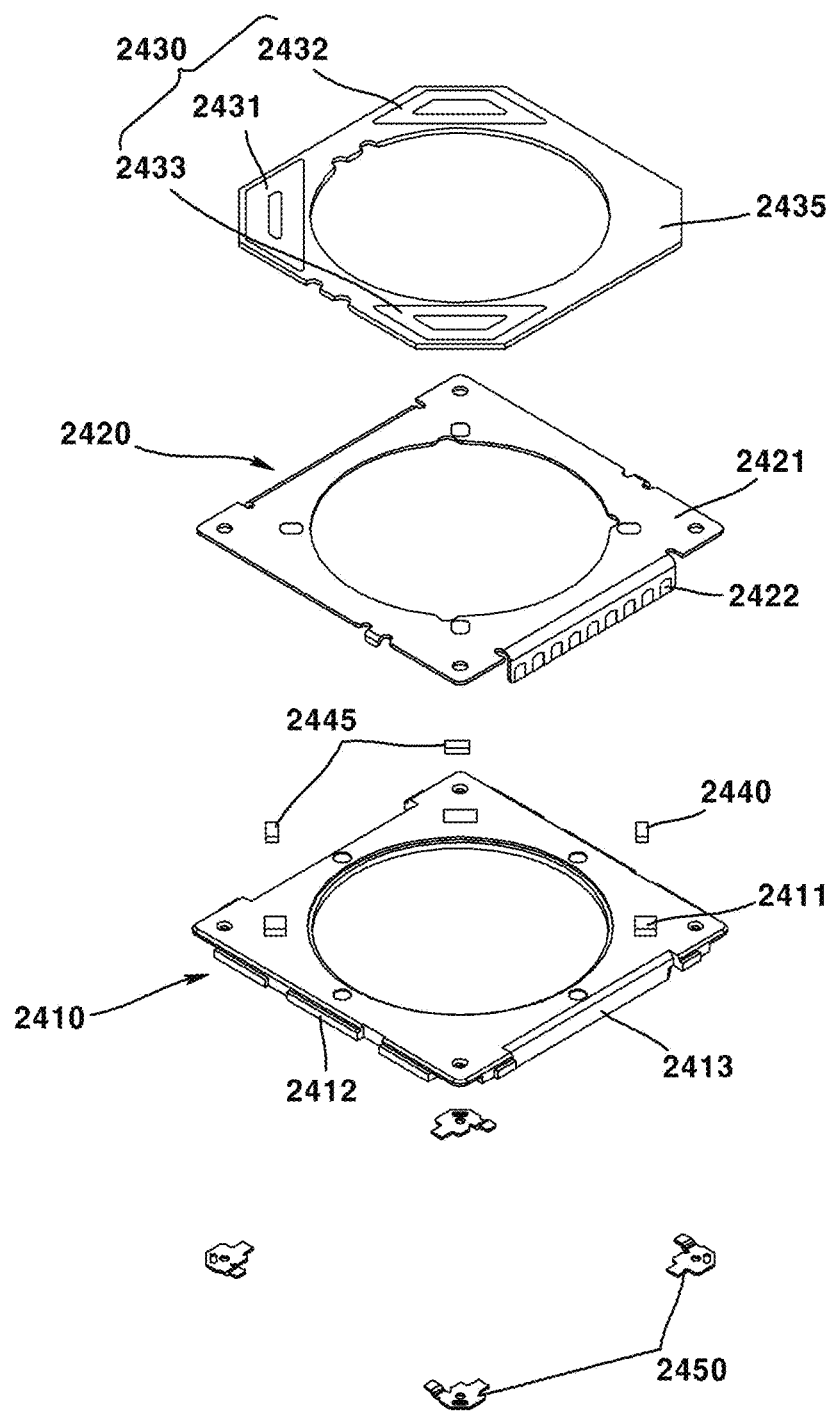
Figure 14:
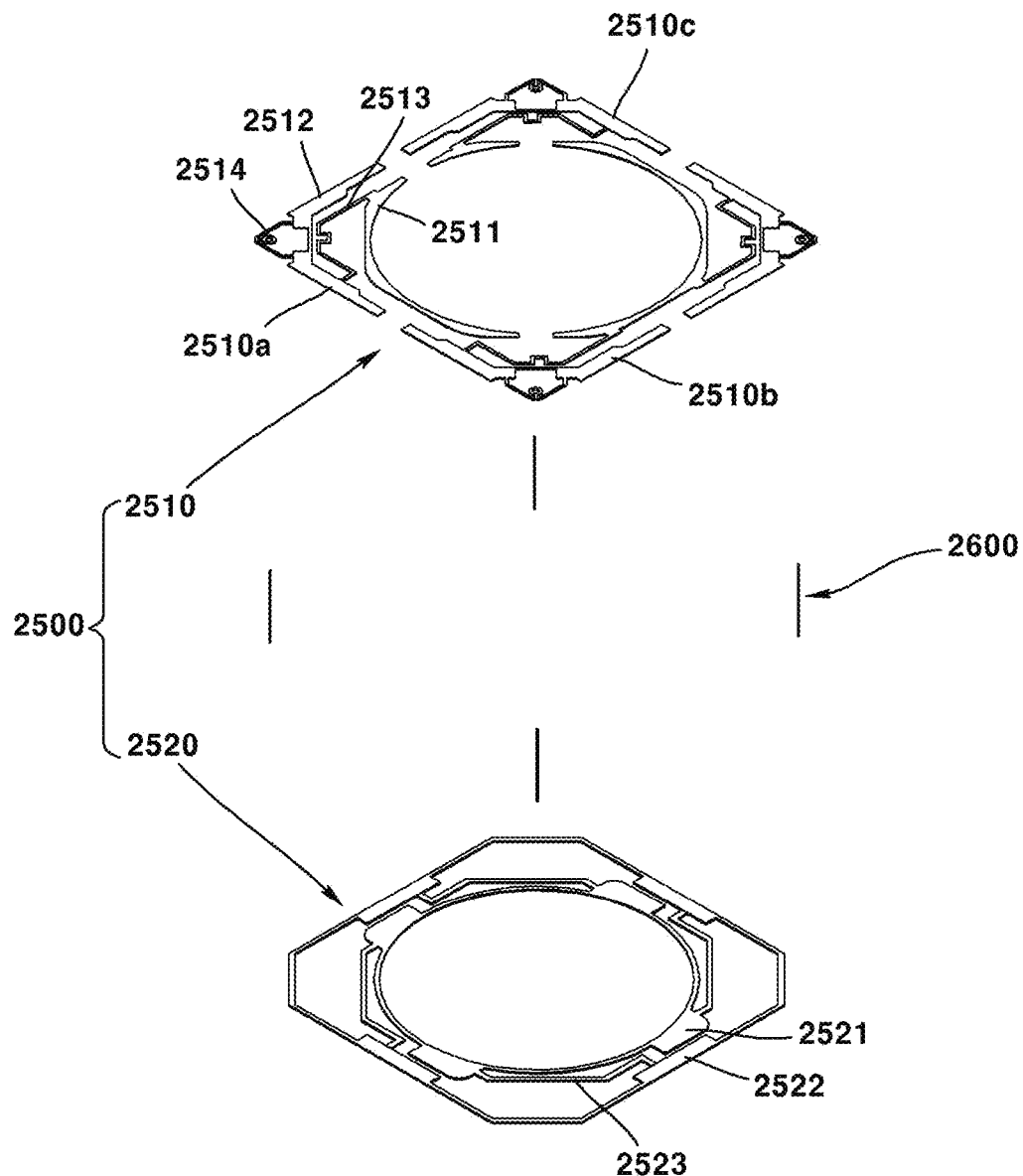
Figure 15:
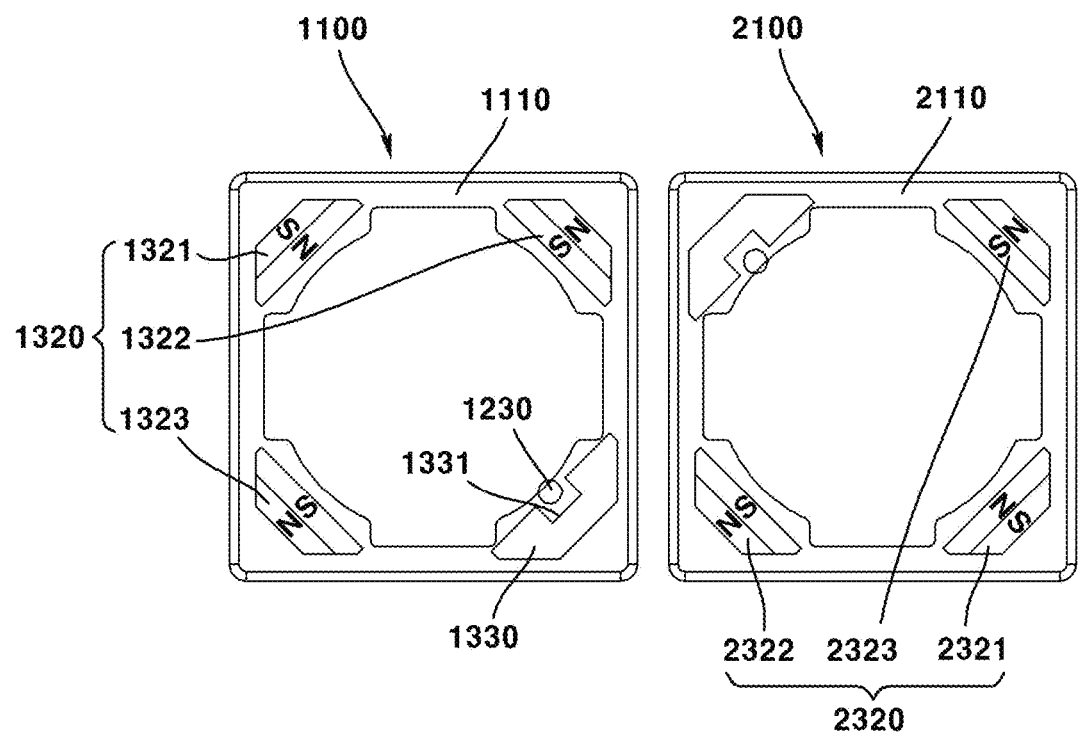
FIG. 15 is a plan perspective view illustrating a part of a dual camera module according to a first embodiment of the present invention.
Figure 16:
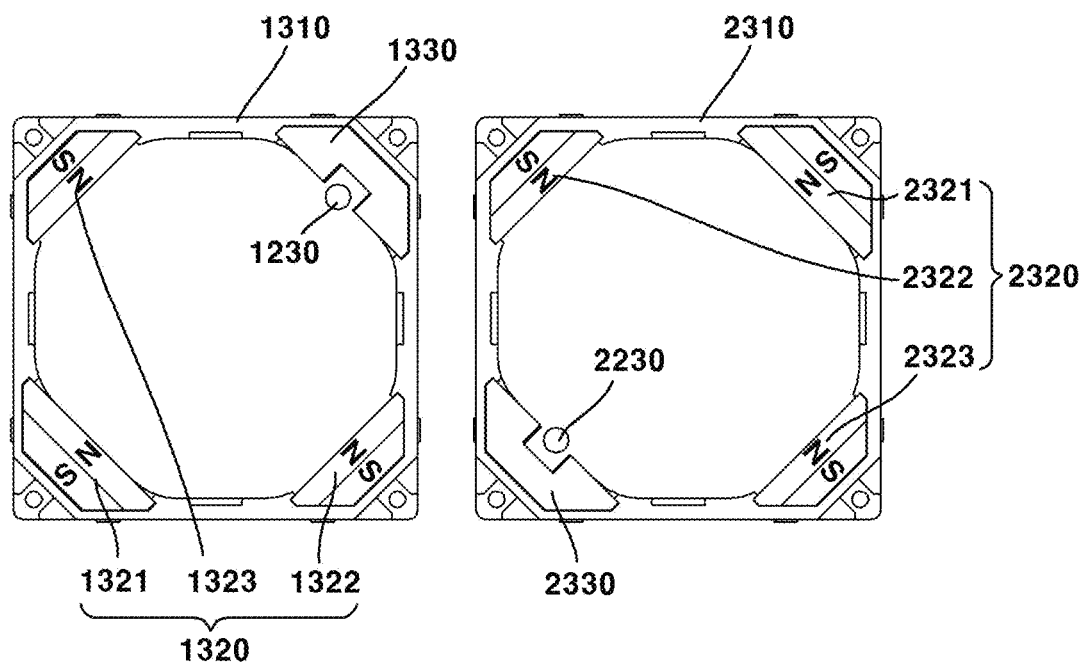
FIG. 16 is a bottom view illustrating a part of a dual camera module according to a first embodiment of the present invention.
Figure 17:
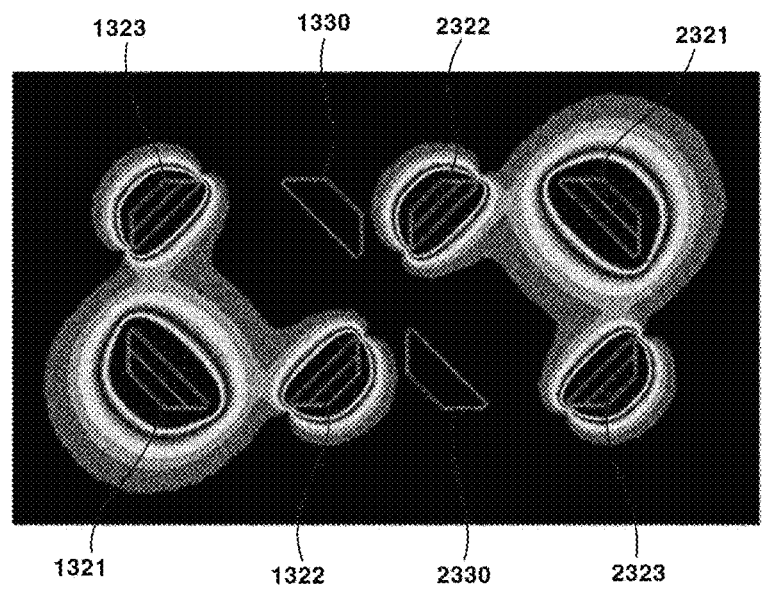
FIG. 17 is a diagram illustrating a simulation result of magnetic field interference between magnets in a dual camera module according to a first embodiment of the present invention.

FIG. 1 is a perspective view illustrating a part of a dual camera module according to a first embodiment of the present invention; FIG. 2 is a cross-sectional view taken along line A-A of FIG. 1; FIG. 3 is a cross-sectional view taken along line B-B of FIG. 1; FIG. 4a is a cross-sectional view taken along line C-C of FIG. 1; FIG. 4b is a partially enlarged view of FIG. 4a; FIG. 5 is a bottom view of the part of the dual camera module of FIG. 1 as viewed from below; FIG. 6 is a perspective view illustrating a state in which a cover is removed from the part of the dual camera module of FIG. 1; FIG. 7 is an exploded perspective view illustrating a first lens driving device according to a first embodiment of the present invention; FIGS. 8a, 9, and 10a are exploded perspective views illustrating a part of a first lens driving device according to a first embodiment of the present invention; FIGS. 8b and 10b are bottom perspective views of a first lens driving device according to a first embodiment of the present invention, with some components omitted; FIG. 11 is an exploded perspective view illustrating a second lens driving device according to a first embodiment of the present invention; FIGS. 12 to 14 are exploded perspective views illustrating a part of a second lens driving device according to a first embodiment of the present invention; FIG. 15 is a plan perspective view illustrating a part of a dual camera module according to a first embodiment of the present invention; FIG. 16 is a bottom view illustrating a part of a dual camera module according to a first embodiment of the present invention; and FIG. 17 is a diagram illustrating a simulation result of magnetic field interference between magnets in a dual camera module according to a first embodiment of the present invention.

The dual camera module may comprise a first camera module and a second camera module. In the dual camera module, the first camera module and the second camera module may be disposed adjacent to each other. The first camera module and the second camera module may be spaced apart from each other. The first camera module and the second camera module may be disposed adjacent to each other. The first camera module and the second camera module may be disposed side by side. The first camera module and the second camera module may be disposed so that one side surfaces thereof are facing each other. The side surface of the first camera module and the side surface of the second camera module facing each other may be disposed in parallel. The optical axis of the first camera module and the optical axis of the second camera module may be parallel to each other. In this embodiment, the distance between the optical axis of the first camera module and the optical axis of the second camera module may be minimized through the magnetic field interference prevention structure. The first sidewall of the first camera module may face the fifth sidewall of the second camera module.

The first camera module may be smaller than the second camera module. Conversely, the first camera module may be larger than the second camera module. In a modified embodiment, the first camera module may have the same size as the second camera module. In this case, the first camera module may be the same product as the second camera module.

The first camera module may comprise a first lens driving device 1000. The first lens driving device 1000 may be a voice coil motor (VCM). The first lens driving device 1000 may be a lens driving motor. The first lens driving device 1000 may be a lens driving actuator. In the present embodiment, the first lens driving device 1000 may comprise a CLAF OIS actuator or a CLAF OIS module. For example, a state in which a lens, an image sensor, and a printed circuit board are assembled to the first lens driving device 1000 may be understood as a first camera module.

The first lens driving device 1000 may comprise a first cover 1100. The first cover 1100 may cover a first housing 1310. The first cover 1100 may be coupled to a first base 1410. The first cover 1100 may form an inner space between it and the first base 1410. The first cover 1100 may accommodate the first housing 1310 therein. The first cover 1100 may accommodate a first bobbin 1210 therein. The first cover 1100 may form the outer appearance of the first camera module. The first cover 1100 may have a hexahedral shape with an open lower surface. The first cover 1100 may be a non-magnetic material. The first cover 1100 may be formed of a metal material. The first cover 1100 may be formed of a metal plate. The first cover 1100 may be connected to the ground portion of the printed circuit board. Through this, the first cover 1100 may be grounded. The first cover 1100 may block electromagnetic interference (EMI). In this case, the first cover 1100 may be referred to as a 'shield can' or an 'EMI shield can'.

The first cover 1100 may comprise an upper plate 1110. The first cover 1100 may comprise a side plate 1120. The first cover 1100 may comprise an upper plate 1110 and a side plate 1120 being extended downward from an outer periphery or edge of the upper plate 1110. The lower end of the side plate 1120 of the first cover 1100 may be disposed on a step 1412 of the first base 1410. The inner surface of the side plate 1120 of the first cover 1100 may be fixed to the first base 1410 by an adhesive.

The first cover 1100 may comprise a plurality of side plates. The first cover 1100 may comprise a plurality of side plates and a plurality of corners formed by the plurality of side plates. The first cover 1100 may comprise four side plates and four corners formed between the four side plates. The first cover 1100 may comprise: a first side plate; a second side plate disposed opposite to the first side plate; and a third side plate and a fourth side plate disposed opposite to each other between the first side plate and the second side plate. The first cover 1100 may comprise first to fourth corners. The first cover 1100 may comprise: a first corner; a second corner disposed opposite to the first corner; and a third and fourth corners disposed opposite to each other. However, the plurality of corners of the first cover 1100 may be called in various ways. For example, the first to fourth may be attached in a clockwise direction, 'first to fourth' may be attached in a counterclockwise direction, 'first to fourth' may be attached in a zigzag order, or 'first to fourth' may be attached arbitrarily so that they can be named as 'first to fourth' corners. That is, 'first to fourth' used in front of the corners of the first cover 1100 may be understood to be for distinguishing the corners from each other.

The first cover 1100 may comprise a first surface facing the second camera module. In this case, a first surface of the first cover 1100 may be an outer surface of the first side plate of the first cover 1100. The first cover 1100 may be spaced apart from the second cover 2100. The first surface of the first cover 1100 may be disposed parallel to a second surface of the second cover 2100. The first side plate of the first cover 1100 of the first camera module may be disposed adjacent to the second camera module. The first side plate of the first cover 1100 of the first camera module may be disposed adjacent to the first side plate of the second cover 2100 of the second camera module. The first side plate of the first cover 1100 of the first camera module may face the first side plate of the second cover 2100 of the second camera module. The first side plate of the first cover 1100 of the first camera module may be disposed parallel to the first side plate of the second cover 2100 of the second camera module.

The first lens driving device 1000 may comprise a first mover 1200. The first mover 1200 may be coupled to a lens. The first mover 1200 may be connected to a second mover 1300 through a first elastic member 1500. The first mover 1200 may move through interaction with the second mover 1300. In this case, the first mover 1200 may move integrally with the lens. Meanwhile, the first mover 1200 may move during AF driving. In this case, the first mover 1200 may be referred to as an 'AF mover'. Meanwhile, the first mover 1200 may move together with the second mover 1300 during OIS driving. The first mover 1200 may comprise a first bobbin 1210 and a first coil 1220.

The first mover 1200 may comprise a first bobbin 1210. The first bobbin 1210 may be disposed inside the first housing 1310. The first bobbin 1210 may be movably coupled to the first housing 1310. The first bobbin 1210 may move in the optical axis direction with respect to the first housing 1310.

The first bobbin 1210 may comprise a hole 1211. The hole 1211 may be a hollow hole. A lens may be coupled to the hole 1211. A thread may be formed on an inner circumferential surface of the hole 1211 of the first bobbin 1210. Or, the inner circumferential surface of the hole 1211 of the first bobbin 1210 may be formed as a curved surface without a screw thread. The first bobbin 1210 may comprise a first protrusion coupled to a first upper elastic member 1510. The first protrusion of the first bobbin 1210 may be inserted into a corresponding hole of the first upper elastic member 1510 and coupled thereto. The first bobbin 1210 may comprise a second protrusion coupled to the first lower elastic member 1520. The second protrusion of the first bobbin 1210 may be inserted into a corresponding hole of the first lower elastic member 1520 and coupled thereto. The first bobbin 1210 may comprise a third protrusion in which the first coil 1220 is disposed. The first coil 1220 may be wound around the third protrusion of the first bobbin 1210. The first bobbin 1210 may comprise a groove 1213 in which a third magnet 1230 is disposed. The third magnet 1230 may be inserted into the groove 1213 of the first bobbin 1210 from below and coupled thereto. The groove 1213 of the first bobbin 1210 may be open downward. The groove 1213 of the first bobbin 1210 may be open outward. The first bobbin 1210 may comprise a hole penetrating through the first bobbin 1210 in the optical axis direction instead of the groove 1213.

The first bobbin 1210 may comprise a stopper 1212. The stopper 1212 may be formed on a side surface of the first bobbin 1210. The stopper 1212 may be protruded toward the side direction of the first bobbin 1210. The stopper 1212 may be disposed in the second groove 1313 of the first housing 1310. The stopper 1212 may be formed in a shape corresponding to the second groove 1313 of the first housing 1310. The stopper 1212 may be caught on the first housing 1310 to inhibit downward movement and rotation of the first bobbin 1210.

The first bobbin 1210 may be coupled to any one or more of the first upper elastic member 1510, the first lower elastic member 1520, the first coil 1220, and the third magnet 1230 by an adhesive. In this case, the adhesive may be an epoxy cured by any one or more of heat, laser, and ultraviolet (UV).

The first mover 1200 may comprise a first coil 1220. The first coil 1220 may be an 'AF coil'. The first coil 1220 may be disposed on the first bobbin 1210. The first coil 1220 may be disposed in contact with the first bobbin 1210. The first coil 1220 may be disposed between the first bobbin 1210 and the first housing 1310. The first coil 1220 may be disposed on an outer periphery of the first bobbin 1210. The first coil 1220 may be directly wound on the first bobbin 1210. The first coil 1220 may face the first magnet 1320. The first coil 1220 may electromagnetically interact with the first magnet 1320. When a current is supplied to the first coil 1220 to form an electromagnetic field around the first coil 1220, the first coil 1220 may move with respect to the first magnet 1320 by electromagnetic interaction between the first coil 1220 and the first magnet 1320.

The first coil 1220 may comprise a plurality of coils. The first coil 1220 may comprise a first-first coil 1221 and a first-second coil 1222. The first-first coil 1221 may face the inner surface of the first-second magnet 1322. The first-second coil 1222 may face the inner surface of the first-third magnet 1323. The first-first coil 1221 may be disposed on a first side surface of the first bobbin 1210, and the first-second coil 1222 may be disposed on a second side surface opposite to the first side surface of the first bobbin 1210. Each of the first-first coil 1221 and the first-second coil 1222 may be formed in a ring shape, a donut shape, or an elliptical shape. At this time, each of the first-first coil 1221 and the first-second coil 1222 may be referred to as a 'glasses coil'.

The first mover 1200 may comprise a third magnet 1230. The third magnet 1230 may be a 'sensing magnet'. The third magnet 1230 may be disposed on the first bobbin 1210. The third magnet 1230 may be disposed adjacent to a first sensor 1440. The third magnet 1230 may be disposed to face the first sensor 1440. The third magnet 1230 may be inserted into the groove of the first bobbin 1210 from below. The third magnet 1230 may be a 2-pole magnetized magnet or a 4-pole magnetized magnet. The third magnet 1230 may be disposed on a side surface opposite to the first dummy member 1330 among a plurality of side surfaces of the first bobbin 1210. At least a portion of the third magnet 1230 may be disposed in the groove 1331 of the first dummy member 1330.

The first lens driving device 1000 may comprise a second mover 1300. The second mover 1300 may be movably coupled to a first stator 1400 through a second elastic member 1600. The second mover 1300 may support the first mover 1200 through an elastic member. The second mover 1300 may move the first mover 1200 or move together with the first mover 1200. The second mover 1300 may move through interaction with the first stator 1400. The second mover 1300 may move during OIS driving. In this case, the second mover 1300 may be referred to as an 'OIS mover'.

The second mover 1300 may comprise a first housing 1310. The first housing 1310 may be spaced apart from the first base 1410. The first housing 1310 may be disposed inside the first cover 1100. The first housing 1310 may be disposed between the first cover 1100 and the first bobbin 1210. The first housing 1310 may be disposed on an outer side of the first bobbin 1210. The first housing 1310 may accommodate at least a portion of the first bobbin 1210. The first housing 1310 may be formed of a material different from that of the first cover 1100. The first housing 1310 may be formed of an insulating material. The first housing 1310 may be formed of an injection-molded material. The first housing 1310 may be spaced apart from the side plate 1120 of the first cover 1100.

The first housing 1310 may comprise a hole 1311. The hole 1311 may be a hollow hole. The hole 1311 may be vertically penetrating through the center of the first housing 1310. A first bobbin 1210 may be disposed in the hole 1311 of the first housing 1310. The first housing 1310 may comprise a first protrusion coupled to the first upper elastic member 1510. The first protrusion of the first housing 1310 may be inserted into a corresponding hole of the first upper elastic member 1510 and coupled thereto. The first housing 1310 may comprise a second protrusion coupled to the first lower elastic member 1520. The second protrusion of the first housing 1310 may be inserted into a corresponding hole of the first lower elastic member 1520 and coupled thereto. The first housing 1310 may comprise a second hole through which the second elastic member 1600 passes.

The first housing 1310 may comprise a first groove 1312. The first groove 1312 may be a 'magnet accommodating groove' and/or a 'dummy member accommodating groove'. The first housing 1310 may comprise a first groove 1312 in which the first magnet 1320 and the first dummy member 1330 are disposed. The first groove 1312 of the first housing 1310 may be a groove recessed from the lower surface of the first housing 1310.

The first housing 1310 may comprise a second groove 1313. The second groove 1313 may be a stopper accommodating groove. The second groove 1313 may be formed on an upper surface of the first housing 1310. The second groove 1313 accommodates at least a portion of the stopper 1212 of the first bobbin 1210 and may be formed to be caught on the inner surface of the second groove 1313 when the first bobbin 1210 rotates. In addition, the second groove 1313 may comprise a bottom surface that faces the lower surface of the stopper 1212 of the first bobbin 1210 and being overlapped in the optical axis direction. When the first bobbin 1210 moves downward, the stopper 1212 is caught on the bottom surface of the second groove 1313, and the lower side stroke of the first bobbin 1210 may be limited.

The first housing 1310 may be coupled to any one or more of the first upper elastic member 1510, the first lower elastic member 1520, the first magnet 1320, and the first dummy member 1330 by an adhesive. At this time, the adhesive may be an epoxy cured by any one or more of heat, laser, and ultraviolet (UV).

The first housing 1310 may comprise four side portions and four corner portions disposed between the four side portions. The first housing 1310 may comprise: a first side portion disposed to correspond to the first side plate of the side plate 1120 of the first cover 1100; a second side portion disposed to correspond to the second side plate; a third side portion disposed to correspond to the third side plate; and a fourth side portion disposed to correspond to the fourth side plate.

The second mover 1300 may comprise a first magnet 1320. The first magnet 1320 may be a 'driving magnet'. The first magnet 1320 may be disposed in the first housing 1310. The first magnet 1320 may be disposed between the first bobbin 1210 and the first housing 1310. The first magnet 1320 may face the first coil 1220. The first magnet 1320 may electromagnetically interact with the first coil 1220. The first magnet 1320 may face the second coil 1430. The first magnet 1320 may electromagnetically interact with the second coil 1430. The first magnet 1320 may be commonly used for AF driving and OIS driving. The first magnet 1320 may be disposed at a corner of the first housing 1310. At this time, the first magnet 1320 may be a corner magnet in which the area of the inner surface is larger than the area of the opposite outer surface. The first magnet 1320 may be disposed at each of the remaining three corners excluding the first corner among the four corners of the first cover 1100.

The first magnet 1320 may comprise a plurality of magnets. The first magnet 1320 may comprise three magnets. The first magnet 1320 may comprise first-first to first-third magnets 1321, 1322, and 1323. The first-first magnet 1321 and the first magnet 1320 may be disposed at the second corner of the first cover 1100. The first-second magnet 1322 may be disposed at the third corner of the first cover 1100. The first-third magnet 1323 may be disposed at the fourth corner of the first cover 1100. However, hereinafter, the first-first to first-third magnets 1321, 1322, and 1323 may be referred to as 'first to third magnets'. That is, 'first to third' and 'first-first to first-third' attached to the front of the magnet may be understood to be used to distinguish between the magnets.

The first-first magnet 1321 may be used for driving the OIS in the x direction. The first-second magnet 1322 and the first-third magnet 1323 may be used for driving of AF and OIS in y direction. The first-first magnet 1321 may face the second-first coil 1431 of the second coil 1430. The first-second magnet 1322 may face the first-first coil 1221 of the first coil 1220 and may face the second-second coil 1432 of the second coil 1430. The first-third magnet 1323 faces the first-second coil 1222 of the first coil 1220 and face the second-third coil 1433 of the second coil 1430.

The first-first magnet 1321 may be a two-pole magnetized magnet. The first-first magnet 1321 may be a two-pole magnet. The first-first magnet 1321 may be a two-pole magnet having polarities of the inner surface and outer surface different from each other. For example, the inner surface of the first-first magnet 1321 may be an N pole, and the outer surface of the first-first magnet 1321 may be an S pole. Conversely, the inner surface of the first-first magnet 1321 may be an S pole, and the outer surface of the first-first magnet 1321 may be an N pole. However, in a modified embodiment, the first-first magnet 1321 may be a 4-pole magnet. The first-first magnet 1321 may be formed to be larger than each of the first-second magnet 1322 and the first-third magnet 1323. The first-first magnet 1321 may be formed to have a height greater than that of the first-second magnet 1322 and the first-third magnet 1323, respectively. The first-first magnet 1321 may be formed to have a greater width than each of the first-second magnet 1322 and the first-third magnet 1323. When viewed from above, the inner side polarity of the first-first magnet 1321 may be different from the inner side polarity of the first-second magnet 1322 and the first-third magnet 1323. When viewed from below, the inner side polarity of the first-first magnet 1321 may be the same as the inner side polarity of the first-second magnet 1322 and the first-third magnet 1323. The polarity of the inner side of the first-first magnet 1321 may be the same in the up and down directions. The polarity of the inner side of the first-first magnet 1321 and the second-first magnet 2321 may be the same.

The first-second magnet 1322 and the first-third magnet 1323 may be 4-pole magnetized magnets. The first-second magnet 1322 and the first-third magnet 1323 may be four-pole magnets. The 4-pole magnetized magnet may comprise a neutral portion disposed at a central portion thereof in a horizontal direction. Here, the neutral portion may be a void. The first-second magnet 1322 and the first-third magnet 1323 may be positively magnetized. As the first-second magnet 1322 and the first-third magnet 1323 are positively magnetized, the AF electromagnetic force may be maximized. Each of the first-second magnet 1322 and the first-third magnet 1323 may be four-pole magnets in which the upper portion of the inner surface has a different polarity from the lower portion of the inner surface and the upper portion of the outer surface, and the polarity is the same as that of the lower portion of the outer surface. The upper portion of the inner surface and the lower portion of the outer surface of the first-second magnet 1322 are N poles, and the lower portion of the inner surface and the upper portion of the outer surface of the first-second magnet 1322 may be S poles. Conversely, the upper portion of the inner surface and the lower portion of the outer surface of the first-second magnet 1322 are S poles, and the lower portion of the inner surface and upper portions of the outer surface of the first-second magnet 1322 may be N poles. The upper portion of the inner surface and the lower portion of the outer surface of the first-third magnet 1323 are N poles, and the lower portion of the inner surface and upper portions of the outer surface of the first-third magnet 1323 may be S poles. Conversely, the upper portion of the inner surface and the lower portion of the outer surface of the first-third magnet 1323 are S poles, and the lower portion of the inner surface and upper portions of the outer surface of the first-third magnet 1323 may be N poles. The polarity of the inner side of the first-second magnet 1322 and the first-third magnet 1323 may be different in the up and down directions.

The second mover 1300 may comprise a first dummy member 1330. The first dummy member 1330 may be disposed at a first corner adjacent to the first surface among the four corners of the first cover 1100. The weight of the first dummy member 1330 may correspond to the weight of the first-first magnet 1321. However, the first dummy member 1330 may have a weight smaller than the weight of the first-first magnet 1321. Or, the first dummy member 1330 may have a weight greater than that of the first-first magnet 1321. The first dummy member 1330 may be within 80% of the weight of the first-first magnet 1321 to 120% of the weight of the first-first magnet 1321. If the weight of the first dummy member 1330 is less than the lower limit or more than the upper limit of the aforementioned numerical value, weight balancing of the OIS driving unit may collapse.

The first dummy member 1330 may be a non-magnetic material. The first dummy member 1330 may comprise a non-magnetic material. The magnetic strength of the first dummy member 1330 may be weaker than that of the first-first magnet 1321. The first dummy member 1330 may be disposed at the opposite side of the first-first magnet 1321 to adjust the center of gravity. The first dummy member 1330 may use 95% or more of tungsten as a material thereof. That is, the first dummy member 1330 may be a tungsten alloy. For example, the specific gravity of the first dummy member 1330 may be 18000 or more. The first dummy member 1330 may be disposed at a position symmetrical to the first-first magnet 1321 with respect to the central axis of the first housing 1310. At this time, the central axis of the first housing 1310 may correspond to the optical axis. The first dummy member 1330 may have a thickness corresponding to that of the first-first magnet 1321 in a direction perpendicular to the optical axis.

The first dummy member 1330 may comprise a groove 1331. The groove 1331 may be formed on an inner surface of the first dummy member 1330. The groove 1331 may be formed to be larger than the third magnet 1230. At least a portion of the third magnet 1230 may be accommodated in the groove 1331.

The first dummy member 1330 may be adjacent to the sixth magnet disposed at the seventh corner of the second cover 2100. The first dummy member 1330 may be disposed on a same straight line as a first magnet disposed in the first corner of the first cover 1100, a fifth magnet disposed at the second corner of the second cover 2100, and a sixth magnet disposed at the third corner of the second cover 2100. At this time, the same straight line may be a virtual straight line. In addition, the virtual straight line may be parallel to a vertical virtual straight line passing through the first optical axis of the first camera module and the second optical axis of the second camera module. In addition, the virtual straight line may be parallel to a direction directing from the first optical axis toward the second optical axis.

The first dummy member 1330 may be disposed between the first magnet disposed at the first corner of the first cover 1100 and the sixth magnet disposed at the third corner of the second cover 2100. The first dummy member 1330 and the second dummy member 2330 may be disposed on a diagonal line with each other. The weight of the first dummy member 1330 may be the same as the weight of the first-first magnet 1321. The weight of the first dummy member 1330 may be substantially the same as the weight of the first-first magnet 1321. The sum of the weight of the first dummy member 1330 and the weight of the third magnet 1230 may be equal to the weight of the first-first magnet 1321. The first dummy member 1330 may be disposed at the opposite side of the second dummy member 2330 with respect to a virtual plane connecting the optical axis of the first camera module and the optical axis of the second camera module. The first dummy member 1330 may be disposed at the opposite side of the second dummy member 2330 with respect to a virtual line connecting the optical axis of the first camera module and the optical axis of the second camera module when viewed from the upper surface. The virtual line connecting the first dummy member 1330 and the second dummy member 2330 may be disposed between the first bobbin 1210 and the second bobbin 2210.

The first lens driving device 1000 may comprise a first stator 1400. The first stator 1400 may be disposed below the first and second movers 1200 and 1300. The first stator 1400 may movably support the second mover 1300. The first stator 1400 may move the second mover 1300. At this time, the first mover 1200 may also move together with the second mover 1300.

The first stator 1400 may comprise a first base 1410. The first base 1410 may be disposed below the first housing 1310. The first base 1410 may be disposed below the first bobbin 1210. The first base 1410 may be spaced apart from the first housing 1310 and the first bobbin 1210. The first base 1410 may be disposed below the first substrate 1420. The first base 1410 may be coupled to the first cover 1100. The first base 1410 may be disposed on a printed circuit board. The first base 1410 may be disposed between the first housing 1310 and the printed circuit board.

The first base 1410 may comprise a hole 1411. The hole 1411 may be a sensor accommodating hole. The hole 1411 may penetrate through the first base 1410 in the optical axis direction. A first sensor 1440 and a third sensor 1445 may be disposed in the hole 1411. The hole 1411 may be formed to have a size and number corresponding to those of the first sensor 1440 and the third sensor 1445. In a modified embodiment, the hole 1411 may be formed as a groove. In this case, the groove may be formed on an upper surface of the first base 1410.

The first base 1410 may comprise a step 1412. The step 1412 may be formed on a side surface of the first base 1410. The step 1412 may be formed on an outer circumferential surface of the first base 1410. The step 1412 may be formed as the lower portion of the side surface of the first base 1410 is being protruded. The lower end of the side plate 1120 of the first cover 1100 may be disposed in the step 1412.

The first base 1410 may comprise a first groove 1413. The first groove 1413 may be a terminal unit accommodating groove. The first groove 1413 may be formed on a side surface of the first base 1410. A terminal unit 1422 of the first substrate 1420 may be disposed in the first groove 1413. The first groove 1413 may be formed to have a width corresponding to the width of the first substrate 1420. The first groove 1413 may be formed on two side surfaces of the first base 1410 that are being disposed at the opposite side surfaces of the plurality of side surfaces, respectively.

The first base 1410 may comprise a second groove 1414. The second groove 1414 may be formed on a lower surface of the first base 1410. A protruded portion of the upper surface of the sensor base may be formed in the second groove 1414. Or, in a structure in which the sensor base is omitted or the first base 1410 and the sensor base are integrally formed, the image sensor may be disposed in a space formed between the printed circuit board and the first base 1410 by the second groove 1414.

The first base 1410 may comprise a hollow hole. The hollow hole may be formed in the central portion of the first base 1410. The hollow hole may penetrate through the first base 1410 in an optical axis direction. The hollow hole may be formed between the lens and the image sensor.

The first stator 1400 may comprise a first substrate 1420. The first substrate 1420 may be disposed on the first base 1410. The first substrate 1420 may be disposed on an upper surface of the first base 1410. The first substrate 1420 may be disposed between the first housing 1310 and the first base 1410. A second elastic member 1600 may be coupled to the first substrate 1420. The first substrate 1420 may supply power to the second coil 1430. The first substrate 1420 may be coupled to a substrate part 1435. The first substrate 1420 may be coupled to the second coil 1430. The first substrate 1420 may be coupled with a printed circuit board disposed on a lower side of the first base 1410. The first substrate 1420 may comprise a flexible printed circuit board (FPCB). The first substrate 1420 may be partially bent.

The first substrate 1420 may comprise a body part 1421. The body part 1421 may be disposed on an upper surface of the first base 1410. The first substrate 1420 may comprise a first hole formed in the central portion of the body part 1421. The first hole may be formed between the lens and the image sensor. The first substrate 1420 may comprise a second hole. The second hole may penetrate through the first substrate 1420 in a vertical direction. The wire of the second elastic member 1600 may penetrate through the second hole of the first substrate 1420. The first substrate 1420 may comprise a ground portion. The ground portion may be extended from the side surface of the body part 1421 and be bent. The ground portion may be disposed on a side surface of the first base 1410 to be in contact with the inner surface of the side plate 1120 of the first cover 1100. Through this, the first cover 1100 may be electrically connected to the first substrate 1420 and grounded.

The first substrate 1420 may comprise a terminal unit 1422. The terminal unit 1422 may be bent downward from the body part 1421 to be extended. The terminal unit 1422 may be disposed on two opposite side surfaces of the four side surfaces of the first substrate 1420. A terminal may be disposed on an outer surface of the terminal unit 1422. The terminal may comprise a plurality of terminals. The terminal of the first substrate 1420 may be coupled to the terminal of the printed circuit board by soldering.

The first stator 1400 may comprise a second coil 1430. The second coil 1430 may be an 'OIS coil'. The second coil 1430 may be disposed on the first base 1410. The second coil 1430 may be formed on the substrate part 1435. The second coil 1430 may be disposed on the first substrate 1420. The second coil 1430 may face the first magnet 1320. The second coil 1430 may electromagnetically interact with the first magnet 1320. In this case, when a current is supplied to the second coil 1430 to form a magnetic field around the second coil 1430, the first magnet 1320 may move with respect to the second coil 1430 by electromagnetic interaction between the second coil 1430 and the first magnet 1320. The second coil 1430 may move the first housing 1310 and the first bobbin 1210 in a direction perpendicular to the optical axis with respect to the first base 1410 through electromagnetic interaction with the first magnet 1320. The second coil 1430 may be a fine pattern coil (FP coil) integrally formed with the substrate part 1435.

The first substrate 1420 may comprise a second coil 1430. That is, the second coil 1430 may be one configuration of the first substrate 1420. However, the second coil 1430 may be disposed on a substrate part 1435 separate from the first substrate 1420.

The second coil 1430 may comprise a plurality of coils. The second coil 1430 may comprise three coils. The second coil 1430 may comprise second-first to second-third coils 1431, 1432, and 1433. The second-first coil 1431 may face a lower surface of the first-first magnet 1321. The second-second coil 1432 may face a lower surface of the first-second magnet 1322. The second-third coil 1433 may face the lower surface of the first-third magnet 1323.

The number of turns of the second-first coil 1431 may be greater than the number of turns of the second-second coil 1432 and the second-third coil 1433. The number of turns of the second-second coil 1432 may correspond to the number of turns of the second-third coil 1433. In this embodiment, during OIS driving, the movement in x-axis direction may be performed through the second-first coil 1431 and the y-axis direction movement may be performed through the second-second coil 1432 and the second-third coil 1433. Therefore, in this embodiment, the number of turns of the second-first coil 1431 may be increased to be higher than the number of turns of the second-second coil 1432 and the second-third coil 1433 in order to compensate for insufficient driving force in the x-axis direction. For example, a ratio of the number of turns of the second-first coil 1431 to the number of turns of the second-second and second-third coils 1432 and 1433 may be 1.5:2.0 to 1:1. The ratio of the number of turns of the second-first coil 1431 to the number of turns of the second-second and second-third coils 1432 and 1433 is preferably 1:1, but may be disposed up to 1.5:2.0 due to space constraints.

The second coil 1430 may comprise a substrate part 1435. The substrate part 1435 may be disposed on the first base 1410. The substrate part 1435 may be disposed on the first substrate 1420. The substrate part 1435 may be disposed between the first magnet 1320 and the first base 1410. Here, although the substrate part 1435 is described as a configuration separate from the first substrate 1420, the substrate part 1435 may be understood as a configuration comprised on the first substrate 1420.

The substrate part 1435 may be a circuit board. The substrate part 1435 may be an FPCB. The second coil 1430 may be integrally formed with the substrate part 1435 as a fine pattern coil (FP coil). A first hole for penetrating through the substrate part 1435 in an optical axis direction may be formed in the central portion of the substrate part 1435. A second hole through which the second elastic member 1600 passes may be formed in the substrate part 1435.

The first stator 1400 may comprise a first sensor 1440. The first sensor 1440 may be a 'position sensor'. The first sensor 1440 may be disposed on the first base 1410. The first sensor 1440 may be disposed in the first housing 1310 as a modified embodiment. The first sensor 1440 may detect the third magnet 1230. The first sensor 1440 may be disposed at a position corresponding to the third magnet 1230. The first sensor 1440 may be coupled to a lower surface of the first substrate 1420. As a modified embodiment, the first sensor 1440 may be coupled to an upper surface of the first substrate 1420. The first sensor 1440 may be disposed in the hole 1411 of the first base 1410. The first sensor 1440 may be spaced apart from the first housing 1310. The first sensor 1440 may be spaced apart from the first bobbin 1210. The first sensor 1440 may be overlapped with the third magnet 1230 in an optical axis direction. The first sensor 1440 may be overlapped with the first dummy member 1330 in the optical axis direction. The first sensor 1440 may detect the position of the third magnet 1230 for AF feedback control. The first sensor 1440 may be a Hall IC, a Hall element, or a Hall sensor. The first sensor 1440 may detect a magnetic force of the third magnet 1230.

The first stator 1400 may comprise a third sensor 1445. The third sensor 1445 may be disposed between the first base 1410 and the first substrate 1420. The third sensor 1445 may detect the movement of the second mover 1300. The third sensor 1445 may detect the movement of the first housing 1310 and the first magnet 1320 by detecting the magnetic force of the first magnet 1320. The detected value detected by the third sensor 1445 may be used for OIS feedback control. The third sensor 1445 may comprise a plurality of Hall sensors. The third sensor 1445 may comprise two Hall sensors. The third sensor 1445 may comprise a first Hall sensor that detects movement in the x-axis in the horizontal direction and a second Hall sensor that senses movement in the y-axis in the horizontal direction.

The first stator 1400 may comprise a first terminal 1450. The first terminal 1450 may be disposed on a lower surface of the first base 1410. The first terminal 1450 may be disposed on a side surface of the first base 1410. The first terminal 1450 may be insert-injected into the first base 1410. That is, the first terminal 1450 may be integrally formed with the first base 1410. The first terminal 1450 may be electrically connected to the first substrate 1420. The length of the wire of the second elastic member 1600 may be secured through the first terminal 1450. In more detail, even if the distance between the first upper elastic member 1510 and the first substrate 1420 is reduced by reducing the overall height of the first camera module, since the first terminal 1450 provides additional space, the length of the wire may be further increased in the case when it is coupled to the first terminal 1450 than the case when the wire is coupled to the first substrate 1420. That is, even if the overall height of the first camera module is reduced compared to an existing one, the length of the wire can be maintained the same as the existing one. In other words, if the length of the wire is the same as compared to the existing one, the overall height of the first camera module can be reduced.

The first lens driving device 1000 may comprise a first elastic member 1500. The first elastic member 1500 may connect the first housing 1310 and the first bobbin 1210. The first elastic member 1500 may be coupled to the first bobbin 1210 and the first housing 1310. The first elastic member 1500 may elastically connect the first bobbin 1210 and the first housing 1310. The first elastic member 1500 may have elasticity at least in part. The first elastic member 1500 may elastically support the movement of the first bobbin 1210 during AF driving.

The first elastic member 1500 may comprise a first upper elastic member 1510. The first upper elastic member 1510 may connect an upper portion of the first housing 1310 and an upper portion of the first bobbin 1210. The first upper elastic member 1510 may be coupled to an upper surface of the first bobbin 1210 and an upper surface of the first housing 1310. The first upper elastic member 1510 may be formed with a leaf spring.

The first upper elastic member 1510 may electrically connect the first coil 1220 and the first substrate 1420. The first upper elastic member 1510 may comprise a plurality of upper elastic units. The first upper elastic member 1510 may comprise three upper elastic units. The first upper elastic member 1510 may comprise first to third upper elastic units 1510*a*, 1510*b*, and 1510*c*. The first upper elastic unit 1510*a* may connect one wire among a plurality of wires and the first-first coil 1221. The second upper elastic unit 1510*b* may connect the first-first coil 1221 and the first-second coil 1222. The third upper elastic unit 1510*c* may connect the first-second coil 1222 to the other one wire among the plurality of wires.

The first upper elastic member 1510 may comprise an inner side portion 1511. The inner side portion 1511 may be coupled to an upper portion of the first bobbin 1210. The inner side portion 1511 may comprise a hole inserted into the first protrusion of the first bobbin 1210. The first upper elastic member 1510 may comprise an outer side portion 1512. The outer side portion 1512 may be coupled to an upper portion of the first housing 1310. The outer side portion 1512 may comprise a hole inserted into the first protrusion of the first housing 1310.

The first upper elastic member 1510 may comprise a connection portion 1513. The connection portion 1513 may connect the inner side portion 1511 and the outer side portion 1512. The connection portion 1513 may have elasticity.

The first upper elastic member 1510 may comprise a coupling portion 1514. The coupling portion 1514 may be extended from the outer side portion 1512 and may be coupled to the second elastic member 1600. The coupling portion 1514 may comprise a hole through which the wire of the second elastic member 1600 penetrates. A solder ball connecting the coupling portion 1514 and the wire may be disposed on an upper surface of the coupling portion 1514.

The first elastic member 1500 may comprise a first lower elastic member 1520. The first lower elastic member 1520 may be coupled to a lower portion of the first bobbin 1210 and a lower portion of the first housing 1310. The first lower elastic member 1520 may be coupled to a lower surface of the first bobbin 1210 and a lower surface of the first housing 1310. The first lower elastic member 1520 may be formed of a leaf spring.

The first lower elastic member 1520 may comprise an inner side portion 1521. The inner side portion 1511 may be coupled to a lower portion of the first bobbin 1210. The inner side portion 1521 may comprise a hole inserted into the second protrusion of the first bobbin 1210.

The first lower elastic member 1520 may comprise an outer side portion 1522. The outer side portion 1512 may be coupled to a lower portion of the first housing 1310. The outer side portion 1522 may comprise a hole inserted into the second protrusion of the first housing 1310.

The first lower elastic member 1520 may comprise a connection portion 1523. The connection portion 1523 may connect the inner side portion 1521 and the outer side portion 1522. The connection portion 1523 may have elasticity.

The first lens driving device 1000 may comprise a second elastic member 1600. The second elastic member 1600 may be an 'OIS support member'. The second elastic member 1600 may connect the first upper elastic member 1510 and the first substrate 1420, the substrate part 1435, or the first terminal 1450. The second elastic member 1600 may be coupled to an upper surface of the first upper elastic member 1510 and the first terminal 1450. The second elastic member 1600 may movably support the first housing 1310. The second elastic member 1600 may elastically support the first housing 1310. The second elastic member 1600 may have elasticity at least in part. The second elastic member 1600 may elastically support the movement of the first housing 1310 and the first bobbin 1210 during OIS driving. The second elastic member 1600 may connect the first substrate 1420 and the first elastic member 1500. The second elastic member 1600 may comprise a wire. One end of the wire may be coupled to the first elastic member 1500 by solder. The other end of the wire may be coupled to the first terminal 1450 by solder.

The second elastic member 1600 may comprise a plurality of wires. The second elastic member 1600 may comprise four wires. The plurality of wires may comprise four wires connecting the three upper elastic units 1510a, 1510b, and 1510c and the first substrate 1420. As a modified embodiment, the second elastic member 1600 may be formed with a leaf spring.

The first camera module may comprise a damper. The damper may be disposed in the second elastic member 1600. The damper may be disposed in the second elastic member 1600 and the first housing 1310. The damper may be disposed in the elastic member. The damper may be disposed in the elastic member and/or the second elastic member 1600 to inhibit a resonance phenomenon occurring in the elastic member and/or the second elastic member 1600.

The first camera module may comprise a printed circuit board. The printed circuit board may be a printed circuit board (PCB). The printed circuit board is formed in a plate shape and may comprise an upper surface and a lower surface. An image sensor may be disposed on the upper surface of the printed circuit board. A lens driving device may be disposed on the upper surface of the printed circuit board. The printed circuit board may be electrically connected to the image sensor. The printed circuit board may be electrically connected to the lens driving device. The printed circuit board may comprise a terminal on the terminal unit 1422 of the first board 1420 and a terminal coupled by soldering. A connector connected to the outside may be disposed on the printed circuit board.

The first camera module may comprise an image sensor. The image sensor may be disposed on a printed circuit board. The image sensor may be electrically connected to the printed circuit board. For example, the image sensor may be coupled to a printed circuit board by surface mounting technology (SMT). As another example, the image sensor may be coupled to a printed circuit board by flip chip technology. The image sensor may be disposed so that the lens and the optical axis coincide. That is, the optical axis of the image sensor and the optical axis of the lens may be aligned. The image sensor may convert light irradiated to an effective image region of the image sensor into an electrical signal. The image sensor may be any one of a charge coupled device (CCD), a metal oxide semi-conductor (MOS), a CPD, and a CID.

The first camera module may comprise a lens module. The lens module may be coupled to the first bobbin 1210. The lens module may be screw-coupled to the first bobbin 1210. The lens module may be fixed to the first bobbin 1210 by an adhesive. The lens module may comprise a barrel and a lens coupled to the inside of the barrel. The lens may comprise a plurality of lenses. The lens may comprise 5 or 6 lenses.

The first camera module may comprise a filter. The filter may comprise an infrared filter. The infrared filter may block light in an infrared wavelength band among light passing through the lens. Or, the infrared filter may absorb light in an infrared wavelength band among light passing through the lens. A filter may be disposed between the lens and the image sensor. The filter may be disposed in the first base 1410. Or, in a modified embodiment, the filter may be disposed in the sensor base disposed between the first base 1410 and the printed circuit board.

The second camera module may comprise a second lens driving device 2000. The second lens driving device 2000 may be a voice coil motor (VCM). The second lens driving device 2000 may be a lens driving motor. The second lens driving device 2000 may be a lens driving actuator. In the present embodiment, the second lens driving device 2000 may comprise a CLAF OIS actuator or a CLAF OIS module. For example, a state in which a lens, an image sensor, and a printed circuit board are assembled to the second lens driving device 2000 may be understood as a second camera module.

The second lens driving device 2000 may comprise a second cover 2100. The second cover 2100 may cover a second housing 2310. The second cover 2100 may be coupled to a second base 2410. The second cover 2100 may form an inner space between it and the second base 2410. The second cover 2100 may accommodate the second housing 2310 therein. The second cover 2100 may accommodate a second bobbin 2210 therein. The second cover 2100 may form the outer appearance of the second camera module. The second cover 2100 may have a hexahedral shape with an open lower surface. The second cover 2100 may be a non-magnetic material. The second cover 2100 may be formed of a metal material. The second cover 2100 may be formed of a metal plate. The second cover 2100 may be connected to the ground portion of the printed circuit board. Through this, the second cover 2100 may be grounded. The second cover 2100 may block electromagnetic interference (EMI). In this case, the second cover 2100 may be referred to as a 'shield can' or an 'EMI shield can'.

The second cover 2100 may comprise an upper plate 2110. The second cover 2100 may comprise a side plate 2120. The second cover 2100 may comprise an upper plate 2110 and a side plate 2120 being extended downward from an outer periphery or edge of the upper plate 2110. The lower end of the side plate 2120 of the second cover 2100 may be disposed on a step 2412 of the second base 2410. The inner surface of the side plate 2120 of the second cover 2100 may be fixed to the second base 2410 by an adhesive.

The second cover 2100 may comprise a plurality of side plates. The second cover 2100 may comprise a plurality of side plates and a plurality of corners formed by the plurality of side plates. The second cover 2100 may comprise four side plates and four corners formed between the four side plates. The second cover 2100 may comprise: a second side plate; a second side plate disposed opposite to the second side plate; and a third side plate and a fourth side plate disposed opposite to each other between the second side plate and the second side plate. The second cover 2100 may comprise second to fourth corners. The second cover 2100 may comprise: a second corner; a second corner disposed opposite to the second corner; and a third and fourth corners disposed opposite to each other. However, the plurality of corners of the second cover 2100 may be called in various ways. For example, the first to fourth may be attached in a clockwise direction, 'first to fourth' may be attached in a counterclockwise direction, 'first to fourth' may be attached in a zigzag order, or 'first to fourth' may be attached arbitrarily so that they can be named as 'first to fourth' corners. That is, 'first to fourth' used in front of the corners of the second cover 2100 may be understood to be for distinguishing the corners from each other.

The second cover 2100 may comprise a second surface facing the second camera module. In this case, a second surface of the second cover 2100 may be an outer surface of the first side plate of the second cover 2100. The second cover 2100 may be spaced apart from the first cover 1100.

The second surface of the second cover 2100 may be disposed parallel to a first surface of the first cover 1100. The first side plate of the second cover 2100 of the second camera module may be disposed adjacent to the first camera module. The first side plate of the second cover 2100 of the second camera module may be disposed adjacent to the first side plate of the first cover 1100 of the first camera module. The first side plate of the second cover 2100 of the second camera module may face the first side plate of the first cover 1100 of the first camera module. The second side plate of the second cover 2100 of the second camera module may be disposed parallel to the first side plate of the first cover 1100 of the first camera module.

The second lens driving device 2000 may comprise a third mover 2200. The third mover 2200 may be coupled to the lens. The third mover 2200 may be connected to the fourth mover 2300 through a third elastic member 2500. The third mover 2200 may move through interaction with the fourth mover 2300. At this time, the third mover 2200 may move integrally with the lens. Meanwhile, the third mover 2200 may move during AF driving. At this time, the third mover 2200 may be referred to as an 'AF mover'. Meanwhile, the third mover 2200 may move together with the fourth mover 2300 during OIS driving. The third mover 2200 may comprise a second bobbin 2210 and a third coil 2220.

The third mover 2200 may comprise a second bobbin 2210. The second bobbin 2210 may be disposed inside the second housing 2310. The second bobbin 2210 may be movably coupled to the second housing 2310. The second bobbin 2210 may move in the optical axis direction with respect to the second housing 2310.

The second bobbin 2210 may comprise a hole 2211. The hole 2211 may be a hollow hole. A lens may be coupled to the hole 2211. A thread may be formed on an inner circumferential surface of the hole 2211 of the second bobbin 2210. Or, the inner circumferential surface of the hole 2211 of the second bobbin 2210 may be formed as a curved surface without a screw thread. The second bobbin 2210 may comprise a second protrusion coupled to a second upper elastic member 2510. The second protrusion of the second bobbin 2210 may be inserted into a corresponding hole of the second upper elastic member 2510 and coupled thereto. The second bobbin 2210 may comprise a second protrusion coupled to the second lower elastic member 2520. The second protrusion of the second bobbin 2210 may be inserted into a corresponding hole of the second lower elastic member 2520 and coupled thereto. The second bobbin 2210 may comprise a third protrusion in which the second coil 2220 is disposed. The third coil 2220 may be wound around the third protrusion of the second bobbin 2210. The second bobbin 2210 may comprise a groove in which a fourth magnet 2230 is disposed. The fourth magnet 2230 may be inserted into the groove of the second bobbin 2210 from below and coupled thereto. The groove of the second bobbin 2210 may be open downward. The groove of the second bobbin 2210 may be open outward. The second bobbin 2210 may comprise a hole penetrating through the second bobbin 2210 in the optical axis direction instead of the groove.

The second bobbin 2210 may comprise a stopper 2212. The stopper 2212 may be formed on a side surface of the second bobbin 2210. The stopper 2212 may be protruded toward the side direction of the second bobbin 2210. The stopper 2212 may be disposed in the second groove 2313 of the second housing 2310. The stopper 2212 may be formed in a shape corresponding to the second groove 2313 of the second housing 2310. The stopper 2212 may be caught on the second housing 2310 to inhibit downward movement and rotation of the second bobbin 2210.

The second housing 2310 may be coupled to any one or more of the second upper elastic member 2510, the second lower elastic member 2520, the third coil 2220, and the fourth magnet 2230 by an adhesive. At this time, the adhesive may be an epoxy cured by any one or more of heat, laser, and ultraviolet (UV).

The third mover 2200 may comprise a third coil 2220. The third coil 2220 may be an 'AF coil'. The third coil 2220 may be disposed on the second bobbin 2210. The third coil 2220 may be disposed in contact with the second bobbin 2210. The third coil 2220 may be disposed between the second bobbin 2210 and the second housing 2310. The third coil 2220 may be disposed on the outer periphery of the second bobbin 2210. The third coil 2220 may be directly wound on the second bobbin 2210. The third coil 2220 may face the second magnet 2320. The third coil 2220 may electromagnetically interact with the second magnet 2320. When a current is supplied to the third coil 2220 to form an electromagnetic field around the third coil 2220, the third coil 2220 may move against the second magnet 2320 by electromagnetic interaction between the third coil 2220 and the second magnet 2320.

The third coil 2220 may comprise a plurality of coils. The third coil 2220 may comprise a third-first coil 2221 and a third-second coil 2222. The third-first coil 2221 may face the inner surface of the second-second magnet 2322. The third-second coil 2222 may face the inner surface of the second-third magnet 2323. The third-first coil 2221 is disposed on the first side surface of the second bobbin 2210, and the third-second coil 2222 may be disposed on the second side surface opposite to the first side surface of the second bobbin 2210. Each of the third-first coil 2221 and the third-second coil 2222 may be formed in a ring shape, a donut shape, or an elliptical shape. At this time, each of the third-first coil 2221 and the third-second coil 2222 may be referred to as a 'glasses coil'.

The third mover 2200 may comprise a fourth magnet 2230. The fourth magnet 2230 may be a 'sensing magnet'. The fourth magnet 2230 may be disposed on the second bobbin 2210. The fourth magnet 2230 may be disposed adjacent to the second sensor 2440. The fourth magnet 2230 may be disposed to face the second sensor 2440. The fourth magnet 2230 may be inserted into the groove of the second bobbin 2210 from below. The fourth magnet 2230 may be a 2-pole magnetized magnet or a 4-pole magnetized magnet. The fourth magnet 2230 may be disposed on a side surface opposite to the second dummy member 2330 among a plurality of side surfaces of the second bobbin 2210. At least a portion of the fourth magnet 2230 may be disposed in a groove 2331 of the second dummy member 2330.

The second lens driving device 2000 may comprise a fourth mover 2300. The fourth mover 2300 may be movably coupled to the second stator 2400 through the fourth elastic member 2600. The fourth movable member 2300 may support the third movable member 2200 through an elastic member. The fourth mover 2300 may move the third mover 2200 or may move together with the third mover 2200. The fourth mover 2300 may move through interaction with the second stator 2400. The fourth mover 2300 may move during OIS driving. At this time, the fourth mover 2300 may be referred to as an 'OIS mover'.

The fourth mover 2300 may comprise a second housing 2310. The second housing 2310 may be spaced apart from the second base 2410. The second housing 2310 may be disposed inside the second cover 2100. The second housing 2310 may be disposed between the second cover 2100 and the second bobbin 2210. The second housing 2310 may be disposed on an outer side of the second bobbin 2210. The second housing 2310 may accommodate at least a portion of the second bobbin 2210. The second housing 2310 may be formed of a material different from that of the second cover 2100. The second housing 2310 may be formed of an insulating material. The second housing 2310 may be formed of an injection-molded material. The second housing 2310 may be spaced apart from the side plate 2120 of the second cover 2100.

The second housing 2310 may comprise a hole 2311. The hole 2311 may be a hollow hole. The hole 2311 may be penetrating through the central portion of the second housing 2310 in a vertical direction. A second bobbin 2210 may be disposed in the hole 2311 of the second housing 2310. The second housing 2310 may comprise a first protrusion coupled to the second upper elastic member 2510. The first protrusion of the second housing 2310 may be inserted into a corresponding hole of the second upper elastic member 2510 and coupled thereto. The second housing 2310 may comprise a second protrusion coupled to the second lower elastic member 2520. The second protrusion of the second housing 2310 may be inserted into a corresponding hole of the second lower elastic member 2520 and coupled thereto. The second housing 2310 may comprise a second hole through which the fourth elastic member 2600 passes.

The second housing 2310 may comprise a first groove 2312. The first groove 2312 may be a 'magnet accommodating groove' and/or a 'dummy member accommodating groove'. The second housing 2310 may comprise a first groove 2312 in which the second magnet 2320 and the second dummy member 2330 are disposed. The first groove 2312 of the second housing 2310 may be a groove recessed from the lower surface of the second housing 2310.

The second housing 2310 may comprise a second groove 2313. The second groove 2313 may be a stopper accommodating groove. The second groove 2313 may be formed on an upper surface of the second housing 2310. In addition, the second groove 2313 may comprise a bottom surface that faces the lower surface of the stopper 2212 of the second bobbin 2210 and being overlapped in the optical axis direction. When the second bobbin 2210 moves downward, the stopper 2212 is caught on the bottom surface of the second groove 2313, and the lower side stroke of the second bobbin 2210 may be limited.

The second housing 2310 may be coupled to any one or more of the second upper elastic member 2510, the second lower elastic member 2520, the second magnet 2320, and the second dummy member 2330 by an adhesive. At this time, the adhesive may be an epoxy that is cured by any one or more of heat, laser, and ultraviolet (UV) light.

The second housing 2310 may comprise four side portions and four corner portions disposed between the four side portions. The second housing 2310 may comprise: a first side portion disposed to correspond to the first side plate of the side plate 2120 of the second cover 2100; a second side portion disposed to correspond to the second side plate; a third side portion disposed to correspond to the third side plate; and a fourth side portion disposed to correspond to the fourth side plate.

The fourth mover 2300 may comprise a second magnet 2320. The second magnet 2320 may be a 'driving magnet'. The second magnet 2320 may be disposed in the second housing 2310. The second magnet 2320 may be disposed between the second bobbin 2210 and the second housing 2310. The second magnet 2320 may face the third coil 2220.

The second magnet 2320 may electromagnetically interact with the third coil 2220. The second magnet 2320 may face the fourth coil 2430. The second magnet 2320 may electromagnetically interact with the fourth coil 2430. The second magnet 2320 may be commonly used for AF driving and OIS driving. The second magnet 2320 may be disposed at a corner of the second housing 2310. At this time, the second magnet 2320 may be a corner magnet in which the area of the inner surface is larger than the area of the opposite outer surface. The second magnet 2320 may be disposed at each of the remaining three corners excluding the first corner among the four corners of the second cover 2100.

The second magnet 2320 may comprise a plurality of magnets. The second magnet 2320 may comprise three magnets. The second magnet 2320 may comprise second-first to second-third magnets 2321, 2322, and 2323. The second-first magnet 2321 and the second magnet 2320 may be disposed at the second corner of the second cover 2100. The second-second magnet 2322 may be disposed at the third corner of the second cover 2100. The second-third magnet 2323 may be disposed at the fourth corner of the second cover 2100. However, hereinafter, the second-first to second-third magnets 2321, 2322, and 2323 may be referred to as 'first to third magnets' or 'fourth to sixth magnets'. That is, 'first to sixth' and 'second-first to second-third' attached to the front of the magnet may be understood to be used to distinguish between the magnets.

The second-first magnet 2321 may be used to drive the OIS in the x direction. The second-second magnet 2322 and the second-third magnet 2323 may be used for y direction driving of AF and OIS. The second-first magnet 2321 may face the fourth-first coil 2431 of the fourth coil 2430. The second-second magnet 2322 may face the third-first coil 2221 of the third coil 2220 and may face the fourth-second coil 2432 of the fourth coil 2430. The second-third magnet 2323 may face the third-second coil 2222 of the third coil 2220 and may face the fourth-third coil 2433 of the fourth coil 2430.

The second-first magnet 2321 may be a two-pole magnetized magnet. The second-first magnet 2321 may be a two-pole magnet. The second-first magnet 2321 may be a two-pole magnet having polarities of the inner surface and outer surface different from each other. For example, the inner surface of the second-first magnet 2321 may be an N pole, and the outer surface of the second-first magnet 2321 may be an S pole. Conversely, the inner surface of the second-first magnet 2321 may be an S pole, and the outer surface of the second-first magnet 2321 may be an N pole. However, in a modified embodiment, the second-first magnet 2321 may be a 4-pole magnet. The second-first magnet 2321 may be formed to be larger than each of the second-second magnet 2322 and the second-third magnet 2323. The second-first magnet 2321 may be formed to have a height greater than that of the second-second magnet 2322 and the second-third magnet 2323, respectively. The second-first magnet 2321 may be formed to have a width greater than each of the second-second magnet 2322 and the second-third magnet 2323. When viewed from above, the inner side polarity of the second-first magnet 2321 may be different from the inner side polarity of the second-second magnet 2322 and the second-third magnet 2323. When viewed from below, the inner side polarity of the second-first magnet 2321 may be the same as the inner side polarity of the second-second magnet 2322 and the second-third magnet 2323. The polarity of the inner side of the second-first magnet 2321 may be the same in the up and down directions.

The second-second magnet 2322 and the second-third magnet 2323 may be 4-pole magnetized magnets. The second-second magnet 2322 and the second-third magnet 2323 may be 4-pole magnets. The 4-pole magnetized magnet may comprise a neutral portion disposed in a horizontal direction in the central portion. Here, the neutral portion may be a void. The second-second magnet 2322 and the second-third magnet 2323 may be positively polarized. As the second-second magnet 2322 and the second-third magnet 2323 are magnetized, the AF electromagnetic force may be maximized. Each of the second-second magnet 2322 and the second-third magnet 2323 may be a 4-pole magnet in which an upper portion of an inner surface has a different polarity from a lower portion of the inner surface and an upper portion of the outer surface, and the polarity is the same as that of the lower portion of the outer surface. The upper portion of the inner surface and the lower portion of the outer surface of the second-second magnet 2322 may be N poles, and the lower portion of the inner surface and the upper portion of the outer surface of the second-second magnet 2322 may be S poles. Conversely, the upper portion of the inner surface and the lower portion of the outer surface of the second-second magnet 2322 may be S poles, and the lower portion of the inner surface and upper portions of the outer surface of the second-second magnet 2322 may be N poles. An upper portion of an inner surface and a lower portion of an outer surface of the second-third magnet 2323 may be N poles, and a lower portion of the inner surface and upper portions of the outer surface of the second-third magnet 2323 may be S-poles. Conversely, the upper portion of the inner surface and the lower portion of the outer surface of the second-third magnet 2323 may be S poles, and the lower portion of the inner surface and upper portions of the outer surface of the second-third magnet 2323 may be N poles. The polarity of the inner side of the second-second magnet 2322 and the second-third magnet 2323 may be different in the up and down directions.

The fourth mover 2300 may comprise a second dummy member 2330. The second dummy member 2330 may be disposed at a first corner adjacent to the first surface among the four corners of the second cover 2100. The weight of the second dummy member 2330 may correspond to the weight of the second-first magnet 2321. However, the second dummy member 2330 may have a weight smaller than the weight of the second-first magnet 2321. Or, the second dummy member 2330 may have a weight greater than that of the second-first magnet 2321. The second dummy member 2330 may be within 80% of the weight of the second-first magnet 2321 to 120% of the weight of the second-first magnet 2321. If the weight of the second dummy member 2330 is less than the lower limit or more than the upper limit of the aforementioned numerical value, weight balancing of the OIS driving unit may collapse.

The second dummy member 2330 may be a non-magnetic material. The second dummy member 2330 may comprise a non-magnetic material. The magnetic strength of the second dummy member 2330 may be weaker than that of the second-first magnet 2321. The second dummy member 2330 may be disposed to adjust the center of gravity to the opposite side of the second-first magnet 2321. The second dummy member 2330 may be made of 95% or more of tungsten. That is, the second dummy member 2330 may be a tungsten alloy. For example, the specific gravity of the second dummy member 2330 may be 18000 or more. The second dummy member 2330 may be disposed at a position symmetrical to the second-first magnet 2321 with respect to the central axis of the second housing 2310. At this time, the central axis of the second housing 2310 may correspond to the optical axis. The second dummy member 2330 may have a thickness corresponding to that of the second-first magnet 2321 in a direction perpendicular to the optical axis.

The second dummy member 2330 may comprise a groove 2331. The groove 2331 may be formed on the inner surface of the second dummy member 2330. The groove 2331 may be formed to be larger than the fourth magnet 2230. At least a portion of the fourth magnet 2230 may be accommodated in the groove 2331.

The second dummy member 2330 may be adjacent to the third magnet disposed at the third corner of the first cover 1100. The second dummy member 2330 may be disposed on the same straight line as a second magnet disposed in the second corner of the first cover 1100; a third magnet disposed at the third corner of the first cover 1100; and a fourth magnet disposed in the first corner of the second cover 2100. At this time, the same straight line may be a virtual straight line. In addition, the virtual straight line may be parallel to a vertical virtual straight line passing through the first optical axis of the first camera module and the second optical axis of the second camera module. In addition, the virtual straight line may be parallel to a direction directing from the first optical axis of the second optical axis.

The second dummy member 2330 may be disposed between the third magnet disposed at the third corner of the first cover 1100 and the fourth magnet disposed at the first corner of the second cover 2100.

The weight of the second dummy member 2330 may be the same as the weight of the second-first magnet 2321. The weight of the second dummy member 2330 may be substantially the same as the weight of the second-first magnet 2321. The sum of the weight of the second dummy member 2330 and the weight of the fourth magnet 2230 may be equal to the weight of the second-first magnet 2321.

The second dummy member 2330 may be disposed at the opposite side of the first dummy member 1330 with respect to a virtual plane connecting the optical axis of the first camera module and the optical axis of the second camera module. The second dummy member 2330 may be disposed at the opposite side of the first dummy member 1330 with respect to a virtual line connecting the optical axis of the first camera module and the optical axis of the second camera module when viewed from the upper surface.

The second lens driving device 2000 may comprise a second stator 2400. The second stator 2400 may be disposed below the third and fourth movers 2200 and 2300. The second stator 2400 may movably support the fourth movable member 2300. The second stator 2400 may move the fourth mover 2300. At this time, the third mover 2200 may also move together with the fourth mover 2300.

The second stator 2400 may comprise a second base 2410. The second base 2410 may be disposed below the second housing 2310. The second base 2410 may be disposed below the second bobbin 2210. The second base 2410 may be spaced apart from the second housing 2310 and the second bobbin 2210. The second base 2410 may be disposed below the second substrate 2420. The second base 2410 may be coupled to the second cover 2100. The second base 2410 may be disposed in a printed circuit board. The second base 2410 may be disposed between the second housing 2310 and the printed circuit board.

The second base 2410 may comprise a hole 2411. The hole 2411 may be a sensor accommodating hole. The hole 2411 may penetrate through the second base 2410 in the optical axis direction. A second sensor 2440 and a fourth sensor 2445 may be disposed in the hole 2411. The hole 2411 may be formed to have a size and number corresponding to those of the second sensor 2440 and the fourth sensor 2445. In a modified embodiment, the hole 2411 may be formed as a groove. In this case, the groove may be formed on an upper surface of the second base 2410.

The second base 2410 may comprise a step 2412. The step 2412 may be formed on a side surface of the second base 2410. The step 2412 may be formed on an outer circumferential surface of the second base 2410. The step 2412 may be formed as the lower portion of the side surface of the second base 2410 is being protruded. The lower end of the side plate 2120 of the second cover 2100 may be disposed in the step 2412.

The second base 2410 may comprise a first groove 2413. The first groove 2413 may be a terminal unit accommodating groove. The first groove 2413 may be formed on a side surface of the second base 2410. A terminal unit 2422 of the second substrate 2420 may be disposed in the first groove 2413. The first groove 2413 may be formed to have a width corresponding to the width of the second substrate 2420. The first groove 2413 may be respectively formed on two side surfaces of the second base 2410 that are disposed at the opposite side surfaces of the plurality of side surfaces.

The second base 2410 may comprise a second groove 2414. The second groove 2414 may be formed on a lower surface of the second base 2410. A protruded portion of the upper surface of the sensor base may be form-fitted in the second groove 2414. Or, in a structure in which the sensor base is omitted or the second base 2410 and the sensor base are integrally formed, an image sensor may be disposed in a space formed between the printed circuit board and the second base 2410 by the second groove 2414.

The second base 2410 may comprise a hollow hole. The hollow hole may be formed in the central portion of the second base 2410. The hollow hole may penetrate through the second base 2410 in the optical axis direction. The hollow hole may be formed between the lens and the image sensor.

The second stator 2400 may comprise a second substrate 2420. The second substrate 2420 may be disposed in the second base 2410. The second substrate 2420 may be disposed on an upper surface of the second base 2410. The second substrate 2420 may be disposed between the second housing 2310 and the second base 2410. A fourth elastic member 2600 may be coupled to the second substrate 2420. The second substrate 2420 may supply power to the fourth coil 2430. The second substrate 2420 may be coupled to the substrate part 2435. The second substrate 2420 may be coupled to the fourth coil 2430. The second substrate 2420 may be coupled with a printed circuit board disposed at a lower side of the second base 2410. The second substrate 2420 may comprise a flexible printed circuit board (FPCB). The second substrate 2420 may be partially bent.

The second substrate 2420 may comprise a body part 2421. The body part 2421 may be disposed on an upper surface of the second base 2410. The second substrate 2420 may comprise a first hole formed in the central portion of the body part 2421. The first hole may be formed between the lens and the image sensor. The second substrate 2420 may comprise a second hole. The second hole may penetrate through the second substrate 2420 in a vertical direction. The wire of the fourth elastic member 2600 may pass through the second hole of the second substrate 2420. The second substrate 2420 may comprise a ground portion. The ground portion may be extended from the side surface of the body part 2421 and be bent. The ground portion may be disposed on a side surface of the second base 2410 to be in contact with the inner surface of the side plate 2120 of the second cover 2100. Through this, the second cover 2100 may be electrically connected to the second substrate 2420 and grounded.

The second substrate 2420 may comprise a terminal unit 2422. The terminal unit 2422 may be bent downward from the body part 2421 to be extended. The terminal unit 2422 may be disposed on two opposite side surfaces of the four side surfaces of the second substrate 2420. A terminal may be disposed on an outer surface of the terminal unit 2422. The terminal may comprise a plurality of terminals. The terminal of the second substrate 2420 may be coupled with the terminal of the printed circuit board by soldering.

The second stator 2400 may comprise a fourth coil 2430. The fourth coil 2430 may be an 'OIS coil'. The fourth coil 2430 may be disposed on the second base 2410. The fourth coil 2430 may be formed on the substrate part 2435. The fourth coil 2430 may be disposed on the second substrate 2420. The fourth coil 2430 may face the second magnet 2320. The fourth coil 2430 may electromagnetically interact with the second magnet 2320. In this case, when a current is supplied to the fourth coil 2430, the second magnet 2320 may move against the fourth coil 2430 by electromagnetic interaction between the fourth coil 2430 and the second magnet 2320. The fourth coil 2430 may move the second housing 2310 and the second bobbin 2210 in a direction perpendicular to the optical axis with respect to the second base 2410 through electromagnetic interaction with the second magnet 2320. The fourth coil 2430 may be a fine pattern coil (FP coil) integrally formed on the substrate part 2435.

The second substrate 2420 may comprise a fourth coil 2430. That is, the fourth coil 2430 may be one configuration of the second substrate 2420. However, the fourth coil 2430 may be disposed on a substrate part 2435 separate from the second substrate 2420.

The fourth coil 2430 may comprise a plurality of coils. The fourth coil 2430 may comprise three coils. The fourth coil 2430 may comprise fourth-first to fourth-third coils 2431, 2432, and 2433. The fourth-first coil 2431 may face a lower surface of the second-first magnet 2321. The fourth-second coil 2432 may face a lower surface of the second-second magnet 2322. The fourth-third coil 2433 may face the lower surface of the second-third magnet 2323.

The number of turns of the fourth-first coil 2431 may be greater than the number of turns of the fourth-second coil 2432 and the fourth-third coil 2433. The number of turns of the fourth-second coil 2432 may correspond to the number of turns of the fourth-third coil 2433. Each of the fourth-first to fourth-third coils 2431, 2432, and 2433 may comprise a trapezoidal shape. The length of the upper side of the fourth-first coil 2431 may be longer than the length of the corresponding upper side of the fourth-second coil 2432 and the fourth-third coil 2433. The length of the lower side of the fourth-first coil 2431 may be longer than the length of the corresponding lower side of the fourth-second coil 2432 and the fourth-third coil 2433. In the present embodiment, during OIS driving, the movement in x-axis direction is performed through the fourth-first coil 2431 and the movement in y-axis direction may be performed through the fourth-second coil 2432 and the fourth-third coil 2433. Therefore, in the present embodiment, in order to compensate for insufficient propulsion in the x-axis direction, the number of turns of the fourth-first coil 2431 may be increased higher than the number of turns of the fourth-second coil 2432 and the fourth-third coil 2433. For example, a ratio of the number of turns of the fourth-first coil 2431 to the number of turns of the fourth-second and fourth-third coils 2432 and 2433 may be 1.5:2.0 to 1:1. The ratio of the number of turns of the fourth-first coil 2431 to the number of turns of the fourth-second and fourth-third coils 2432 and 2433 is ideally 1:1, but may be disposed up to 1.5:2.0 due to space constraints.

The fourth coil 2430 may comprise a substrate part 2435. The substrate part 2435 may be disposed on the second base 2410. The substrate part 2435 may be disposed on the second substrate 2420. The substrate part 2435 may be disposed between the second magnet 2320 and the second base 2410. Here, although the substrate part 2435 is described as a configuration separate from the second substrate 2420, the substrate part 2435 may be understood as a configuration comprised in the second substrate 2420.

The substrate part 2435 may be a circuit board. The substrate part 2435 may be an FPCB. The fourth coil 2430 may be integrally formed with the substrate part 2435 as a fine pattern coil (FP coil). A first hole for penetrating through the substrate part 2435 in an optical axis direction may be formed in the central portion of the substrate part 2435. A second hole through which the fourth elastic member 2600 passes may be formed in the substrate part 2435.

The second stator 2400 may comprise a second sensor 2440. The second sensor 2440 may be a 'position sensor'. The second sensor 2440 may be disposed on the second base 2410. The second sensor 2440 may be disposed in the second housing 2310 as a modified embodiment. The second sensor 2440 may detect the fourth magnet 2230. The second sensor 2440 may be disposed at a position corresponding to the fourth magnet 2230. The second sensor 2440 may be coupled to a lower surface of the second substrate 2420. In a modified embodiment, the second sensor 2440 may be coupled to an upper surface of the second substrate 2420. The second sensor 2440 may be disposed in the hole 2411 of the second base 2410. The second sensor 2440 may be spaced apart from the second housing 2310. The second sensor 2440 may be spaced apart from the second bobbin 2210. The second sensor 2440 may be overlapped with the fourth magnet 2230 in the optical axis direction. The second sensor 2440 may be overlapped with the second dummy member 2330 in the optical axis direction. The second sensor 2440 may detect the position of the fourth magnet 2230 for AF feedback control. The second sensor 2440 may be a Hall IC, a Hall element, or a Hall sensor. The second sensor 2440 may detect a magnetic force of the fourth magnet 2230.

The second stator 2400 may comprise a fourth sensor 2445. The fourth sensor 2445 may be disposed between the second base 2410 and the second substrate 2420. The fourth sensor 2445 may detect the movement of the fourth mover 2300. The fourth sensor 2445 may detect the magnetic force of the second magnet 2320 to detect movement of the second housing 2310 and the second magnet 2320. The detected value detected by the fourth sensor 2445 may be used for OIS feedback control. The fourth sensor 2445 may comprise a plurality of Hall sensors. The fourth sensor 2445 may comprise two Hall sensors. The fourth sensor 2445 may comprise a first Hall sensor that detects movement in the x-axis in the horizontal direction and a second Hall sensor that detects movement in the y-axis in the horizontal direction.

The second stator 2400 may comprise a second terminal 2450. The second terminal 2450 may be disposed on a lower surface of the second base 2410. The second terminal 2450 may be disposed on a side surface of the second base 2410. The second terminal 2450 may be insert-injected into the second base 2410. That is, the second terminal 2450 may be integrally formed with the second base 2410. The second terminal 2450 may be electrically connected to the second substrate 2420. The length of the wire of the fourth elastic member 2600 may be secured through the second terminal 2450.

In more detail, even if the distance between the second upper elastic member 2510 and the second substrate 2420 is reduced by reducing the overall height of the first camera module, since the second terminal 2450 provides additional space, the length of the wire may be further increased in the case when it is coupled to the second terminal 2450 than the case when the wire is coupled to the second substrate 2420. That is, even if the overall height of the second camera module is reduced compared to an existing one, the length of the wire can be maintained the same as the existing one. In other words, if the length of the wire is the same as compared to the existing one, the overall height of the first camera module can be reduced.

The second lens driving device 2000 may comprise a third elastic member 2500. The third elastic member 2500 may connect the second housing 2310 and the second bobbin 2210. The third elastic member 2500 may be coupled to the second bobbin 2210 and the second housing 2310. The third elastic member 2500 may elastically connect the second bobbin 2210 and the second housing 2310. The third elastic member 2500 may have elasticity at least in part. The third elastic member 2500 may elastically support the movement of the second bobbin 2210 during AF driving.

The third elastic member 2500 may comprise a second upper elastic member 2510. The second upper elastic member 2510 may connect an upper portion of the second housing 2310 and an upper portion of the second bobbin 2210. The second upper elastic member 2510 may be coupled to an upper surface of the second bobbin 2210 and an upper surface of the second housing 2310. The second upper elastic member 2510 may be formed with a leaf spring.

The second upper elastic member 2510 may electrically connect the third coil 2220 and the second substrate 2420. The second upper elastic member 2510 may comprise a plurality of upper elastic units. The second upper elastic member 2510 may comprise three upper elastic units. The second upper elastic member 2510 may comprise first to third upper elastic units 2510a, 2510b, and 2510c. The first upper elastic unit 2510a may connect one wire among the plurality of wires and the third-first coil 2221. The second upper elastic unit 2510b may connect the third-first coil 2221 and the third-second coil 2222. The third upper elastic unit 2510c may connect the third-second coil 2222 and the other one of the plurality of wires.

The second upper elastic member 2510 may comprise an inner side portion 2511. The inner side portion 2511 may be coupled to an upper portion of the second bobbin 2210. The inner side portion 2511 may comprise a hole inserted into the first protrusion of the second bobbin 2210.

The second upper elastic member 2510 may comprise an outer side portion 2512. The outer side portion 2512 may be coupled to an upper portion of the second housing 2310. The outer side portion 2512 may comprise a hole inserted into the first protrusion of the second housing 2310.

The second upper elastic member 2510 may comprise a connection portion 2513. The connection portion 2513 may connect the inner side portion 2511 and the outer side portion 2512. The connection portion 2513 may have elasticity.

The second upper elastic member 2510 may comprise a coupling portion 2514. The coupling portion 2514 is extended from the outer side portion 2512 and may be coupled to the fourth elastic member 2600. The coupling portion 2514 may comprise a hole through which the wire of the fourth elastic member 2600 penetrates. A solder ball connecting the coupling portion 2514 and the wire may be disposed on an upper surface of the coupling portion 2514.

The third elastic member 2500 may comprise a second lower elastic member 2520. The second lower elastic member 2520 may be coupled to a lower portion of the second bobbin 2210 and a lower portion of the second housing 2310. The second lower elastic member 2520 may be coupled to a lower surface of the second bobbin 2210 and a lower surface of the second housing 2310. The second lower elastic member 2520 may be formed with a leaf spring.

The second lower elastic member 2520 may comprise an inner side portion 2521. The inner side portion 2511 may be coupled to a lower portion of the second bobbin 2210. The inner side portion 2521 may comprise a hole inserted into the second protrusion of the second bobbin 2210.

The second lower elastic member 2520 may comprise an outer side portion 2522. The outer side portion 2512 may be coupled to a lower portion of the second housing 2310. The outer side portion 2522 may comprise a hole inserted into the second protrusion of the second housing 2310.

The second lower elastic member 2520 may comprise an outer side portion 2522. The outer side portion 2512 may be coupled to a lower portion of the second housing 2310. The outer side portion 2522 may comprise a hole inserted into the second protrusion of the second housing 2310.

The second lens driving device 2000 may comprise a fourth elastic member 2600. The fourth elastic member 2600 may be an 'OIS support member'. The fourth elastic member 2600 may connect the second upper elastic member 2510 and the second substrate 2420, the substrate part 2435 or the second terminal 2450. The fourth elastic member 2600 may be coupled to an upper surface of the second upper elastic member 2510 and the second terminal 2450. The fourth elastic member 2600 may movably support the second housing 2310. The fourth elastic member 2600 may elastically support the second housing 2310. The fourth elastic member 2600 may have elasticity at least in part. The fourth elastic member 2600 may elastically support the movement of the second housing 2310 and the second bobbin 2210 during OIS driving. The fourth elastic member 2600 may connect the second substrate 2420 and the third elastic member 2500. One end of the fourth elastic member 2600 may be coupled to the third elastic member 2500 by solder. The other end of the fourth elastic member 2600 may be coupled to the second terminal 2450 by solder.

The fourth elastic member 2600 may comprise a plurality of wires. The fourth elastic member 2600 may comprise four wires. The plurality of wires may comprise four wires connecting the three upper elastic units 2510a, 2510b, and 2510c and the second substrate 2420. As a modified embodiment, the fourth elastic member 2600 may be formed with a leaf spring.

The second camera module may comprise a damper. The damper may be disposed in the fourth elastic member 2600. The damper may be disposed in the fourth elastic member 2600 and the second housing 2310. The damper may be disposed in the elastic member. The damper may be disposed in the elastic member and/or the fourth elastic member 2600 to inhibit a resonance phenomenon occurring in the elastic member and/or the fourth elastic member 2600.

The second camera module may comprise a printed circuit board. The printed circuit board may be a printed circuit board (PCB). The printed circuit board is formed in a plate shape and may comprise an upper surface and a lower surface. An image sensor may be disposed on an upper surface of the printed circuit board. A lens driving device may be disposed on an upper surface of the printed circuit board. The printed circuit board may be electrically connected to the image sensor. The printed circuit board may be electrically connected to the lens driving device. The printed circuit board may comprise a terminal coupled to a terminal on the terminal unit 2422 of the second board 2420 by soldering. A connector connected to the outside may be disposed on the printed circuit board.

The second camera module may comprise an image sensor. The image sensor may be disposed on a printed circuit board. The image sensor may be electrically connected to the printed circuit board. For example, the image sensor may be coupled to a printed circuit board by surface mounting technology (SMT). As another example, the image sensor may be coupled to a printed circuit board by flip chip technology. The image sensor may be disposed so that the lens and the optical axis coincide. That is, the optical axis of the image sensor and the optical axis of the lens may be aligned. The image sensor may convert light irradiated to an effective image region of the image sensor into an electrical signal. The image sensor may be any one of a charge coupled device (CCD), a metal oxide semi-conductor (MOS), a CPD, and a CID.

The second camera module may comprise a lens module. The lens module may be coupled to the second bobbin 2210. The lens module may be screw-coupled to the second bobbin 2210. The lens module may be fixed to the second bobbin 2210 by an adhesive. The lens module may comprise a barrel and a lens coupled to the inside of the barrel. The lens may comprise a plurality of lenses. The lens may comprise 5 or 6 lenses.

The second camera module may comprise a filter. The filter may comprise an infrared filter. The infrared filter may block light in an infrared wavelength band among light passing through the lens. Or, the infrared filter may absorb light in an infrared wavelength band among light passing through the lens. A filter may be disposed between the lens and the image sensor. The filter may be disposed in the second base 2410. Or, in a modified embodiment, the filter may be disposed in the sensor base disposed between the second base 2410 and the printed circuit board.

In the present embodiment, two magnets among the three corner magnets constituting each of the first camera module and the second camera module may be a 4-pole magnet, and one magnet may be a 2-pole magnet. The 4-pole magnet can simultaneously perform AF driving through interaction with AF coil and OIS driving through interaction with OIS coil. Each magnet generates thrust with the OIS coil on the lower surface to provide X and Y diagonal driving. The dummy member may be for aligning the center of gravity of the lens driving device or the camera module.

The simulation of FIG. 17 was carried out in which the distance between the first camera module and the second camera module is 1 mm. Referring to FIG. 17, it can be confirmed that magnetic field interference between the first camera module and the second camera module does not occur when the distance between the first camera module and the second camera module is 1 mm in the present embodiment.

Hereinafter, a configuration of a lens driving device according to a second embodiment of the present invention will be described with reference to the drawings.

Figure 18:
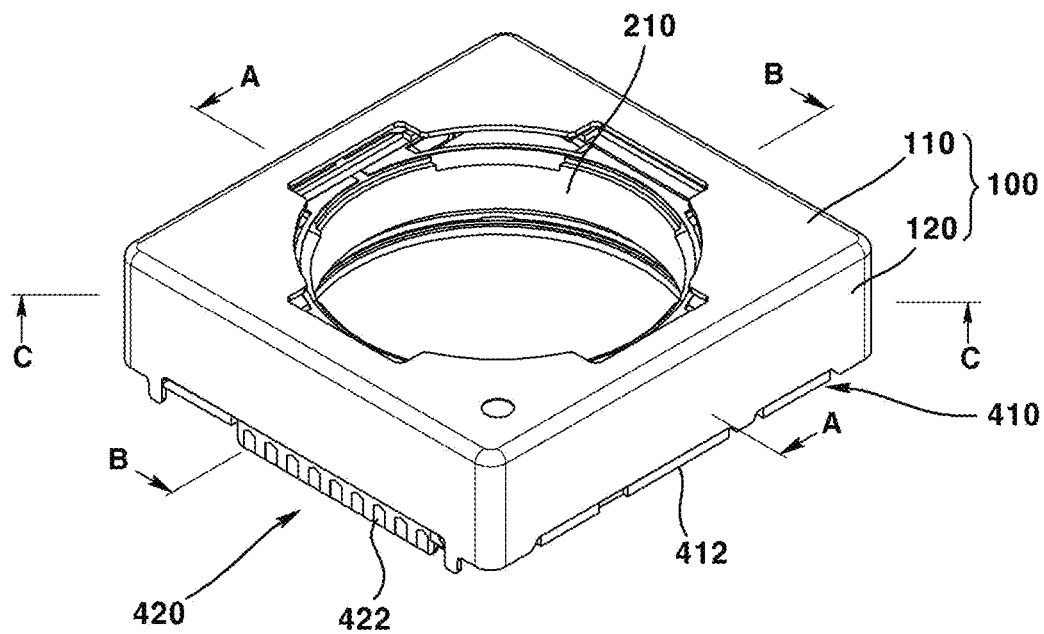
FIG. 18 is a perspective view of a lens driving device according to a second embodiment of the present invention.
Figure 19:
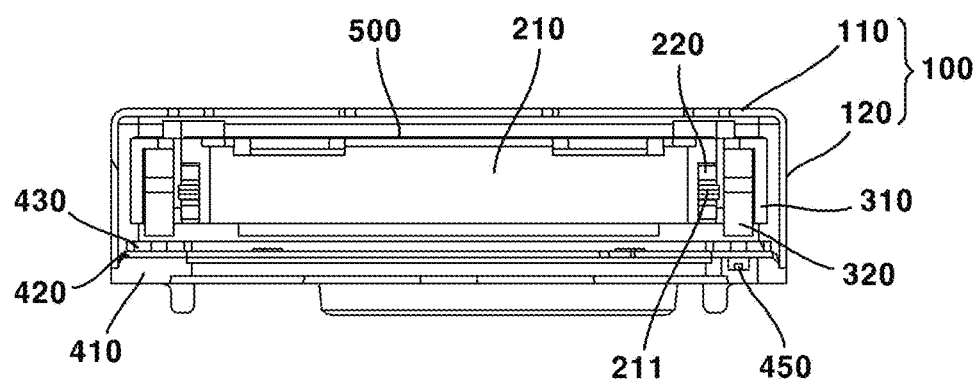
FIG. 19 is a cross-sectional view taken along line A-A of FIG. 18.
Figure 20:
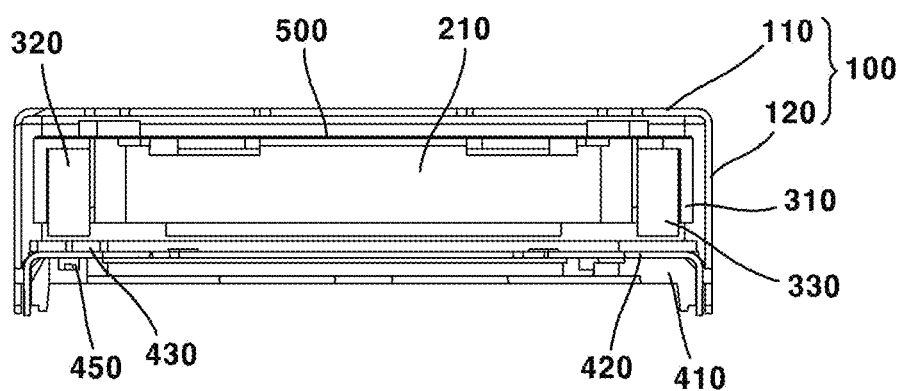
FIG. 20 is a cross-sectional view taken along line B-B of FIG. 18.
Figure 21:
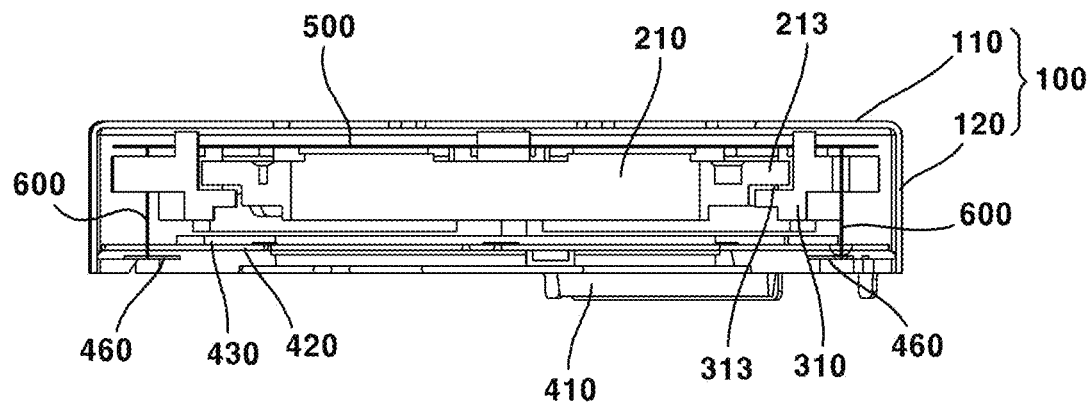
FIG. 21 is a cross-sectional view taken along line C-C of FIG. 18.
Figure 22:
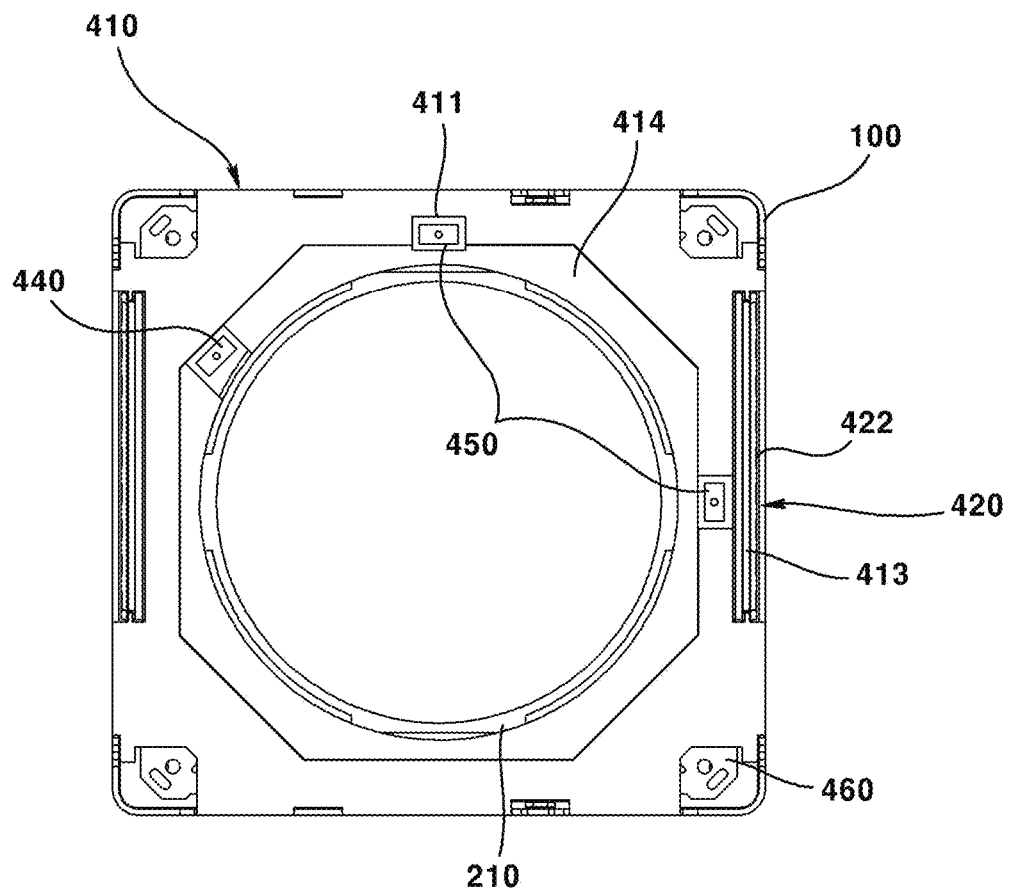
FIG. 22 is a bottom view of a lens driving device according to a second embodiment of the present invention.
Figure 23:
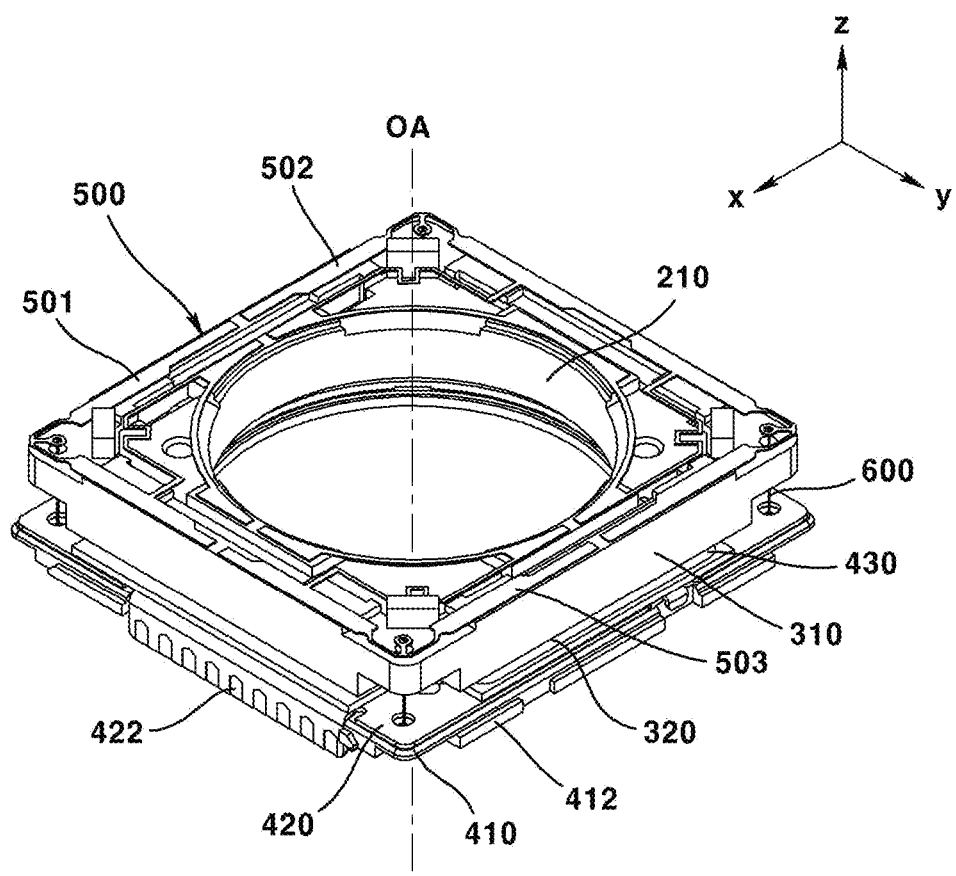
FIG. 23 is a perspective view illustrating a state in which a cover is removed from the lens driving device of FIG. 18.
Figure 24:
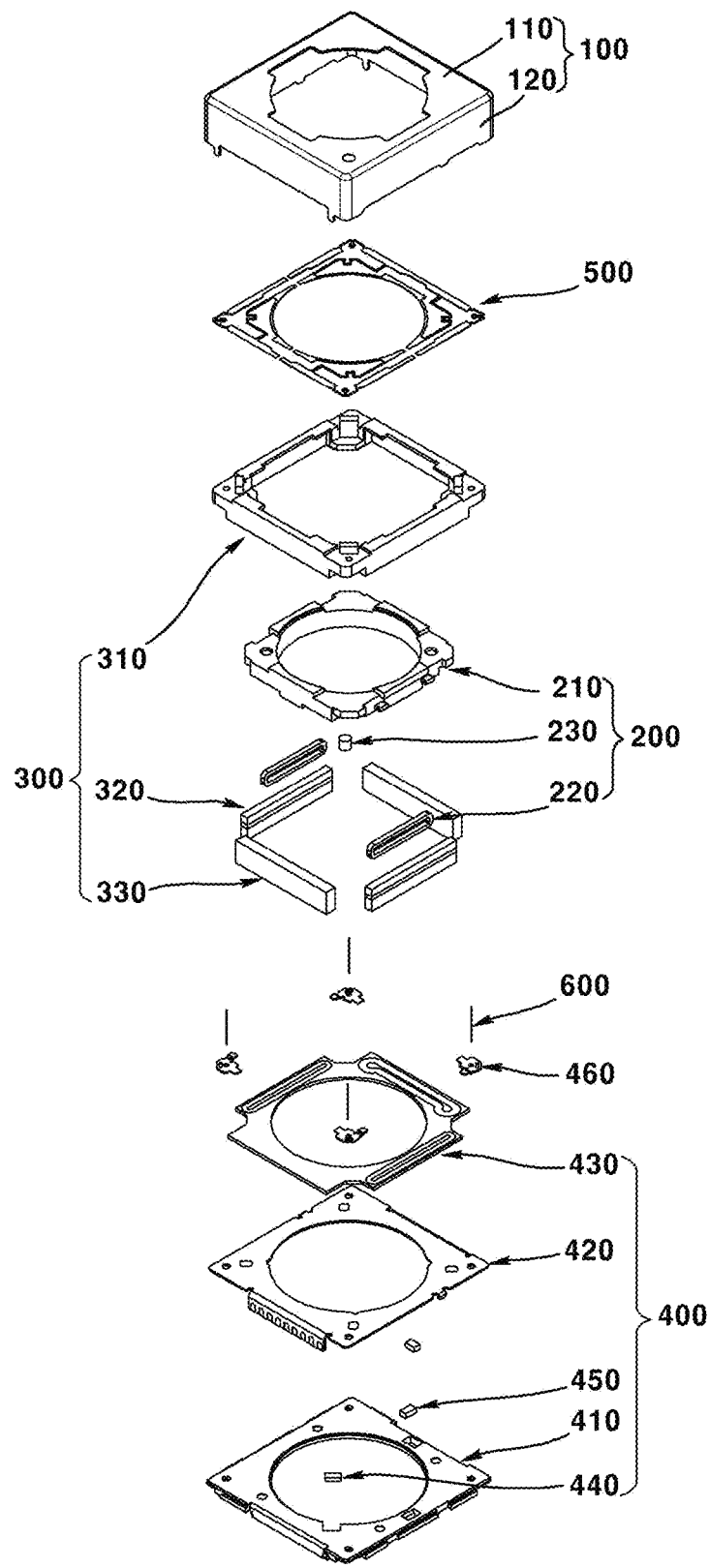
FIG. 24 is an exploded perspective view of a lens driving device according to a second embodiment of the present invention.
Figure 25:
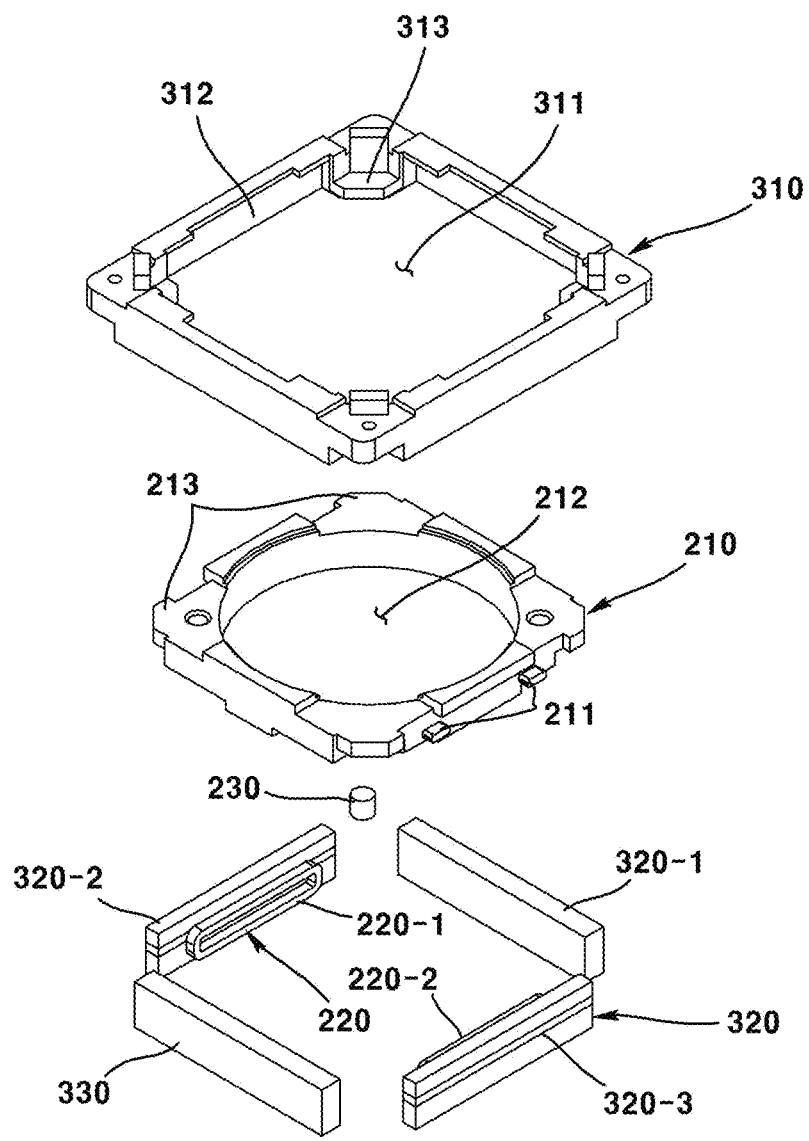
FIGS. 25 to 27 are exploded perspective views of a part of the lens driving device according to a second embodiment of the present invention.
Figure 26:
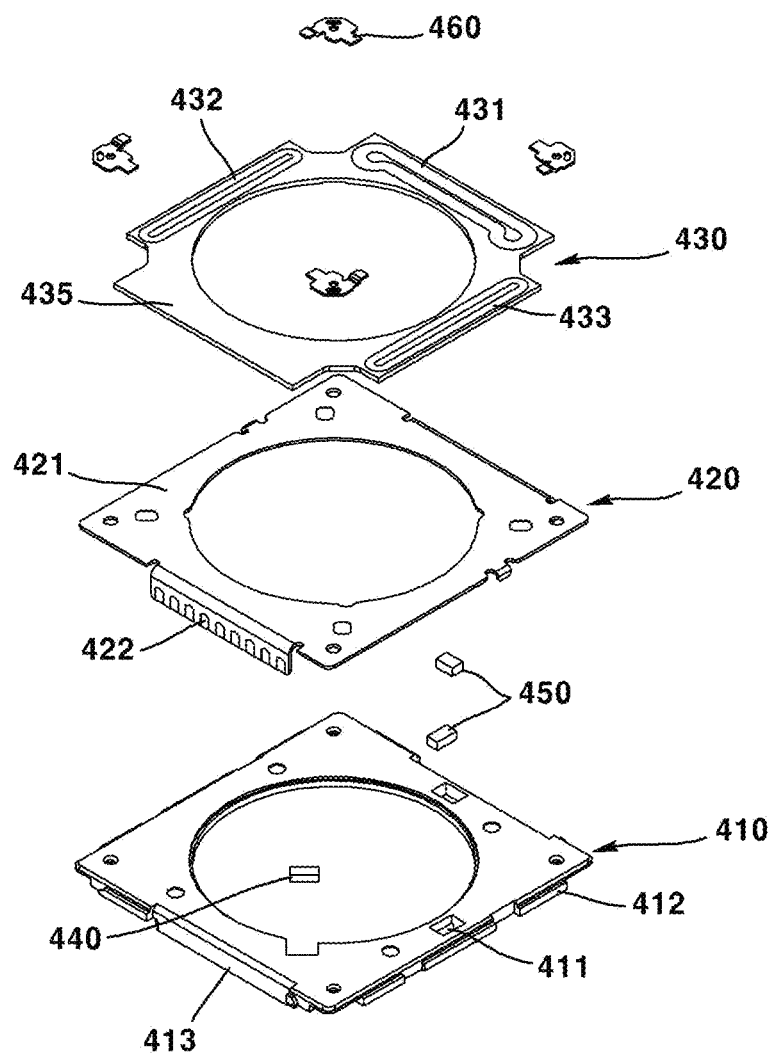
Figure 27:
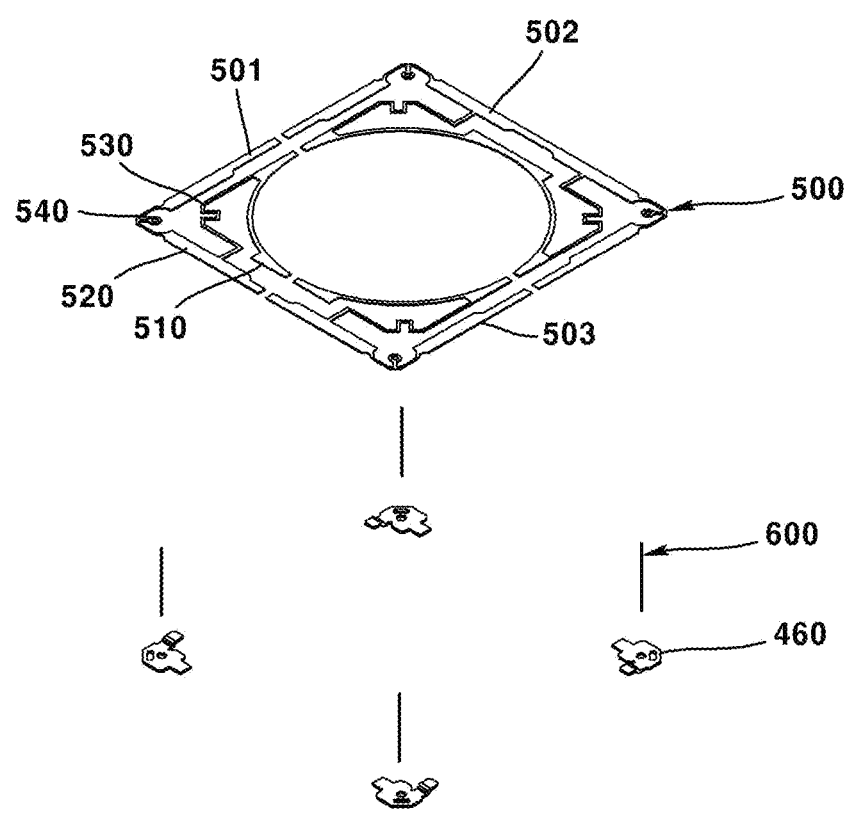
Figure 28:
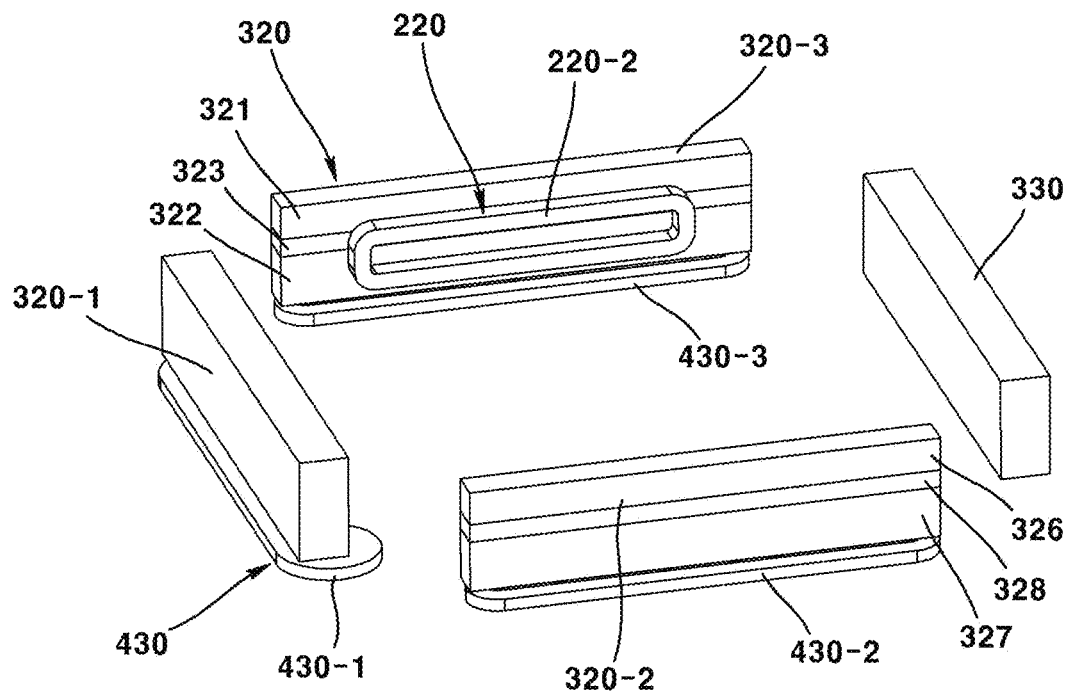
FIG. 28 is a perspective view illustrating an disposement structure of a coil, a magnet, and a dummy member according to a second embodiment of the present invention.
Figure 29:
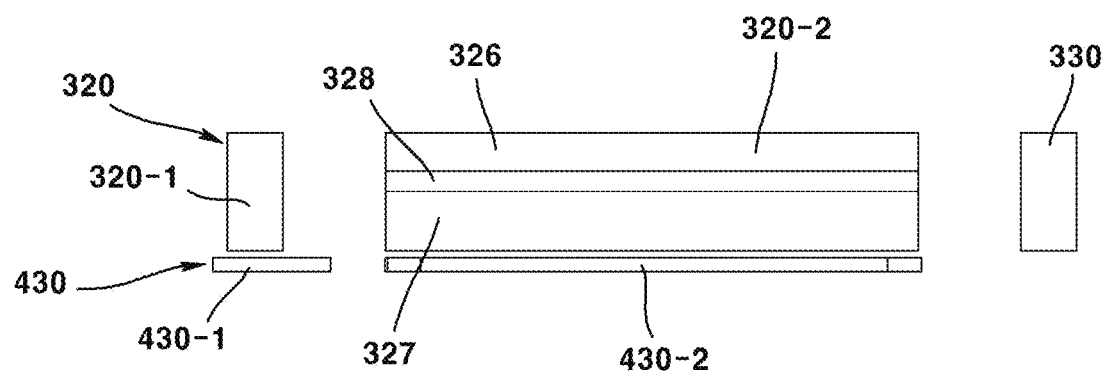
FIG. 29 is a side view of the configuration of FIG. 28 viewed from the side.
Figure 30:
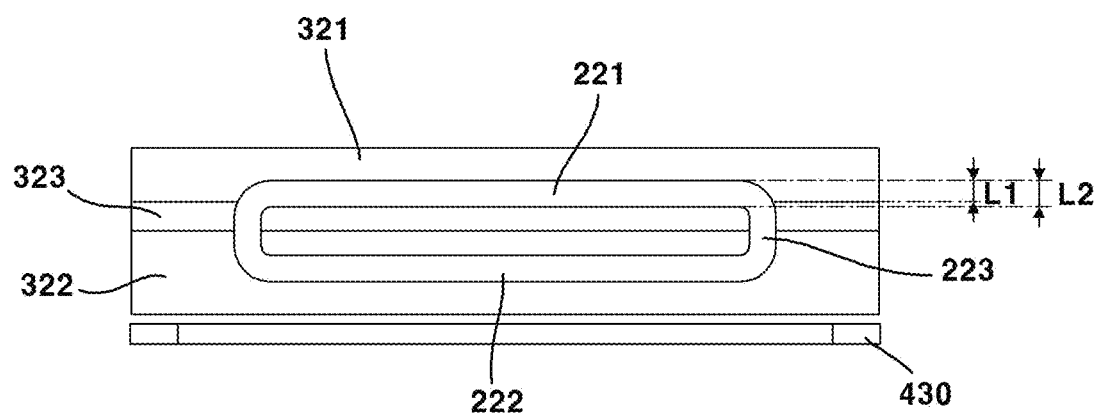
FIG. 30 is a side view of a coil and a magnet of a lens driving device according to a second embodiment of the present invention.

FIG. 18 is a perspective view of a lens driving device according to a second embodiment of the present invention; FIG. 19 is a cross-sectional view taken along line A-A of FIG. 18; FIG. 20 is a cross-sectional view taken along line B-B of FIG. 18; FIG. 21 is a cross-sectional view taken along line C-C of FIG. 18; FIG. 22 is a bottom view of a lens driving device according to a second embodiment of the present invention; FIG. 23 is a perspective view illustrating a state in which a cover is removed from the lens driving device of FIG. 18; FIG. 24 is an exploded perspective view of a lens driving device according to a second embodiment of the present invention; FIGS. 25 to 27 are exploded perspective views of a part of the lens driving device according to a second embodiment of the present invention; FIG. 28 is a perspective view illustrating an disposement structure of a coil, a magnet, and a dummy member according to a second embodiment of the present invention; FIG. 29 is a side view of the configuration of FIG. 28 viewed from the side; and FIG. 30 is a side view of a coil and a magnet of a lens driving device according to a second embodiment of the present invention.

The lens driving device 10 may be a voice coil motor (VCM). The lens driving device 10 may be a lens driving motor. The lens driving device 10 may be a lens driving motor. The lens driving device 10 may be a lens driving actuator. In this embodiment, the lens driving device 10 may comprise a CLAF OIS actuator or a CLAF OIS module. For example, a state in which a lens, an image sensor, and a printed circuit board are assembled to the lens driving device 10 may be understood as a camera module.

The lens driving device 10 may comprise a cover 100. The cover 100 may cover the housing 310. The cover 100 may be coupled to the base 410. An inner space may be formed between the cover 100 and the base 410. The cover 100 may accommodate the housing 310 therein. The cover 100 may accommodate the bobbin 210 therein. The cover 100 may form the outer appearance of the first camera module. The cover 100 may have a hexahedral shape with an open lower surface. The cover 100 may be a non-magnetic material. The cover 100 may be formed of a metal material. The cover 100 may be formed of a metal plate. The cover 100 may be connected to the ground portion of the printed circuit board. Through this, the cover 100 may be grounded. The cover 100 may block electromagnetic interference (EMI). At this time, the cover 100 may be referred to as a 'shield can' or an 'EMI shield can'.

The cover 100 may comprise an upper plate 110. The cover 100 may comprise a side plate 120. The cover 100 may comprise an upper plate 110 and a side plate 120 being extended downward from an outer periphery or an edge of the upper plate 110. The lower end of the side plate 120 of the cover 100 may be disposed in a step 412 of the base 410. The inner surface of the side plate 120 of the cover 100 may be fixed to the base 410 by an adhesive.

The cover 100 may comprise a plurality of side plates. The cover 100 may comprise a plurality of side plates and a plurality of corners formed by the plurality of side plates. The cover 100 may comprise four side plates and four corners formed between the four side plates. The cover 100 may comprise: a first side plate; a second side plate disposed on an opposite side of the first side plate; a third side plate disposed opposite to each other between the first side plate and the second side plate; and a fourth side plate. The cover 100 may comprise first to fourth corners. The cover 100 may comprise: a first corner; a second corner disposed opposite to the first corner; and a third corner and a fourth corner disposed opposite to each other.

The lens driving device 10 may comprise a first mover 200. The first mover 200 may be coupled to a lens. The first mover 200 may be connected to a second mover 300 through a first elastic member 500. The first mover 200 may move through interaction with the second mover 300. At this time, the first mover 200 may move integrally with the lens. Meanwhile, the first mover 200 may move during AF driving. At this time, the first mover 200 may be referred to as an 'AF mover'. Meanwhile, the first mover 200 may move together with the second mover 300 during OIS driving. The first mover 200 may comprise a bobbin 210 and a first coil 220.

The first mover 200 may comprise a bobbin 210. The bobbin 210 may be disposed in the housing 310. The bobbin 210 may be movably coupled to the housing 310. The bobbin 210 may move in the optical axis direction against the housing 310.

The bobbin 210 may comprise a protruded portion 211. The protruded portion 211 may be protruded from the side surface of the bobbin 210. The first coil 220 may be fixed to the protruded portion 211. The protruded portion 211 may be inserted into the hollow of the ring-shaped first coil 220. The first coil 220 may be wound around the protruded portion 211. The protruded portion 211 may be formed on each of a first side surface of the bobbin 210 and a second side surface opposite to the first side surface. The protruded portion 211 may comprise a plurality of protrusions. The protruded portion 211 may comprise two protrusions.

The bobbin 210 may comprise a hole 212. The hole 212 may be a hollow hole. A lens may be coupled to the hole 212. A thread may be formed on the inner circumferential surface of the hole 212 of the bobbin 210. Or, the inner circumferential surface of the hole 212 of the bobbin 210 may be formed as a curved surface without a screw thread. The bobbin 210 may comprise a first protrusion coupled to the first elastic member 500. The first protrusion of the bobbin 210 may be inserted into a corresponding hole of the first elastic member 500 and coupled thereto. The bobbin 210 may comprise a groove in which the fourth magnet 230 is disposed. The fourth magnet 230 may be inserted into the groove of the bobbin 210 from below and coupled thereto.

The bobbin 210 may comprise a stopper 213. The stopper 213 may be formed on a side surface of the bobbin 210. The stopper 213 may be protruded toward the side of the bobbin 210. The stopper 213 may be disposed in the second groove 313 of the housing 310. The stopper 213 may be formed in a shape corresponding to the second groove 313 of the housing 310. The stopper 213 may be caught on the housing 310 to inhibit downward movement and rotation of the bobbin 210.

The bobbin 210 may be coupled to any one or more among the first elastic member 500, the first coil 220, and the fourth magnet 230 by an adhesive. At this time, the adhesive may be an epoxy that is cured by any one or more of heat, laser, and ultraviolet (UV) light.

The first mover 200 may comprise a first coil 220. The first coil 220 may be an 'AF coil'. The first coil 220 may be disposed on the bobbin 210. The first coil 220 may be disposed in contact with the bobbin 210. The first coil 220 may be disposed between the bobbin 210 and the housing 310. The first coil 220 may be disposed on an outer periphery of the bobbin 210. The first coil 220 may be directly wound on the bobbin 210. The first coil 220 may face the magnet 320. The first coil 220 may electromagnetically interact with the magnet 320. When a current is supplied to the first coil 220 to form an electromagnetic field around the first coil 220, the first coil 220 may move against the magnet 320 by electromagnetic interaction between the first coil 220 and the magnet 320.

The first coil 220 may comprise a plurality of coils. The first coil 220 may comprise two coils. The first coil 220 may comprise a first-first coil 220-1 and a first-second coil 220-2. The first-first coil 220-1 may face the second magnet 320-2. The first-second coil 220-2 may face the third magnet 320-3. The first-first coil 220-1 may be disposed on a first side surface of the bobbin 210, and the first-second coil 220-2 may be disposed on a second side surface opposite to the first side surface of the bobbin 210. Each of the first-first coil 220-1 and the first-second coil 220-2 may be formed in a ring shape, a donut shape, or an elliptical shape. At this time, each of the first-first coil 220-1 and the first-second coil 220-2 may be referred to as a 'glasses coil'.

The first coil 220 may comprise first to third portions 221, 222, and 223. The first portion 221 of the first coil 220 may be disposed above the protruded portion 211 of the bobbin 210. The second portion 222 of the first coil 220 may be disposed below the protruded portion 211 of the bobbin 210. The third portion 223 of the first coil 220 may connect the first portion 221 and the second portion 222.

The first mover 200 may comprise a fourth magnet 230. The fourth magnet 230 may be a 'sensing magnet'. The fourth magnet 230 may be disposed on the bobbin 210. The fourth magnet 230 may be disposed adjacent to the first sensor 440. The fourth magnet 230 may be disposed to face the first sensor 440. The fourth magnet 230 may be inserted into the groove of the bobbin 210 from below. The fourth magnet 230 may be a 2-pole magnetized magnet or a 4-pole magnetized magnet. The fourth magnet 230 may be disposed at a corner of the bobbin 210. As the fourth magnet 230 is disposed at the corner of the bobbin 210, magnetic field interference between the magnet 320 and the fourth magnet 230 disposed to face the side surface of the bobbin 210 can be minimized.

The first mover 200 may comprise a compensation magnet as a modified embodiment. The compensation magnet may be provided for magnetic field balance with the fourth magnet 230. The compensation magnet may be disposed on the bobbin 210. The compensation magnet may be disposed opposite to the fourth magnet 230 with respect to the optical axis.

The lens driving device 10 may comprise a second mover 300. The second mover 300 may be movably coupled to a stator 400 through a second elastic member 600. The second mover 300 may support the first mover 200 through an elastic member. The second mover 300 may move the first mover 200 or move together with the first mover 200. The second mover 300 may move through interaction with the stator 400. The second mover 300 may move during OIS driving. At this time, the second mover 300 may be referred to as an 'OIS mover'.

The second mover 300 may comprise a housing 310. The housing 310 may be spaced apart from the base 410. The housing 310 may be disposed in the cover 100. The housing 310 may be disposed between the cover 100 and the bobbin 210. The housing 310 may be disposed on an outer side of the bobbin 210. The housing 310 may accommodate at least a portion of the bobbin 210. The housing 310 may be formed of a material different from that of the cover 100. The housing 310 may be formed of an insulating material. The housing 310 may be formed of an injection-molded material. The housing 310 may be spaced apart from the side plate 120 of the cover 100.

The housing 310 may comprise a hole 311. The hole 311 may be a hollow hole. The hole 311 may be formed by being penetrating through the central portion of the housing 310 in a vertical direction. A bobbin 210 may be disposed in the hole 311 of the housing 310. The housing 310 may comprise a first protrusion coupled to the first elastic member 500. The first protrusion of the housing 310 may be inserted into a corresponding hole of the first elastic member 500 and coupled thereto. The housing 310 may comprise a second hole through which the second elastic member 600 passes.

The housing 310 may comprise a first groove 312. The first groove 312 may be a 'magnet accommodating groove' and/or a 'dummy member accommodating groove'. The housing 310 may comprise a first groove 312 in which the magnet 320 and the dummy member 330 are disposed. The first groove 312 of the housing 310 may be a groove recessed from the lower surface of the housing 310.

The housing 310 may comprise a second groove 313. The second groove 313 may be a stopper accommodating groove. The second groove 313 may be formed on an upper surface of the housing 310. By accommodating at least a portion of the stopper 213 of the bobbin 210, the second groove 313 can be formed in a way that the stopper 213 of the bobbin 210 is caught on the inner surface of the second groove 313 when the bobbin 210 rotates. In addition, the second groove 313 may comprise a bottom surface that faces the lower surface of the stopper 213 of the bobbin 210 and being overlapped in the optical axis direction. When the bobbin 210 moves downward, the stopper 213 may be caught on the bottom surface of the second groove 313 and the downward stroke of the bobbin 210 may be limited.

The housing 310 may be coupled to any one or more among the first elastic member 500, the magnet 320, and the dummy member 330 by an adhesive. At this time, the adhesive may be an epoxy that is cured by any one or more among heat, laser, and ultraviolet (UV) light.

The housing 310 may comprise four side portions and four corner portions disposed between the four side portions. The housing 310 may comprise: a first side portion disposed to correspond to the first side plate of the side plate 120 of the cover 100; a second side portion disposed to correspond to the second side plate; a third side plate disposed to correspond to a third side portion; and a fourth side portion disposed to correspond to the fourth side plate.

The second mover 300 may comprise a magnet 320. The magnet 320 may be a 'driving magnet'. The magnet 320 may be disposed in the housing 310. The magnet 320 may be disposed between the bobbin 210 and the housing 310. The magnet 320 may face the first coil 220. The magnet 320 may electromagnetically interact with the first coil 220. The magnet 320 may face a second coil 430. The magnet 320 may electromagnetically interact with the second coil 430. The magnet 320 may be commonly used for AF driving and OIS driving. The magnet 320 may be disposed at a corner of the housing 310. At this time, the magnet 320 may be a corner magnet in which the area of the inner surface is wider than the area of the opposite outer surface. The magnet 320 may be disposed at each of the remaining three corners except for the first corner among the four corners of the cover 100.

The magnet 320 may comprise a plurality of magnets. The magnet 320 may comprise three magnets. The magnet 320 may comprise four magnets. The magnet 320 may comprise a first magnet 320-1, a second magnet 320-2, and a third magnet 320-3. The first magnet 320-1 and the dummy member 330 may be disposed opposite to each other. The second and third magnets 320-2 and 320-3 may be disposed opposite to each other.

The first magnet 320-1 may be used for OIS driving in the x direction. The second magnet 320-2 and the third magnet 320-3 may be used for AF and OIS driving in the y direction. The first magnet 320-1 may face the second-first coil 430-1 of the second coil 430. The second magnet 320-2 may face the first-first coil 220-1 of the first coil 220 and may face the second-second coil 430-2 of the second coil 430. The third magnet 320-3 may face the first-second coil 220-2 of the first coil 220 and may face the second-third coil 430-3 of the second coil 430.

The first magnet 320-1 may be a two-pole magnetized magnet. The first magnet 320-1 may be a two-pole magnet. The first magnet 320-1 may be a two-pole magnet whose polarities of inner surface and outer surface are different. For example, an inner surface of the first magnet 320-1 is an N pole, and an outer surface of the first magnet 320-1 may be an S pole. Conversely, an inner surface of the first magnet 320-1 is an S pole, and an outer surface of the first magnet 320-1 may be an N pole. However, in a modified embodiment, the first magnet 320-1 may be a 4-pole magnet. The first magnet 320-1 may be formed to be larger than each of the second magnet 320-2 and the third magnet 320-3.

The second magnet 320-2 and the third magnet 320-3 may be 4-pole magnetized magnets. The second magnet 320-2 and the third magnet 320-3 may be 4-pole magnets. The 4-pole magnetized magnet may comprise a neutral portion disposed at the central portion in a horizontal direction. Here, the neutral portion may be a void. The second magnet 320-2 and the third magnet 320-3 may be positively magnetized. As the second magnet 320-2 and the third magnet 320-3 are positively magnetized, the AF electromagnetic force can be maximized. Each of the second magnet 320-2 and the third magnet 320-3 may be a four-pole magnet in which an upper portion of an inner surface has a different polarity from a lower portion of the inner surface and an upper portion of the outer surface, and the polarity is the same as that of the lower portion of the outer surface. The upper portion of the inner surface and the lower portion of the outer surface of the second magnet 320-2 are N poles, and the lower portion of the inner surface and the upper portion of the outer surface of the second magnet 320-2 may be S poles. Conversely, the upper portion of the inner surface and the lower portion of the outer surface of the second magnet 320-2 are S poles, and the lower portion of the inner surface and upper portions of the outer surface of the second magnet 320-2 may be N poles. The upper portion of the inner surface and the lower portion of the outer surface of the third magnet 320-3 may are N poles, and the lower portion of the inner surface and the upper portion of the outer surface of the third magnet 320-3 may be S poles. Conversely, the upper portion of the inner surface and the lower portion of the outer surface of the third magnet 320-3 are S poles, and the lower portion of the inner surface and upper portions of the outer surface of the third magnet 320-3 may be N poles.

The magnet 320 may comprise an inner surface facing the first coil 220. The inner surface of the magnet 320 may comprise first to third regions 321, 322, and 323. At an initial position where no current is applied to the first coil 220, the first region 321 may face the first portion 221 of the first coil 220. The second region 322 may face the second portion 222 of the first coil 220. The first region 321 has a first polarity and the second region 322 may have a second polarity opposite to the first polarity. The third region 323 may be disposed between the first region 321 and the second region 322.

The present embodiment may comprise a method of adjusting the position of the void according to the forward and reverse stroke driving ranges instead of locating a void at the center in a 4-pole type AF driving magnet. Since the size of the actuator is continuously decreasing and it is difficult to adjust the size of the magnet or coil, the present embodiment may be more effective.

For example, when optimizing the position of a void in the driving condition of a forward stroke of 320 um and a reverse stroke of −30 um, the height of the first region 321 is set to 0.55 mm at the height of 1.7 mm of the magnet 320, and the height of the third region 323 is set to 0.3 mm, and the height of the second region 322 may be set to 0.85 mm.

The area of the first region 321 of the magnet 320 may be different from the area of the second region 322 of the magnet 320. The area of the first region 321 of the magnet 320 may be smaller than the area of the second region 322 of the magnet 320. As a modified embodiment, the area of the first region 321 of the magnet 320 may be larger than the area of the second region 322 of the magnet 320.

At the initial position, in the initial position, the distance between the upper end of the first portion 221 of the first coil 220 and the lower end of the first region 321 of the magnet 320 in an optical axis direction (refer to L1 in FIG. 30) may be 80% or more of the distance between the upper end of the first portion 221 of the first coil 220 and the lower end of the first portion 221 of the first coil 220 in an optical axis direction (refer to L2 in FIG. 30). In the present embodiment, the area where the first portion 221 of the first coil 220 and the first region 321 of the magnet 320 are being overlapped with each other in a direction perpendicular to the optical axis should be at least 60% of the area of the first portion 221 of the first coil 220 to lose the electromagnetic force to about 10%, but since the position of the first coil 220 is not fixed due to the posture difference by the weight of the AF driving unit and gravity, L1/L2 needs to be secured at least 80%.

At the initial position, the first portion 221 of the first coil 220 may be overlapped with the first region 321 and the third region 323 of the magnet 320 in a direction perpendicular to the optical axis. At the initial position, the second portion 222 of the first coil 220 may be overlapped with the second region 322 of the magnet 320 in a direction perpendicular to the optical axis. At the initial position, the third portion 223 of the first coil 220 may be overlapped with the second region 322 and the third region 323 of the magnet 320 in a direction perpendicular to the optical axis.

The length of the inner surface of the magnet 320 in the long side direction is longer than the length of the first coil 220 in the corresponding direction, and the length of the inner surface of the magnet 320 in the short side direction may be longer than the length of the first coil 220 in the corresponding direction. The length of the inner surface of the magnet 320 in the long side direction may correspond to the length of the second coil 430 in the corresponding direction.

The magnet 320 may comprise a first magnet portion 326, a second magnet portion 327, and a neutral portion 327. The first magnet portion 326 may comprise an N pole and an S pole. The second magnet portion 327 may be disposed below the first magnet portion 326 and comprise an N pole and an S pole. The neutral portion 328 may be disposed between the first magnet portion 326 and the second magnet portion 327. The first portion 221 of the first coil 220 may be overlapped with the first magnet portion 326 and the neutral portion 328 in a direction perpendicular to the optical axis at an initial position where no current is applied to the first coil 220. The length of the first magnet part 326 in the optical axis direction may be shorter than the length of the second magnet part 327 in the optical axis direction.

Figure 31:
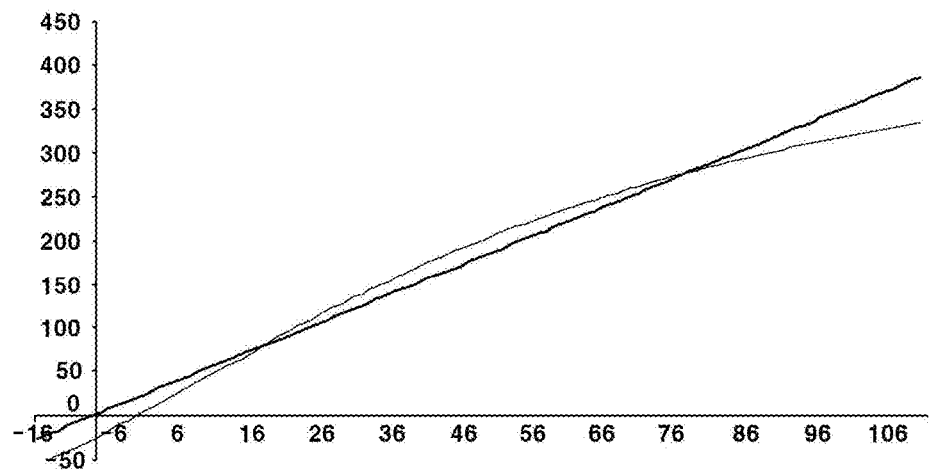
FIG. 31 is a graph for comparing the driving linearity of a comparative example (a), and a second embodiment of the present invention (b).
Figure 31:
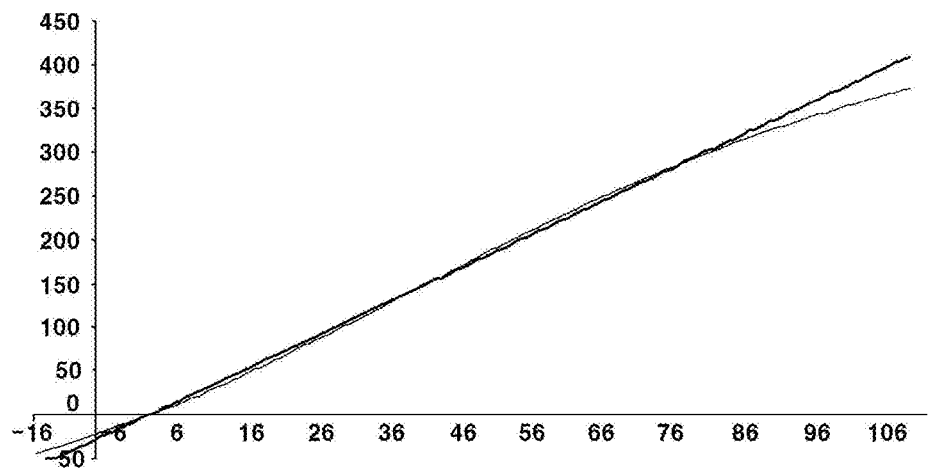

FIG. 31 is a graph illustrating a comparison of the driving linearity of comparative example (a) and the present embodiment (b). Comparative example is an embodiment in which the height of the first region 321 and/or the first magnet portion 326 and the height of the second region 322 and/or the second magnet portion 327 are set to be equal to each other, and the present embodiment is an embodiment in which the height of the first region 321 and/or the first magnet portion 326 is formed to be shorter than the height of the second region 322 and/or the second magnet portion 327. Comparing (a) and (b) of FIG. 31, it can be confirmed that the linearity is increased in (b), which is the present embodiment.

The second mover 300 may comprise a dummy member 330. The dummy member 330 may be disposed in the housing 310 opposite to the third magnet 320-3. The weight of the dummy member 330 may correspond to the weight of the first magnet 320-1. However, the dummy member 330 may have a weight smaller than the weight of the first magnet 320-1. Or, the dummy member 330 may have a weight greater than that of the first magnet 320-1. The dummy member 330 may be within 80% of the weight of the first magnet 320-1 and 120% of the weight of the first magnet 320-1. When the weight of the dummy member 330 is less than the lower limit or exceeds the upper limit of the aforementioned numerical value, the weight balancing of the OIS driving unit may collapse.

The dummy member 330 may be a non-magnetic material. The dummy member 330 may comprise a non-magnetic material. The magnetic strength of the dummy member 330 may be weaker than that of the first magnet 320-1. The dummy member 330 may be disposed at the opposite side of the first magnet 320-1 to adjust the center of gravity. The dummy member 330 may be made of 95% or more of tungsten. That is, the dummy member 330 may be a tungsten alloy. For example, the specific gravity of the dummy member 330 may be 18000 or more. The dummy member 330 may be disposed at a position symmetrical to the first magnet 320-1 with respect to a central axis of the housing 310. At this time, the central axis of the housing 310 may correspond to the optical axis. The dummy member 330 may have a thickness corresponding to that of the first magnet 320-1 in a direction perpendicular to the optical axis.

The lens driving device 10 may comprise a stator 400. The stator 400 may be disposed below the first and second movers 200 and 300. The stator 400 may movably support the second mover 300. The stator 400 may move the second mover 300. At this time, the first mover 200 may also move together with the second mover 300.

The stator 400 may comprise a base 410. The base 410 may be disposed below the housing 310. The base 410 may be disposed below the bobbin 210. The base 410 may be spaced apart from the housing 310 and the bobbin 210. The base 410 may be disposed below the first substrate 420. The base 410 may be coupled to the cover 100. The base 410 may be disposed in a printed circuit board. The base 410 may be disposed between the housing 310 and the printed circuit board.

The base 410 may comprise a hole 411. The hole 411 may be a sensor receiving hole. The hole 411 may penetrate through the base 410 in the optical axis direction. A first sensor 440 and a second sensor 450 may be disposed in the hole 411. The hole 411 may be formed to have a size and number corresponding to those of the first sensor 440 and the second sensor 450. In a modified embodiment, the hole 411 may be formed as a groove. In this case, the groove may be formed on an upper surface of the base 410.

The base 410 may comprise a step 412. The step 412 may be formed on a side surface of the base 410. The step 412 may be formed on an outer circumferential surface of the base 410. The step 412 may be formed as the lower portion of the side surface of the base 410 is being protruded. The lower end of the side plate 120 of the cover 100 may be disposed in the step 412.

The base 410 may comprise a first groove 413. The first groove 413 may be a terminal unit accommodating groove. The first groove 413 may be formed on a side surface of the base 410. A terminal unit 422 of the first substrate 420 may be disposed in the first groove 413. The first groove 413 may be formed to have a width corresponding to the width of the first substrate 420. The first groove 413 may be respectively formed on two side surfaces of the base 410 that are disposed on the opposite side of the plurality of side surfaces.

The base 410 may comprise a second groove 414. The second groove 414 may be formed on a lower surface of the base 410. The second groove 414 may provide a space for the sensor base or the image sensor.

The base 410 may comprise a hollow hole. The hollow hole may be formed in the central portion of the base 410. The hollow hole may penetrate through the base 410 in an optical axis direction. The hollow hole may be formed between the lens and the image sensor.

The stator 400 may comprise a substrate 420. The first substrate 420 may be disposed on the base 410. The first substrate 420 may be disposed on an upper surface of the base 410. The first substrate 420 may be disposed between the housing 310 and the base 410. A second elastic member 600 may be coupled to the first substrate 420. The first substrate 420 may supply power to the second coil 430. The first substrate 420 may be coupled to the substrate part 435. The first substrate 420 may be coupled to the second coil 430. The first substrate 420 may be coupled with a printed circuit board disposed on a lower side of the base 410. The first substrate 420 may comprise a flexible printed circuit board (FPCB). The first substrate 420 may be partially bent.

The substrate 420 may comprise a body part 421. The body part 421 may be disposed on an upper surface of the base 410. The first substrate 420 may comprise a first hole formed in the central portion of the body part 421. The first hole may be formed between the lens and the image sensor. The first substrate 420 may comprise a second hole. The second hole may penetrate through the first substrate 420 in a vertical direction. The wire of the second elastic member 600 may pass through the second hole of the first substrate 420. The first substrate 420 may comprise a ground portion. The ground portion may be extended from a side surface of the body part 421 and be bent. The ground portion may be disposed on a side surface of the base 410 to be in contact with an inner surface of the side plate 120 of the cover 100. Through this, the cover 100 may be electrically connected to the first substrate 420 and grounded.

The substrate 420 may comprise a terminal unit 422. The terminal unit 422 may be bent downward from the body part 421 to be extended. The terminal unit 422 may be disposed on two opposite side surfaces among the four sides of the first substrate 420. A terminal may be disposed on an outer surface of the terminal unit 422. The terminal may comprise a plurality of terminals. The terminal of the first board 420 may be coupled to the terminal of the printed circuit board by soldering.

The stator 400 may comprise a second coil 430. The second coil 430 may be an 'OIS coil'. The second coil 430 may be disposed on the base 410. The second coil 430 may be formed in the substrate part 435. The second coil 430 may be disposed on the first substrate 420. The second coil 430 may face the magnet 320. The second coil 430 may electromagnetically interact with the magnet 320. In this case, when a current is supplied to the second coil 430 to form a magnetic field around the second coil 430, the magnet 320 may move against the second coil 430 by electromagnetic interaction between the second coil 430 and the magnet 320. The second coil 430 may move the housing 310 and the bobbin 210 in a direction perpendicular to the optical axis against the base 410 through electromagnetic interaction with the magnet 320. The second coil 430 may be a fine pattern coil (FP coil) integrally formed with the substrate part 435.

The first substrate 420 may comprise a second coil 430. That is, the second coil 430 may be one configuration of the first substrate 420. However, the second coil 430 may be disposed in a substrate part 435 separate from the first substrate 420.

The second coil 430 may comprise a plurality of coils. The second coil 430 may comprise a number of coils corresponding to the magnet 320. The second coil 430 may comprise three coils. The second coil 430 may comprise four coils. The second coil 430 may comprise a second-first coil 430-1, a second-second coil 430-2, and a second-third coil 430-3. The second-first coil 430-1 may face the first magnet 320-1. The second-second coil 430-2 may face the second magnet 320-2. The second-third coil 430-3 may face the third magnet 320-3.

The number of turns of the second-first coil 430-1 may be greater than the number of turns of the second-second coil 430-2 and the second-third coil 430-3. The number of turns of the second-second coil 430-2 may correspond to the number of turns of the second-third coil 430-3. In the present embodiment, the movement in the x-axis direction is performed through the second-first coil 430-1 during OIS driving, and the movement in the y-axis direction may be performed through the second-second coil 430-2 and the second-third coil 430-3. Therefore, in the present embodiment, in order to supplement the insufficient driving force in the x-axis direction, the number of turns of the second-first coil 430-1 may be set to be higher than the number of turns in second-second coil 430-2 and second-third coil 430-3. As an example, the ratio of the number of turns of the second-first coil 430-1 to the number of turns of the second-second and second-third coils 430-2 and 430-3 may be 1.5:2.0 to 1:1. The ratio of the number of turns of the second-first coil 430-1 to the number of turns of the second-second and second-third coils 430-2 and 430-3 is ideally 1:1, but may be disposed up to 1.5:2.0 due to space constraints.

The second coil 430 may comprise a substrate part 435. The substrate part 435 may be disposed on the base 410. The substrate part 435 may be disposed on the first substrate 420. The substrate part 435 may be disposed between the magnet 320 and the base 410. Here, although the substrate part 435 is described as a configuration separate from the first substrate 420, the substrate part 435 may be understood as a configuration comprised on the first substrate 420.

The substrate part 435 may be a circuit board. The substrate part 435 may be an FPCB. The second coil 430 may be integrally formed with the substrate part 435 as a fine pattern coil (FP coil). A first hole for penetrating through the substrate part 435 in an optical axis direction may be formed in the central portion of the substrate part 435. A second hole through which the second elastic member 600 passes may be formed in the substrate part 435.

The stator 400 may comprise a first sensor 440. The first sensor 440 may be disposed on the base 410. The first sensor 440 may detect the fourth magnet 230. The first sensor 440 may be disposed on the first substrate 420. The first sensor 440 may be coupled to a lower surface of the first substrate 420. The first sensor 440 may be disposed in the hole 411 of the base 410. The first sensor 440 may be spaced apart from the housing 310. The first sensor 440 may be spaced apart from the bobbin 210. The first sensor 440 may be overlapped with the fourth magnet 230 in an optical axis direction. The first sensor 440 may detect the position of the fourth magnet 230 for AF feedback control. The first sensor 440 may be a Hall IC, a Hall element, or a Hall sensor. The first sensor 440 may detect the magnetic force of the fourth magnet 230.

The stator 400 may comprise a second sensor 450. The second sensor 450 may be disposed between the base 410 and the first substrate 420. The second sensor 450 may detect the movement of the second mover 300. The second sensor 450 may detect the magnetic force of the magnet 320 to detect the movement of the housing 310 and the magnet 320. The detected value detected by the second sensor 450 may be used for OIS feedback control. The second sensor 450 may comprise a plurality of Hall sensors. The second sensor 450 may comprise two Hall sensors. The second sensor 450 may comprise a first Hall sensor that detects movement in the x-axis in the horizontal direction and a second Hall sensor that senses movement in the y-axis in the horizontal direction.

The stator 400 may comprise a terminal 460. The terminal 460 may be disposed on a lower surface of the base 410. The terminal 460 may be electrically connected to the first substrate 420. The length of the wire of the second elastic member 600 may be secured through the terminal 460.

The lens driving device 10 may comprise a first elastic member 500. The first elastic member 500 may connect the housing 310 and the bobbin 210. The first elastic member 500 may be coupled to the bobbin 210 and the housing 310. The first elastic member 500 may elastically connect the bobbin 210 and the housing 310. The first elastic member 500 may have elasticity at least in part. The first elastic member 500 may elastically support the movement of the bobbin 210 during AF driving.

The first elastic member 500 may comprise an upper elastic member. The first elastic member 500 may connect the upper portion of the housing 310 and the upper portion of the bobbin 210. The first elastic member 500 may be coupled to an upper surface of the bobbin 210 and an upper surface of the housing 310. The first elastic member 500 may be formed with a leaf spring. The first elastic member 500 may comprise a lower elastic member.

The first elastic member 500 may electrically connect the first coil 220 and the first substrate 420. The first elastic member 500 may comprise a plurality of upper elastic units. The first elastic member 500 may comprise three upper elastic units. The first elastic member 500 may comprise a first upper elastic unit 501, a second upper elastic unit 502, and a third upper elastic unit 503. The first upper elastic unit 501 may connect one wire among a plurality of wires and the first-first coil 220-1. The second upper elastic unit 502 may connect the first-first coil 220-1 and the first-second coil 220-2. The third upper elastic unit 503 may connect the first-second coil 220-2 to the other one among the plurality of wires.

The first elastic member 500 may comprise an inner side portion 510. The inner side portion 510 may be coupled to an upper portion of the bobbin 210. The inner side portion 510 may comprise a hole inserted into the first protrusion of the bobbin 210.

The first elastic member 500 may comprise an outer side portion 520. The outer side portion 520 may be coupled to an upper portion of the housing 310. The outer side portion 520 may comprise a hole being inserted into the first protrusion of the housing 310.

The first elastic member 500 may comprise a connection portion 530. The connection portion 530 may connect the inner side portion 510 and the outer side portion 520. The connection portion 530 may have elasticity.

The first elastic member 500 may comprise a coupling portion 540. The coupling portion 540 is being extended from the outer side portion 520 and may be coupled to the second elastic member 600. The coupling portion 540 may comprise a hole through which the wire of the second elastic member 600 penetrates. A solder ball connecting the coupling portion 540 and the wire may be disposed on an upper surface of the coupling portion 540.

The lens driving device 10 may comprise a second elastic member 600. The second elastic member 600 may be an 'OIS support member'. The second elastic member 600 may connect the first elastic member 500 and the first substrate 420, the substrate part 435 or the terminal 460. The second elastic member 600 may be coupled to an upper surface of the first elastic member 500 and the terminal 460. The second elastic member 600 may movably support the housing 310. The second elastic member 600 may elastically support the housing 310. The second elastic member 600 may have elasticity at least in part. The second elastic member 600 may elastically support the movement of the housing 310 and the bobbin 210 during OIS driving. The second elastic member 600 may connect the first substrate 420 and the first elastic member 500. One end of the second elastic member 600 may be coupled to the first elastic member 500 by solder. The other end of the second elastic member 600 may be coupled to the terminal 460 by solder.

The second elastic member 600 may comprise a plurality of wires. The second elastic member 600 may comprise four wires. The plurality of wires may comprise four wires connecting the three upper elastic units 501, 502, and 503 to the first substrate 420. As a modification, the second elastic member 600 may be formed of a leaf spring.

The lens driving device 10 may comprise a damper. The damper may be disposed in the second elastic member 600. The damper may be disposed in the second elastic member 600 and the housing 310. The damper may be disposed in the elastic member. The damper may be disposed in the elastic member and/or the second elastic member 600 to inhibit a resonance phenomenon occurring in the elastic member and/or the second elastic member 600.

Hereinafter, a camera module according to a second embodiment of the present invention will be described with reference to the drawings.

Figure 32:
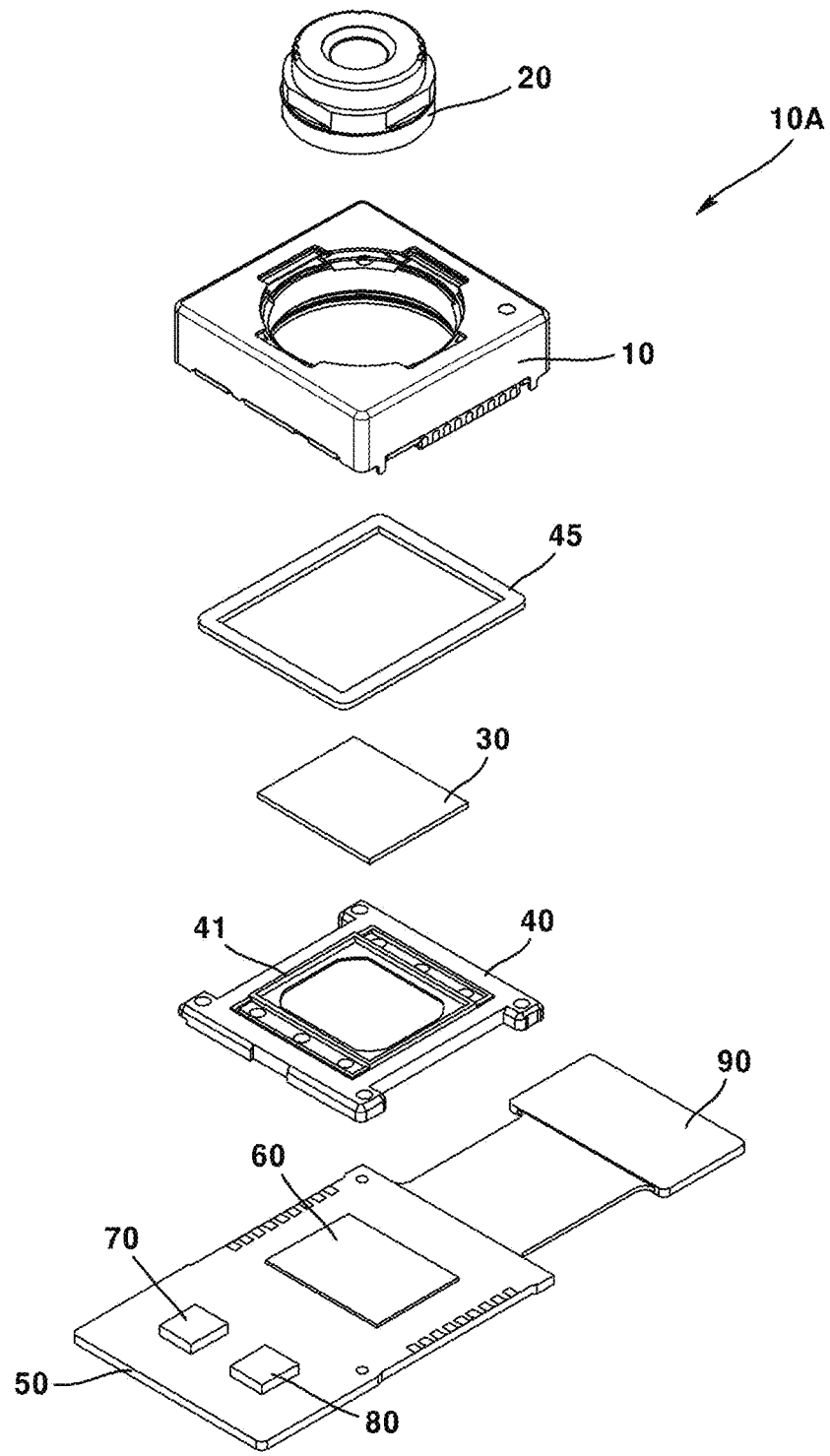
FIG. 32 is an exploded perspective view of a camera module according to a second embodiment of the present invention.

FIG. 32 is an exploded perspective view of a camera module according to a second embodiment of the present invention.

The camera device 10A may comprise a camera module.

The camera device 10A may comprise a lens module 20. The lens module 20 may comprise at least one lens. The lens may be disposed at a position corresponding to the image sensor 60. The lens module 20 may comprise a lens and a barrel. The lens module 20 may be coupled to the bobbin 210 of the lens driving device 10. The lens module 20 may be coupled to the bobbin 210 by screw-coupling and/or adhesive. The lens module 20 may move integrally with the bobbin 210.

The camera device 10A may comprise a filter 30. The filter 30 may play the role of blocking light of a specific frequency band from being incident on the image sensor 60 from the light passing through the lens module 20. The filter 30 may be disposed to be parallel to the x-y plane. The filter 30 may be disposed between the lens module 20 and the image sensor 60. The filter 30 may be disposed on the sensor base 40. In a modified embodiment, the filter 30 may be disposed on the base 410. The filter 30 may comprise an infrared filter. The infrared filter may block light of the infrared region from being incident on the image sensor 60.

The camera device 10A may comprise a sensor base 40. The sensor base 40 may be disposed between the lens driving device 10 and the printed circuit board 50. The sensor base 40 may comprise a protruded portion 41 on which the filter 30 is disposed. An opening may be formed in a portion of the sensor base 40 in which the filter 30 is disposed so that light passing through the filter 30 may be incident on the image sensor 60. An adhesive member 45 may couple or attach the base 410 of the lens driving device 10 to the sensor base 40. The adhesive member 45 may additionally play the role of inhibiting foreign substances from being introduced into the lens driving device 10. The adhesive member 45 may comprise any one or more among an epoxy, a thermosetting adhesive, and an ultraviolet curable adhesive.

The camera device 10A may comprise a printed circuit board (PCB) 50. The printed circuit board 50 may be a substrate or a circuit board. The lens driving device 10 may be disposed on the printed circuit board 50. The sensor base 40 may be disposed between the printed circuit board 50 and the lens driving device 10. The printed circuit board 50 may be electrically connected to the lens driving device 10. The image sensor 60 may be disposed on the printed circuit board 50. The printed circuit board 50 may comprise various circuits, elements, control units, and the like to convert an image formed on the image sensor 60 into an electrical signal and transmit it to an external device.

The camera device 10A may comprise an image sensor 60. The image sensor 60 may have a configuration in which light passing through the lens and filter 30 is incident to form an image. The image sensor 60 may be mounted on the printed circuit board 50. The image sensor 60 may be electrically connected to the printed circuit board 50. For example, the image sensor 60 may be coupled to the printed circuit board 50 by a surface mounting technology (SMT). As another example, the image sensor 60 may be coupled to the printed circuit board 50 by flip chip technology. The image sensor 60 may be disposed so that the lens and the optical axis coincide. That is, the optical axis of the image sensor 60 and the optical axis of the lens may be aligned. The image sensor 60 may convert light irradiated to the effective image region of the image sensor 60 into an electrical signal. The image sensor 60 may be any one among a charge coupled device (CCD), a metal oxide semi-conductor (MOS), a CPD, and a CID.

The camera device 10A may comprise a motion sensor 70. The motion sensor 70 may be mounted on the printed circuit board 50. The motion sensor 70 may be electrically connected to a control unit 80 through a circuit pattern provided on the printed circuit board 50. The motion sensor 70 may output rotational angular velocity information due to the movement of the camera device 10A. The motion sensor 70 may comprise a 2-axis or 3-axis gyro sensor, or an angular velocity sensor.

The camera device 10A may comprise a control unit 80. The control unit 80 may be disposed on the printed circuit board 50. The control unit 80 may be electrically connected to the first and second coils 220 and 430 of the lens driving device 10. The control unit 80 may individually control the direction, intensity, and amplitude of the current supplied to the first and second coils 220 and 430. The control unit 80 may control the lens driving device 10 to perform an autofocus function and/or an image stabilization function. Furthermore, the control unit 80 may perform autofocus feedback control and/or handshake correction feedback control for the lens driving device 10.

The camera device 10A may comprise a connector 90. The connector 90 may be electrically connected to the printed circuit board 50. The connector 90 may comprise a port for electrically connecting to an external device.

In the camera module according to the present embodiment, when a driving current in a first direction is applied to the first coil 220 in the camera module according to the present embodiment, the bobbin 210 moves within the first stroke in a direction away from the image sensor, and when a driving current in a second direction opposite to the first direction is applied to the first coil 220, the bobbin 210 may move within the second stroke in a direction to be closer to the image sensor. At this time, the first stroke may be longer than the second stroke.

Hereinafter, an optical device according to a second embodiment of the present invention will be described with reference to the drawings.

Figure 33:
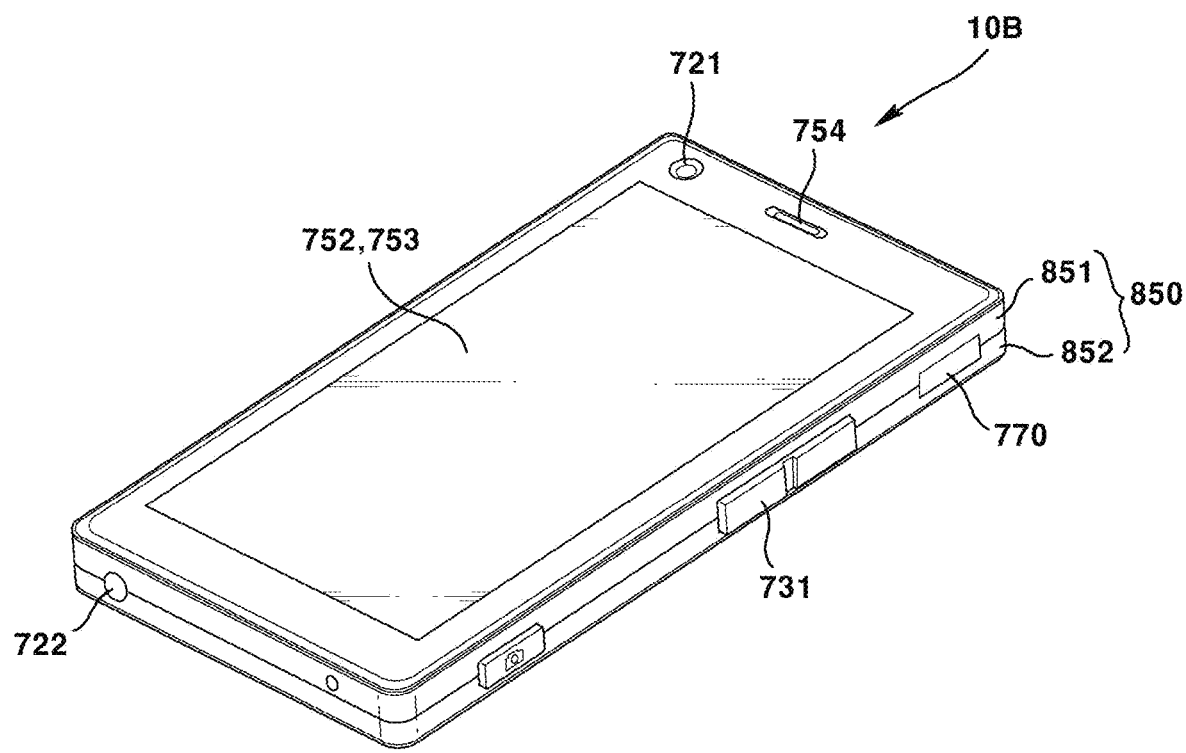
FIG. 33 is a perspective view of an optical device according to a second embodiment of the present invention.
Figure 34:
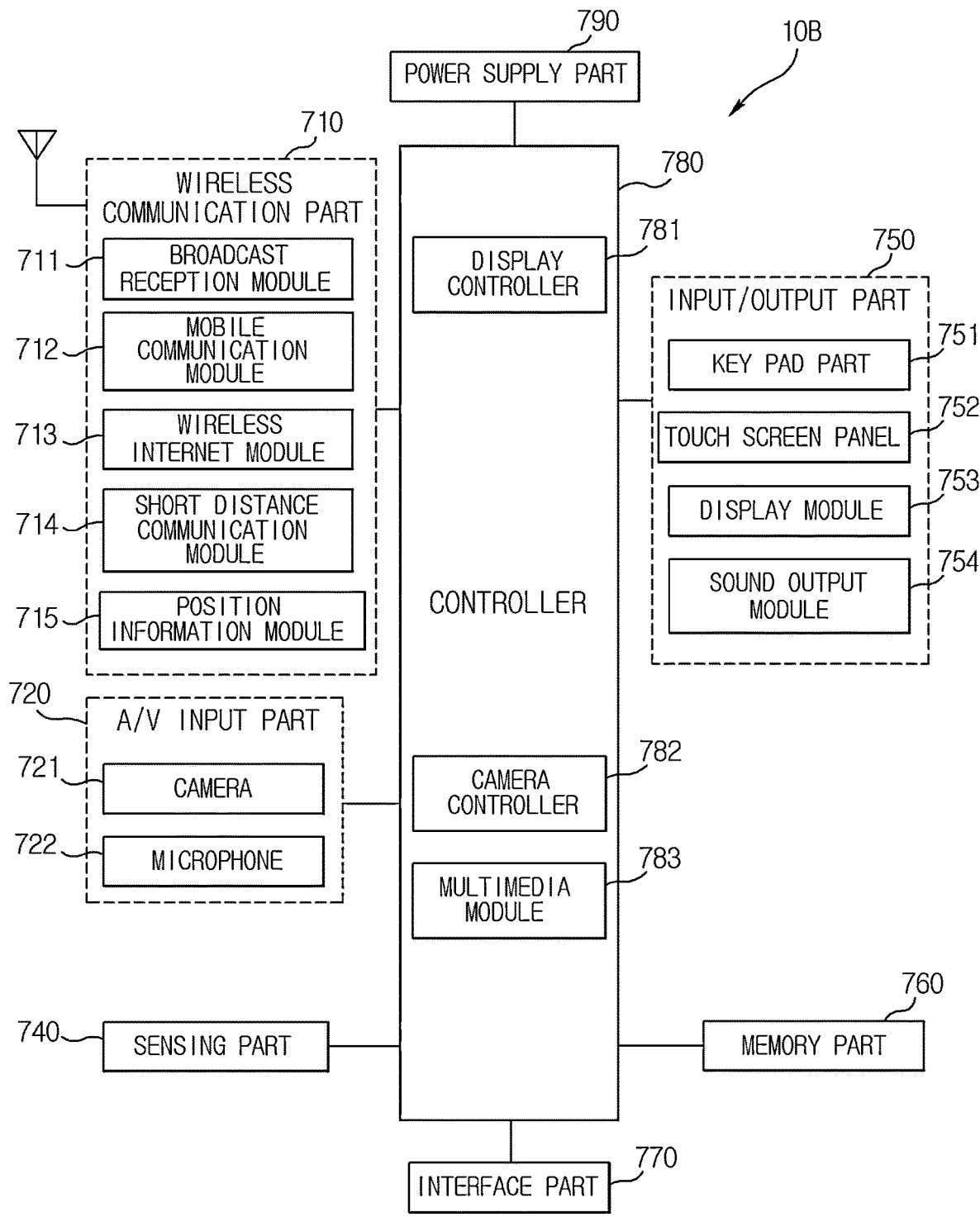
FIG. 34 is a block diagram of an optical device according to a second embodiment of the present invention.

FIG. 33 is a perspective view of an optical device according to a second embodiment of the present invention, and FIG. 34 is a block diagram of an optical device according to a second embodiment of the present invention.

The optical device 10B may be any one among a mobile phone, a mobile phone, a smart phone, a portable smart device, a digital camera, a laptop computer, a digital broadcasting terminal, a personal digital assistant (PDA), a portable multimedia player (PMP), and a navigation device. However, the type of the optical device 10B is not limited thereto, and any device for photographing an image or a picture may be comprised in the optical device 10B.

The optical device 10B may comprise a main body 850. The main body 850 may have a bar shape. Or, the main body 850 may have various structures such as a slide type, a folder type, a swing type, and a swirl type, in which two or more sub-bodies are coupled to be relatively movable. The main body 850 may comprise a case (casing, housing, and cover) forming an outer appearance. For example, the main body 850 may comprise a front case 851 and a rear case 852. Various electronic components of the optical device 10B may be embedded in a space formed between the front case 851 and the rear case 852. A display module 753 may be disposed on one surface of the main body 850. A camera 721 may be disposed on one or more surfaces among one surface and the other surface disposed at an opposite side of the one surface of the main body 850.

The optical device 10B may comprise a wireless communication unit 710. The wireless communication unit 710 may comprise one or more modules that enable wireless communication between the optical device 10B and a wireless communication system or between the optical device 10B and a network in which the optical device 10B is located. For example, the wireless communication unit 710 may comprise any one or more among a broadcast reception module 711, a mobile communication module 712, a wireless Internet module 713, a short-range communication module 714, and a location information module 715.

The optical device 10B may comprise an A/V input unit 720. The A/V input unit 720 is for inputting an audio signal or a video signal, and may comprise any one or more of a camera 721 and a microphone 722. At this time, the camera 721 may comprise the camera device 10A according to the present embodiment.

The optical device 10B may comprise a sensing unit 740. The sensing unit 740 may generate a sensing signal for controlling the operation of the optical device 10B by detecting the current state of the optical device 10B such as the opening/closing state of the optical device 10B, the position of the optical device 10B, the presence or absence of user contact, the orientation of the optical device 10B, acceleration/deceleration of the optical device 10B, and the like. For example, when the optical device 10B is in the form of a slide phone, it is possible to sense whether the slide phone is opened or closed. In addition, it may be responsible for sensing functions related to whether the power supply unit 790 is supplied with power, whether the interface unit 770 is coupled to an external device, and the like.

The optical device 10B may comprise an input/output unit 750. The input/output unit 750 may be configured to generate an input or output related to visual, auditory, or tactile sense. The input/output unit 750 may generate input data for controlling the operation of the optical device 10B, and may output information processed by the optical device 10B.

The input/output unit 750 may comprise any one or more among a keypad unit 751, a touch screen panel 752, a display module 753, and a sound output module 754. The keypad unit 751 may generate input data in response to a keypad input. The touch screen panel 752 may convert a change in capacitance generated due to a touch of a user on a specific region of the touch screen into an electrical input signal. The display module 753 may output an image photographed by the camera 721. The display module 753 may comprise a plurality of pixels whose color changes according to an electrical signal. For example, the display module 753 may comprise at least one among a liquid crystal display, a thin film transistor-liquid crystal display, an organic light-emitting diode, a flexible display, and a three-dimensional (3D) display. The sound output module 754 outputs audio data being received from the wireless communication unit 710 in call reception mode, call mode, recording mode, voice recognition mode, broadcast reception mode, or the like, or may output audio data stored in the memory unit 760.

The optical device 10B may comprise a memory unit 760. A program for processing and controlling the control unit 780 may be stored in the memory unit 760. In addition, the memory unit 760 may store input/output data, for example, any one or more among a phone book, a message, an audio, a still image, a photo, and a video. The memory unit 760 may store an image photographed by the camera 721, for example, a photo or a video.

The optical device 10B may comprise an interface unit 770. The interface unit 770 plays the role of a path for connecting to an external device connected to the optical device 10B. The interface unit 770 may receive data from an external device, receive power and transmit it to each component inside the optical device 10B, or transmit data inside the optical device 10B to an external device. The interface unit 770 may comprise any one or more among wired/wireless headset port, external charger port, wired/ wireless data port, memory card port, port for connecting devices equipped with identification module, audio input/output (I/O) port, video input/output (I/O) port, and earphone port.

The optical device 10B may comprise a control unit 780. The control unit 780 may control the overall operation of the optical device 10B. The control unit 780 may perform related control and processing for voice call, data communication, video call, and the like. The control unit 780 may comprise a display control unit 781 that controls a display module 753 that is a display of the optical device 10B. The control unit 780 may comprise a camera control unit 782 that controls the camera device 10A. The control unit 780 may comprise a multimedia module 783 for playing multimedia. The multimedia module 783 may be provided inside the control unit 180 or may be provided separately from the control unit 780. The control unit 780 may perform a pattern recognition process capable of recognizing a handwriting input or a drawing input performed on the touch screen as characters and images, respectively.

The optical device 10B may comprise a power supply 790. The power supply unit 790 receives external power or internal power under the control of the control unit 780 and may supply power required for the operation of each component.

Although the first embodiment and the second embodiment of the present invention have been described separately, some components of the first embodiment may be comprised in the second embodiment, and some components of the second embodiment may be comprised in the first embodiment. That is, a modified embodiment of the present invention may comprise a partial configuration of the first embodiment and a partial configuration of the second embodiment together. Some configurations of any one embodiment of the first embodiment and the second embodiment may be substituted with corresponding configurations of the other embodiment. For example, the lens driving device 10 according to the second embodiment may replace any one of the first lens driving device 1000 and the second lens driving device according to the first embodiment. That is, in the modified embodiment, the lens driving device 10 of the second embodiment may be dually disposed with the first lens driving device 1000. Or, the lens driving device 10 of the second embodiment may be dually disposed with the second lens driving device 2000. Or, the lens driving device 10 of the second embodiment may be disposed in a triple parallel with the first lens driving device 1000 and the second lens driving device 2000.

Although embodiments of the present invention have been described with reference to the accompanying drawings, those of ordinary skill in the art to which the present invention belongs will be able to understand that the present invention can be embodied in other specific forms without changing its technical spirit or essential features. Therefore, it should be understood that the embodiments described above are illustrative in all respects and not restrictive.

The invention claimed is:

1. A camera module comprising:
a first camera module and a second camera module,
wherein the first camera module comprises a first cover, a first bobbin disposed in the first cover, a first dummy member disposed on a first corner of the first cover, and first to third magnets disposed on second to fourth corners of the first cover,
wherein the second camera module comprises a second cover, a second bobbin disposed in the second cover, a second dummy member disposed on a fifth corner of the second cover, and fourth to sixth magnets disposed on sixth to eighth corners of the second cover,
wherein the first corner and the second corner are opposite to each other,
wherein the third corner and the fourth corner are opposite to each other,
wherein the fifth corner and the sixth corner are opposite to each other,
wherein the seventh corner and the eighth corner are opposite to each other,
wherein the first dummy member is disposed between the third magnet and the fifth magnet,
wherein the second dummy member is disposed between the second magnet and the sixth magnet,
wherein a sensing magnet is disposed at at least one of the first corner and the fifth corner, and
wherein the sensing magnet is disposed on at least one of the first dummy member and the second dummy member.

2. The camera module of claim 1, wherein the second dummy member is disposed on a same straight line as the first magnet, the second magnet, and the sixth magnet.

3. The camera module of claim 1, wherein the second dummy member is overlapped with the second magnet and the sixth magnet in a first direction perpendicular to an optical axis of the second camera module.

4. The camera module of claim 1, wherein a first sidewall of the first camera module faces a fifth sidewall of the second camera module,
wherein the first sidewall is disposed between the first corner and the third corner, and
wherein the fifth sidewall is disposed between the fifth corner and the seventh corner.

5. The camera module of claim 1, wherein each of the first magnet and the fourth magnet is a two-pole magnetized magnet, and
wherein each of the second magnet, the third magnet, the fifth magnet, and the sixth magnet is a four-pole magnetized magnet.

6. The camera module of claim 1, comprising a position sensor disposed at a position corresponding to the sensing magnet.

7. The camera module of claim 1, wherein the first magnet is larger than each of the second magnet and the third magnet.

8. The camera module of claim 5, wherein the first dummy member and the second dummy member comprise a groove disposed with the sensing magnet.

9. The camera module of claim 1, wherein the first magnet and the first dummy member are disposed on a diagonal line with each other.

10. A camera module comprising:
a first camera module and a second camera module,
wherein the first camera module comprises a first cover, a first bobbin disposed in the first cover, a first dummy member disposed on a first corner of the first cover, and a first magnet disposed on second to fourth corners of the first cover,
wherein the second camera module comprises a second cover, a second bobbin disposed in the second cover, a second dummy member disposed on a fifth corner of the second cover, and a second magnet disposed on sixth to eighth corners of the second cover,
wherein the first corner and the second corner are opposite to each other,
wherein the third corner and the fourth corner are opposite to each other, wherein the fifth corner and the sixth corner are opposite to each other, wherein the seventh corner and the eighth corner are opposite to each other, wherein the first dummy member is disposed between the third magnet and the fifth magnet, wherein the second dummy member is disposed between the second magnet and the sixth magnet, wherein a sensing magnet is disposed at at least one of the first corner and the fifth corner, and wherein the first dummy member and the second dummy member comprise a groove disposed with the sensing magnet.

11. The camera module of claim 1, wherein a weight of the first dummy member is within 80% to 120% of a weight of the first magnet.

12. The camera module of claim 1, wherein a sum of a weight of the first dummy member and a weight of the sensing magnet is same as a weight of the first magnet.

13. The camera module of claim 1, wherein a distance between the first dummy member and the second magnet is same as a distance between the first dummy member and the third magnet.

14. The camera module of claim 1, wherein the first dummy member comprises an inner surface facing the first bobbin and an outer surface opposite to the inner surface, and wherein, in a direction perpendicular to an optical axis of the first camera module, a width of the inner surface of the first dummy member is greater than a width of the outer surface of the first dummy member.

15. The camera module of claim 1, wherein the first dummy member comprises a non-magnetic material, or a magnetic strength of the first dummy member is weaker than a magnetic strength of the first magnet.

16. An optical device comprising:

a main body;

the camera module of claim 1 disposed on the main body; and a display disposed on the main body and configured to output an image photographed by the camera module.

17. A camera module comprising:

a first camera module and a second camera module, wherein the first camera module comprises a first cover, a first bobbin disposed in the first cover, a first dummy member disposed on a first corner of the first cover, and first to third magnets disposed on second to fourth corners of the first cover, wherein the second camera module comprises a second cover, a second bobbin disposed in the second cover, a second dummy member disposed on a fifth corner of the second cover, and fourth to sixth magnets disposed on sixth to eighth corners of the second cover, wherein the first corner and the second corner are opposite to each other, wherein the third corner and the fourth corner are opposite to each other, wherein the fifth corner and the sixth corner are opposite to each other, wherein the seventh corner and the eighth corner are opposite to each other, wherein the first dummy member is disposed between the third magnet and the fifth magnet, wherein the second dummy member is disposed between the second magnet and the sixth magnet, wherein the first dummy member comprises an inner surface facing the first bobbin and an outer surface opposite to the inner surface, and wherein, in a direction perpendicular to an optical axis of the first camera module, a width of the inner surface of the first dummy member is greater than a width of the outer surface of the first dummy member.

18. The camera module of claim 17, wherein each of the first magnet and the fourth magnet is a two-pole magnetized magnet, and wherein each of the second magnet, the third magnet, the fifth magnet, and the sixth magnet is a four-pole magnetized magnet.

19. The camera module of claim 17, wherein the first magnet is larger than each of the second magnet and the third magnet.

20. The camera module of claim 17, wherein a distance between the first dummy member and the third corner is same as a distance between the first dummy member and the fourth corner.

* * * * *